US011322995B2

(12) United States Patent
Le et al.

(10) Patent No.: US 11,322,995 B2
(45) Date of Patent: May 3, 2022

(54) MODULAR ELECTROMAGNETIC MACHINES AND METHODS OF USE AND MANUFACTURE THEREOF

(71) Applicant: ClearWater Holdings, Ltd., Carson City, NV (US)

(72) Inventors: The' Le, Fremont, CA (US); Stephen Gottschalk, Fremont, CA (US); Tony Jones, Fremont, CA (US); Jemon Johnson, Fremont, CA (US); Peter V. Schwartz, Fremont, CA (US); G. Noah Newmark, Marina Del Rey, CA (US); Stephen M. Collins, Los Angeles, CA (US)

(73) Assignee: ClearWater Holdings, Ltd., Carson City, NV (US)

( * ) Notice: Subject to any disclaimer, the term of this patent is extended or adjusted under 35 U.S.C. 154(b) by 0 days.

(21) Appl. No.: 16/759,826

(22) PCT Filed: Oct. 29, 2018

(86) PCT No.: PCT/US2018/058058
§ 371 (c)(1),
(2) Date: Apr. 28, 2020

(87) PCT Pub. No.: WO2019/084568
PCT Pub. Date: May 2, 2019

(65) Prior Publication Data
US 2020/0350791 A1 Nov. 5, 2020

Related U.S. Application Data

(60) Provisional application No. 62/578,508, filed on Oct. 29, 2017.

(51) Int. Cl.
*H02K 1/18* (2006.01)
*H02K 5/06* (2006.01)
(Continued)

(52) U.S. Cl.
CPC .................. *H02K 1/18* (2013.01); *H02K 5/06* (2013.01); *H02K 16/02* (2013.01); *H02K 21/14* (2013.01)

(58) Field of Classification Search
CPC ........... H02K 16/02; H02K 1/18; H02K 1/187
See application file for complete search history.

(56) References Cited

U.S. PATENT DOCUMENTS 3,435,267 A   3/1969   Beyersdorf
3,597,278 A   8/1971   Brimer
(Continued)

FOREIGN PATENT DOCUMENTS

CN   101931277 A   12/2010
CN   202759358 U   2/2013
(Continued)

OTHER PUBLICATIONS

International Search Report and Written Opinion in International Application No. PCT/US2018/058058, dated Mar. 8, 2019 (18 pages).
(Continued)

*Primary Examiner* — Dang D Le
(74) *Attorney, Agent, or Firm* — Nixon Peabody LLP

(57) ABSTRACT

An electromagnetic machine includes a housing, an axle coupled to the housing in a rotatable fashion, a stator assembly disposed generally within the housing, the stator assembly including a stator plate and a stator bearing coupled to the axle such that the stator assembly is rotatable about the axle, a rotor assembly fixed to the axle and disposed generally within the housing and including a rotor housing that defines a circumferentially extending channel that is sized to receive a portion of the stator assembly therein; and a locking mechanism configured to selectively prevent and permit rotation of the stator assembly about the axle via the stator bearing. The housing can include an
(Continued)

access window defined therein such that the stator assembly is accessible through the access window.

23 Claims, 37 Drawing Sheets

(51) Int. Cl.
*H02K 16/02* (2006.01)
*H02K 21/14* (2006.01)

(56) References Cited

U.S. PATENT DOCUMENTS

| | | | |
|---|---|---|---|
| 4,087,698 A | 5/1978 | Myers | |
| 4,185,366 A | 1/1980 | Gilbert | |
| 4,286,198 A | 8/1981 | de Valroger | |
| 4,340,830 A | 7/1982 | Ellefsen | |
| 4,370,577 A | 1/1983 | Wakabayashi | |
| 4,441,043 A | 4/1984 | DeCesare | |
| 4,458,228 A | 7/1984 | Baumgartner | |
| 4,521,497 A | 6/1985 | Tamminen | |
| 4,542,323 A | 9/1985 | Doemen | |
| 4,563,602 A | 1/1986 | Nagasaka | |
| 4,568,862 A | 2/1986 | Tassinario | |
| 4,626,751 A | 12/1986 | Doemen | |
| 4,802,690 A | 2/1989 | Raidel | |
| 4,806,832 A | 2/1989 | Muller | |
| 4,924,156 A | 5/1990 | Muller | |
| 4,973,869 A | 11/1990 | Cho | |
| 5,038,083 A | 8/1991 | Muller | |
| 5,051,641 A | 9/1991 | Weh | |
| 5,117,142 A | 5/1992 | von Zweygbergk | |
| 5,128,570 A | 7/1992 | Isozaki | |
| 5,130,583 A | 7/1992 | Andoh | |
| 5,134,682 A | 7/1992 | Muller | |
| 5,142,181 A | 8/1992 | Newell | |
| 5,289,072 A | 2/1994 | Lange | |
| 5,474,799 A | 12/1995 | Thigpen | |
| 5,543,674 A | 8/1996 | Koehler | |
| 5,708,310 A | 1/1998 | Sakamoto | |
| 5,777,418 A | 7/1998 | Lange | |
| 5,838,079 A | 11/1998 | Morohashi | |
| 5,894,902 A | 4/1999 | Cho | |
| 5,942,828 A | 8/1999 | Hill | |
| 5,952,743 A | 9/1999 | Sidey | |
| 5,973,436 A | 10/1999 | Mitcham | |
| 5,977,684 A | 11/1999 | Lin | |
| 6,011,339 A | 1/2000 | Kawakami | |
| 6,043,579 A | 3/2000 | Hill | |
| 6,222,287 B1 | 4/2001 | Suzuki | |
| 6,228,220 B1 | 5/2001 | Hada | |
| 6,228,235 B1 | 5/2001 | Tepman | |
| 6,414,408 B1 | 7/2002 | Erdman | |
| 6,492,758 B1 | 12/2002 | Gianni | |
| 6,700,267 B2 | 3/2004 | Weiss | |
| 6,710,581 B1 | 3/2004 | Lee | |
| 6,727,632 B2* | 4/2004 | Kusase | H02K 1/27 310/112 |
| 6,729,140 B2 | 5/2004 | Care | |
| 6,741,010 B2 | 5/2004 | Wilkin | |
| 6,798,089 B1 | 9/2004 | Smit | |
| 6,803,691 B2 | 10/2004 | Rose | |
| 6,847,135 B2 | 1/2005 | Kastinger | |
| 6,870,284 B2 | 3/2005 | Uchida | |
| 6,888,272 B2 | 5/2005 | Kastinger | |
| 6,891,306 B1 | 5/2005 | Soghomonian | |
| 6,924,574 B2 | 8/2005 | Qu | |
| 6,952,068 B2 | 10/2005 | Gieras | |
| 7,030,529 B2 | 4/2006 | Dommsch | |
| 7,067,942 B2 | 6/2006 | Korenaga | |
| 7,122,923 B2 | 10/2006 | Lafontaine | |
| 7,124,495 B2 | 10/2006 | Gieras | |
| 7,164,220 B2 | 1/2007 | Gilmour | |
| 7,466,058 B2 | 12/2008 | Dubois | |
| 7,492,074 B1 | 2/2009 | Rittenhouse | |
| 7,579,742 B1 | 8/2009 | Rittenhouse | |
| 7,633,198 B2 | 12/2009 | Kirkman | |
| 7,652,406 B2 | 1/2010 | Kim | |
| 7,701,678 B2 | 4/2010 | Dooley | |
| 7,755,244 B2 | 7/2010 | Ley | |
| 7,763,998 B2* | 7/2010 | Makino | H02K 3/522 310/71 |
| 7,777,381 B2 | 8/2010 | Takeuchi | |
| 7,791,245 B1 | 9/2010 | Hao | |
| 7,812,500 B1 | 10/2010 | Ham | |
| 7,884,563 B2 | 2/2011 | Takeuchi | |
| 7,906,885 B2 | 3/2011 | Lu | |
| 7,944,107 B2 | 5/2011 | Thoms | |
| 7,944,112 B2 | 5/2011 | Kim | |
| 7,960,893 B2 | 6/2011 | Kim | |
| 7,986,069 B2 | 7/2011 | Takeuchi | |
| 7,990,019 B2 | 8/2011 | Sung | |
| 8,053,946 B2 | 11/2011 | Koizumi | |
| 8,058,763 B2 | 11/2011 | Clark | |
| 8,074,922 B2 | 12/2011 | Bojiuc | |
| 8,084,879 B2 | 12/2011 | Stiesdal | |
| 8,089,175 B2 | 1/2012 | Stiesdal | |
| 8,106,563 B2 | 1/2012 | Ritchey | |
| 8,110,961 B2 | 2/2012 | Hsu | |
| 8,115,361 B2 | 2/2012 | Iki | |
| 8,154,146 B2 | 4/2012 | Fischer | |
| 8,159,104 B1 | 4/2012 | Bojiuc | |
| 8,169,109 B2 | 5/2012 | Sykes | |
| 8,188,633 B2 | 5/2012 | Quere | |
| 8,207,642 B2* | 6/2012 | Lafontaine | H02K 21/22 310/90 |
| 8,207,644 B2 | 6/2012 | Himmelmann | |
| 8,207,648 B2 | 6/2012 | Li | |
| 8,212,445 B2 | 7/2012 | Ritchey | |
| 8,232,695 B2 | 7/2012 | Bojiuc | |
| 8,258,782 B2 | 9/2012 | Kaita | |
| 8,264,120 B2 | 9/2012 | Hsu | |
| 8,274,191 B2 | 9/2012 | Stiesdal | |
| 8,278,872 B2 | 10/2012 | Li | |
| 8,283,813 B2 | 10/2012 | Gilchrist | |
| 8,288,916 B2 | 10/2012 | Quere | |
| 8,294,322 B2 | 10/2012 | Aiki | |
| 8,299,676 B2 | 10/2012 | Miyata | |
| 8,330,404 B2 | 12/2012 | Sakai | |
| 8,334,634 B2 | 12/2012 | Palmer | |
| 8,339,009 B2 | 12/2012 | Mueller | |
| 8,344,567 B2 | 1/2013 | Kamiki | |
| 8,350,442 B2 | 1/2013 | Akutsu | |
| 8,354,768 B2 | 1/2013 | Cipriani | |
| 8,358,046 B2 | 1/2013 | Platon | |
| 8,373,319 B1 | 2/2013 | Barnes | |
| 8,381,389 B2 | 2/2013 | Lisi | |
| 8,390,168 B2 | 3/2013 | Hsu | |
| 8,432,081 B2 | 4/2013 | Wang | |
| 8,436,507 B2 | 5/2013 | Chien | |
| 8,482,171 B2 | 7/2013 | Edwards | |
| 8,536,751 B2 | 9/2013 | Cipriani | |
| 8,536,758 B2 | 9/2013 | Lisi | |
| 8,546,988 B2 | 10/2013 | Bright | |
| 8,890,389 B2 | 11/2014 | Li | |
| 10,396,627 B2 | 8/2019 | Wen | |
| 2002/0130655 A1 | 9/2002 | Okada | |
| 2003/0011455 A1 | 1/2003 | Wakuda | |
| 2003/0025417 A1 | 2/2003 | Rose | |
| 2003/0030969 A1 | 2/2003 | Farahmandi | |
| 2003/0102770 A1 | 6/2003 | Laskaris | |
| 2003/0127917 A1 | 7/2003 | Kang | |
| 2003/0230946 A1 | 12/2003 | Durham | |
| 2004/0061397 A1 | 4/2004 | Rose | |
| 2004/0155548 A1 | 8/2004 | Rasmussen | |
| 2004/0239199 A1 | 12/2004 | Qu | |
| 2004/0251759 A1 | 12/2004 | Hirzel | |
| 2005/0104456 A1 | 5/2005 | Yajima | |
| 2005/0179336 A1 | 8/2005 | Hasebe | |
| 2006/0022544 A1 | 2/2006 | Kinashi | |
| 2006/0038456 A1 | 2/2006 | Bojiuc | |
| 2006/0043821 A1 | 3/2006 | Kojima | |
| 2006/0192453 A1 | 8/2006 | Gieras | |
| 2007/0182265 A1 | 8/2007 | Makino | |

(56) References Cited

U.S. PATENT DOCUMENTS

| | | |
|---|---|---|
| 2007/0216249 A1 | 9/2007 | Gruendel |
| 2007/0228860 A1 | 10/2007 | Rao |
| 2007/0247017 A1 | 10/2007 | Bumby |
| 2007/0267929 A1 | 11/2007 | Pulnikov |
| 2007/0290175 A1 | 12/2007 | Kim |
| 2008/0048505 A1 | 2/2008 | Moriyama |
| 2008/0050266 A1 | 2/2008 | Chen |
| 2008/0122311 A1 | 5/2008 | Werst |
| 2008/0136272 A1 | 6/2008 | Ishikawa |
| 2008/0211326 A1 | 9/2008 | Kang |
| 2008/0246346 A1 | 10/2008 | Harris |
| 2008/0246362 A1 | 10/2008 | Hirzel |
| 2008/0278020 A1 | 11/2008 | Ley |
| 2009/0026869 A1 | 1/2009 | Kaehler |
| 2009/0102305 A1 | 4/2009 | Lu |
| 2009/0108712 A1 | 4/2009 | Holtzapple |
| 2009/0224628 A1 | 9/2009 | Hiwaki |
| 2009/0243413 A1 | 10/2009 | Gilchrist |
| 2009/0284088 A1 | 11/2009 | Takahashi |
| 2010/0058817 A1 | 3/2010 | Yoshikawa |
| 2010/0101879 A1 | 4/2010 | McVickers |
| 2010/0307913 A1 | 12/2010 | Ma |
| 2010/0327787 A1 | 12/2010 | Sakai |
| 2011/0058967 A1 | 3/2011 | Arita |
| 2011/0109190 A1 | 5/2011 | Aoyama |
| 2011/0234033 A1 | 9/2011 | Filatov |
| 2012/0126614 A1 | 5/2012 | Inoue |
| 2012/0228977 A1 | 9/2012 | Petro |
| 2012/0299405 A1 | 11/2012 | Li |
| 2012/0299430 A1 | 11/2012 | Pennander |
| 2012/0306212 A1 | 12/2012 | Munoz |
| 2013/0270955 A1 | 10/2013 | Lillington |
| 2014/0191612 A1 | 7/2014 | Mariotto |
| 2016/0276649 A1 | 9/2016 | Turney |
| 2018/0219464 A1 | 8/2018 | Newmark |

FOREIGN PATENT DOCUMENTS

| | | |
|---|---|---|
| CN | 104253511 A | 12/2014 |
| CN | 106233579 A | 12/2016 |
| CN | 106663999 A | 5/2017 |
| DE | 3142913 A1 | 5/1983 |
| DE | 10037787 A1 | 3/2002 |
| DE | 10 2005 032965 A1 | 3/2007 |
| EP | 2495853 A1 | 9/2012 |
| EP | 2168225 A4 | 6/2015 |
| EP | 3 120 439 A1 | 1/2017 |
| IN | 201627027705 A | 10/2016 |
| JP | S48-6323 A | 1/1973 |
| JP | S49-34082 | 9/1974 |
| JP | S53-81301 U | 7/1978 |
| JP | S54-141307 | 10/1979 |
| JP | S455-160964 | 12/1980 |
| JP | H0366553 | 6/1991 |
| JP | H04359656 A | 12/1992 |
| JP | 1994005380 | 1/1994 |
| JP | 2000134902 | 5/2000 |
| JP | 2001211623 A | 8/2001 |
| JP | 2004129339 | 4/2004 |
| JP | 2005287103 A | 10/2005 |
| JP | 2006280066 A | 10/2006 |
| JP | 2009505619 | 2/2009 |
| JP | 2009136046 | 6/2009 |
| JP | 2010-035375 A | 2/2010 |
| JP | 2010166741 | 7/2010 |
| JP | WO2008126408 | 7/2010 |
| JP | 2012075318 | 4/2012 |
| JP | WO2012007984 | 9/2013 |
| JP | 5117813 B2 | 1/2016 |
| KR | 16-130755 | 11/2016 |
| RU | 2 131 637 | 6/1999 |
| RU | 2310966 | 11/2007 |
| RU | 2393621 | 6/2010 |
| TW | 200919903 S | 5/2009 |
| TW | 201444231 A | 11/2014 |
| TW | 201618438 | 5/2016 |
| WO | WO 91/07805 | 5/1991 |
| WO | WO 93/15547 A1 | 8/1993 |
| WO | WO 00/54396 | 9/2000 |
| WO | WO 03/065554 A1 | 8/2003 |
| WO | WO 03/094328 A1 | 11/2003 |
| WO | WO 2006/117210 A1 | 11/2006 |
| WO | WO 2007/000054 A1 | 1/2007 |
| WO | WO 2009/009075 A1 | 1/2009 |
| WO | WO 2009/070333 A1 | 6/2009 |
| WO | WO 2015/120093 A1 | 8/2015 |
| WO | WO 2016/014717 A1 | 1/2016 |
| WO | WO 2016/178943 A1 | 11/2016 |

OTHER PUBLICATIONS

First Office Action and Search Report in Chinese Patent Application No. CN 201880070037.8, dated Jan. 10, 2022 (13 pages).

* cited by examiner

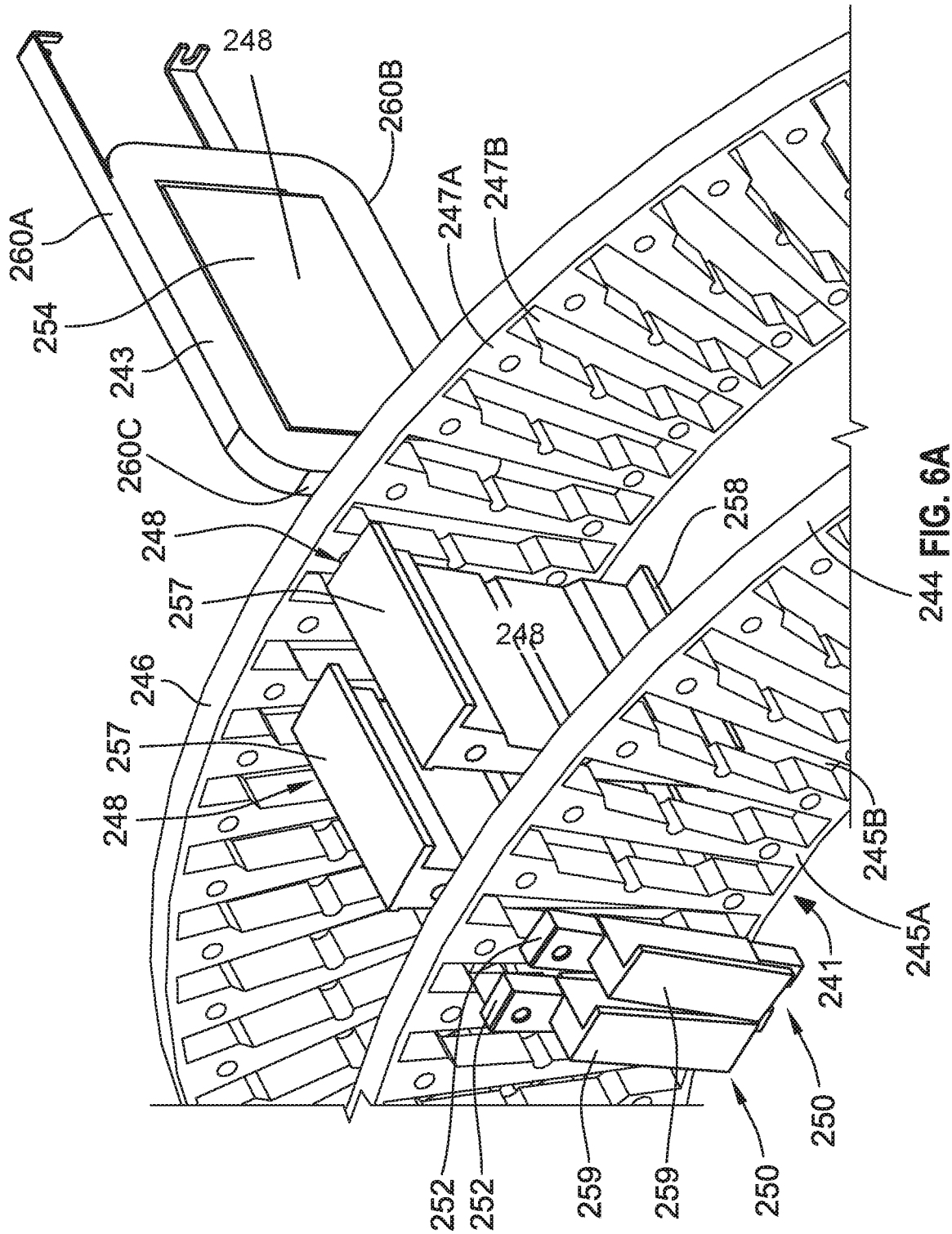

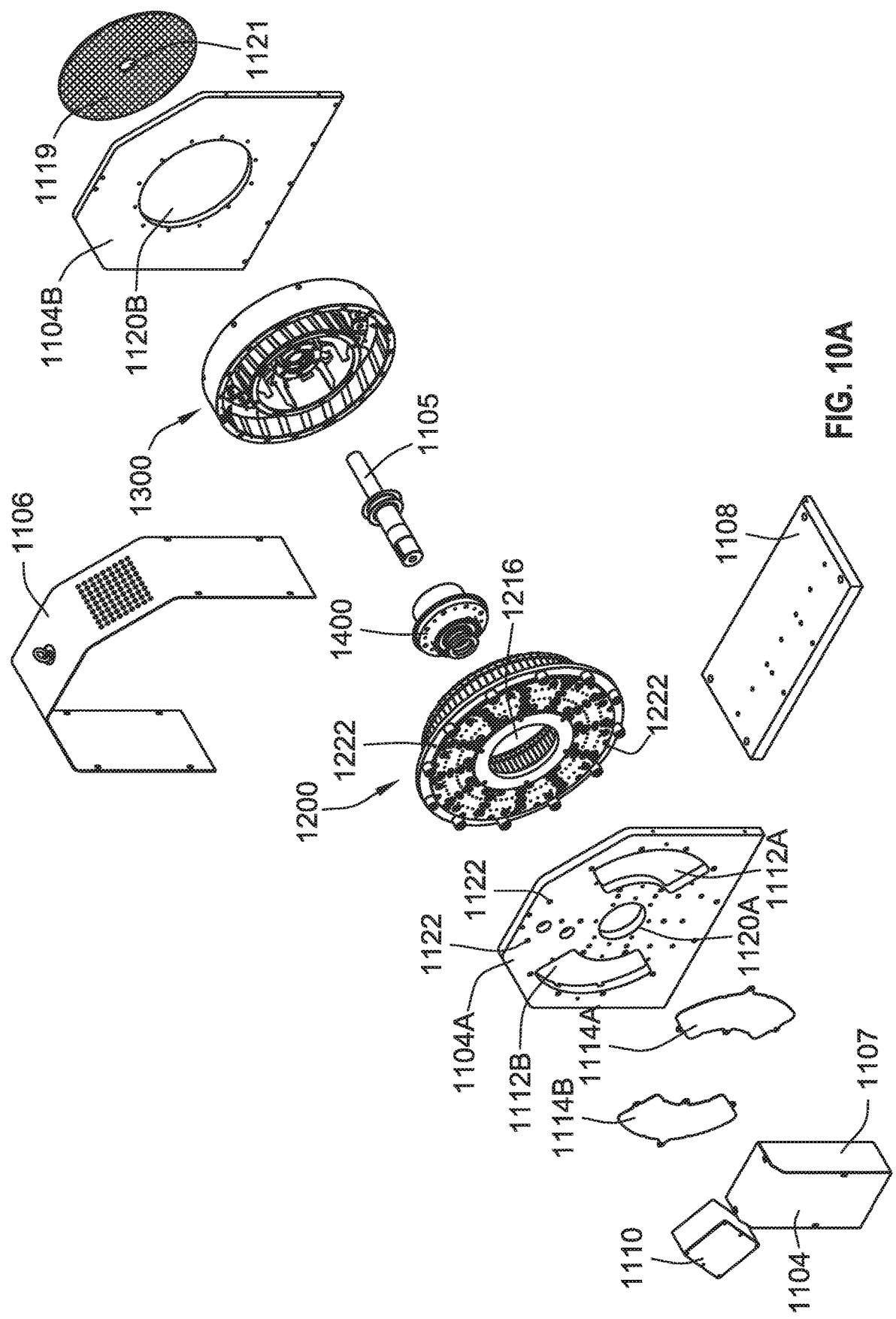

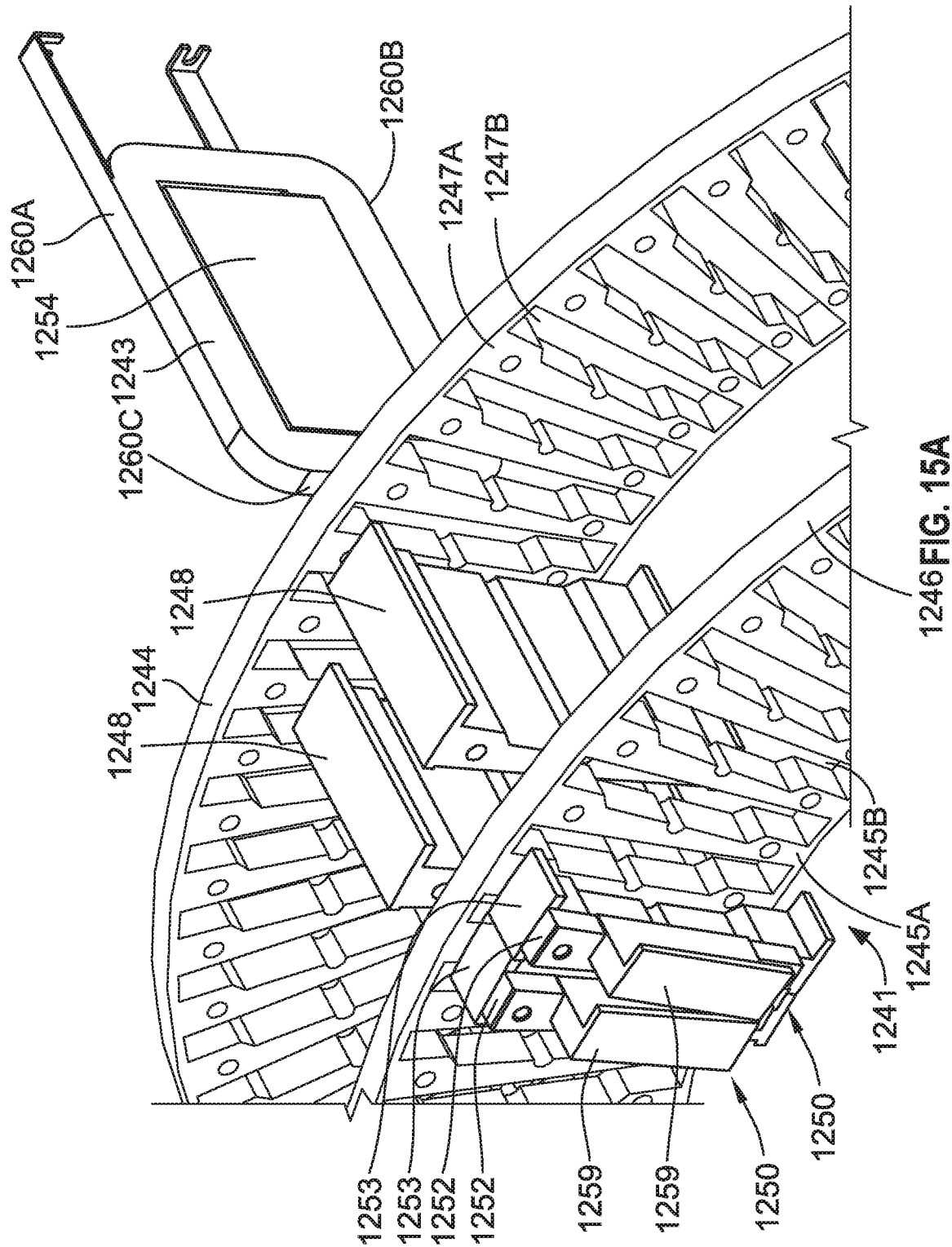

MODULAR ELECTROMAGNETIC MACHINES AND METHODS OF USE AND MANUFACTURE THEREOF

CROSS-REFERENCE TO RELATED APPLICATIONS

This application is a U.S. National Stage of International Application No. PCT/US2018/058058, filed Oct. 29, 2018, which claims priority to and the benefit of U.S. Provisional Patent Application No. 62/578,508, filed Oct. 29, 2017, each of which is hereby incorporated by reference herein in its entirety.

TECHNICAL FIELD

The present disclosure relates to electromagnetic machines used for converting electrical energy to mechanical energy, and vice-versa. More specifically, the present disclosure relates to the use of an electromagnetic machine with modular components and an access window.

BACKGROUND

Current electromagnetic machines and methods of use thereof have operational constraints limiting their utility in a variety of applications. The limitations can be traced to design, manufacturing processes and other physical constraints, such as accessing components of the electromagnetic machines for repair or modifying electromagnetic machines for new uses. New devices and methods for using those devices are needed that can improve the functional utility and customizability of electromagnetic machines for different applications. The present disclosure is directed to solving those problems, as well as solving other problems.

SUMMARY

According to aspects of the present disclosure, an electromagnetic machine comprises a housing; an axle coupled to the housing in a rotatable fashion; a stator assembly disposed generally within the housing, the stator assembly including a stator plate and a stator bearing positioned within an opening formed in the stator plate, the stator bearing being coupled to the axle such that the stator assembly is rotatable about the axle; a rotor assembly fixed to the axle and disposed generally within the housing and including a rotor housing that defines a circumferentially extending channel that is sized to receive a portion of the stator assembly therein; and a locking mechanism configured to selectively prevent and permit rotation of the stator assembly about the axle via the stator bearing.

According to further aspects of the present disclosure, an electromagnetic machine comprises a housing having an access window defined therein; an axle coupled to the housing in a rotatable fashion; a stator assembly disposed generally within the housing, the stator assembly including a plurality of coils mounted thereon; a rotor assembly disposed generally within the housing and including a rotor housing that defines a circumferentially extending channel that is sized to receive a portion of the stator assembly therein; and a locking mechanism configured to selectively prevent and permit rotation of the stator assembly about the axle via the stator bearing, wherein the access window is configured to provide access to at least one coil of the plurality of coils.

According to additional aspects of the present disclosure, a method of servicing an electromagnetic machine comprises removing an access window cover from a housing of the electromagnetic machine to provide access to a stator assembly through an access window defined in the housing; electrically disconnecting an existing coil module from a portion of a circuit board disposed on the stator assembly; removing the portion of the circuit board; replacing the at least one coil module with a new coil module; replacing the portion of the circuit board; electrically connecting the new coil module to the portion of the circuit board; coupling the access window cover to the housing of the electromagnetic machine to prevent access to the stator assembly.

According to still further aspects of the present disclosure, an electromagnetic machine comprises a housing including a first wall having a first bearing opening defined therein and the opposing second wall having a second bearing opening defined therein, the first wall further having an access window defined therein; a first bearing coupled to the first bearing opening of the first wall; a second bearing coupled to the second bearing opening of the opposing second wall; an axle coupled to the first bearing and coupled to the second bearing such that the axle is rotatable relative to the first wall and the opposing second wall of the housing; a stator assembly disposed generally between the first wall and the opposing second wall of the housing, the stator assembly including a circumferentially extending coil housing mounted to a stator plate and a stator bearing positioned within a stator opening formed in the stator plate, the stator bearing being coupled to the axle such that the stator assembly is rotatable about the axle, the stator assembly further including a plurality of coil modules mounted in the coil housing and a circuit board disposed between the first wall of the housing and the plurality of coil modules, the circuit board including a plurality of separate and distinct circuit board sections that are electrically coupled together, each of the circuit board sections being electrically connected to a respective portion of the plurality of coil modules, the circuit board being accessible through the access window defined in the first wall of the housing; a rotor assembly disposed generally between the first wall and the opposing second wall of the housing, the rotor assembly including a rotor housing that is non-rotationally coupled to the axle and defines a circumferentially extending channel, the circumferentially extending channel defining a first surface, an opposing second surface, and a third surface, the first surface and the opposing second surface being generally parallel, the third surface being generally orthogonal to the first surface and the opposing second surface and connecting the first surface to the second surface, the rotor assembly further including a plurality of magnet sets disposed within the circumferentially extending channel such that the plurality of magnet sets surround the axle in a circumferential fashion, each of the plurality of magnet sets including a first magnet coupled to the first surface defined by the channel, an opposing second magnet coupled to the opposing second surface defined by the channel, and a third magnet coupled to the third surface defined by the channel, the circumferentially extending channel being sized to at least partially receive the coil housing of the stator assembly therein such that each of the plurality of coil modules mounted in the coil housing is at least partially disposed within the circumferentially extending channel; and a locking mechanism configured to selectively prevent and permit rotation of the stator assembly about the axle via the stator bearing.

According to further aspects of the present disclosure, an electromagnetic machine comprises a housing; a bearing assembly disposed in an opening defined in the housing; a stator assembly disposed generally within the housing, the stator assembly including a stator mount defining an opening, the bearing assembly being further disposed in the opening defined by the stator mount; an axle coupled to the bearing assembly in a rotatable fashion such that the axle is rotatable relative to the housing and the stator assembly; a rotor assembly fixed to the axle and disposed generally within the housing and including a rotor housing that defines a circumferentially extending channel that is sized to receive a portion of the stator assembly therein; and a locking mechanism configured to selectively prevent and permit rotation of the stator assembly about the axle.

According to still further aspects of the present disclosure, an electromagnetic machine comprises a housing; a stator assembly disposed generally within the housing; one or more bearings disposed at least partially within the housing; an axle coupled to the one or more bearings in a rotatable fashion such that the axle is rotatable relative to the housing and the stator assembly; a rotor assembly fixed to the axle and disposed generally within the housing and including a rotor housing that defines a circumferentially extending channel that is sized to receive a portion of the stator assembly therein; and a locking mechanism configured to selectively prevent and permit rotation of the stator assembly about the axle.

According to still further aspects of the present disclosure, an electromagnetic machine comprises a housing including a first wall having a first opening defined therein and the opposing second wall, the first wall further having an access window defined therein; a stator assembly disposed generally between the first wall and the opposing second wall of the housing, the stator assembly defining a second opening therein, the stator assembly including a plurality of coil modules containing a coil and a corresponding core; a bearing assembly extending at least partially though the first opening in the first wall and the second opening in the stator assembly, the bearing assembly being non-rotationally coupled to the first wall and the stator assembly, the bearing assembly including a first bearing and a second bearing, the first bearing positioned generally coincident with the first opening in the first wall, the second bearing positioned generally between the second opening in the stator assembly and the second wall; an axle rotationally coupled to the bearing assembly such that the axle is rotatable relative to the first wall and the stator assembly; and a rotor assembly non-rotationally coupled to the axle, the rotor assembly including a plurality of magnets positioned adjacent to the plurality of coil modules.

The foregoing and additional aspects and implementations of the present disclosure will be apparent to those of ordinary skill in the art in view of the detailed description of various implementations and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 6A is an enlarged perspective view of the implementation of the coil housing of FIG. 5A, according to aspects of the present disclosure;

FIG. 10A is an exploded perspective view of the implementation of the electromagnetic machine of FIG. 9A, according to aspects of the present disclosure;

FIG. 15A is an enlarged perspective view of the implementation of the coil housing of FIG. 14A, according to aspects of the present disclosure;

Figure 1A:
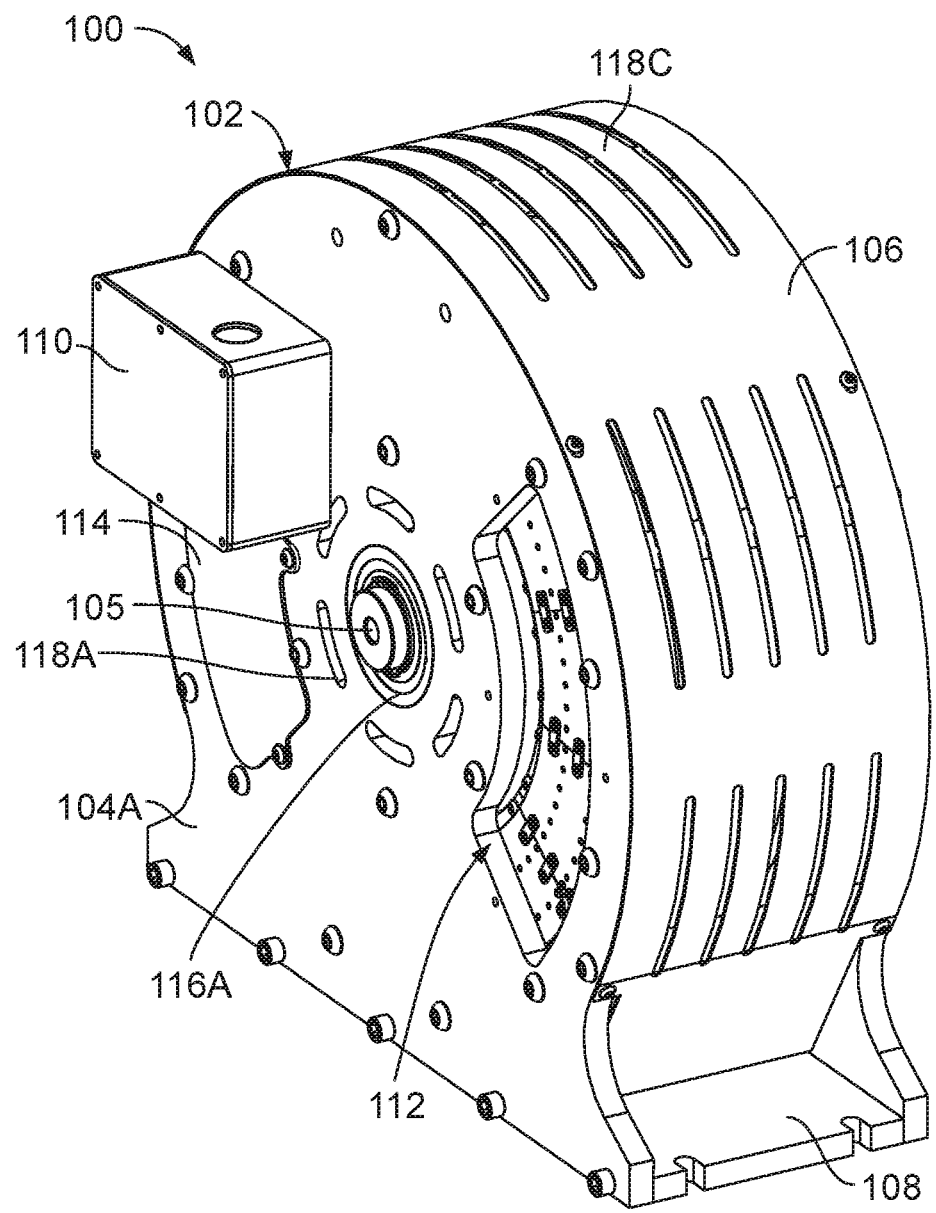
FIG. 1A is a perspective view of an implementation of an electromagnetic machine, according to aspects of the present disclosure.

While the present disclosure is susceptible to various modifications and alternative forms, specific implementations and implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

According to aspects of the present disclosure, electromagnetic machines can be used both to convert non-electrical energy into electrical energy (a generator) and to convert electrical energy into non-electrical energy (a motor). Electromagnet machines for such uses generally include a rotating component called a rotor and a stationary component called a stator. Generally, the rotor is coupled to an axle, such that rotation of the rotor causes corresponding rotation of the axle. Conversely, rotation of the axle causes corresponding rotation of the rotor. In at least some implementations, the stator can include one or more coil modules, which include a coil of wire optionally wrapped around a core. The rotor can then include one or more magnets, which can include radial magnets and axial magnets. In at least some implementations, the stator contains one or more magnets (radial and/or axial) while the rotor contains one or more coil modules. When the electromagnetic machine is used as a generator, an external component is coupled to the axle to cause rotation of the rotor. This external component can be referred to as a prime mover, and could be, for example, a turbine or a water wheel. Rotation of the prime mover causes rotation of the axle, which in turn causes the rotor to rotate relative to the stator. As the rotor rotates relative to the stator, current is induced in the coil modules, which can then optionally be used to store electrical energy in an electric storage device. When the electromagnetic machine is used as a motor, an electric power source is coupled to the coil modules. Current is caused to flow through the coil modules, which creates a magnetic field. This magnetic field interacts with the magnets disposed in the electromagnetic machine, which causes the rotor and thus the axle to rotate. The rotation of the axle can then be utilized for any suitable purpose.

Figure 1B:
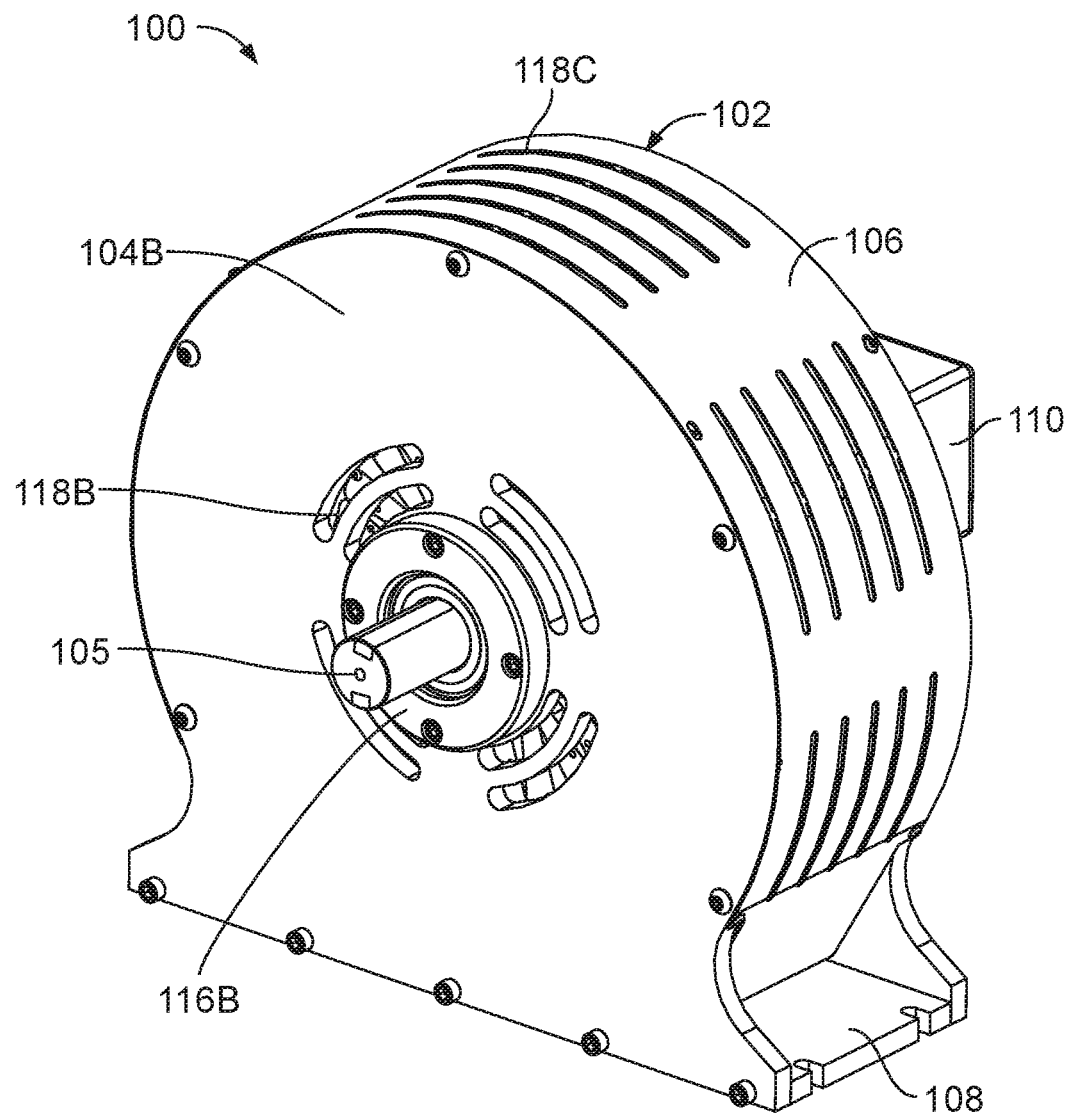
FIG. 1B is an additional perspective view of the implementation of the electromagnetic machine of FIG. 1A, according to aspects of the present disclosure.

Referring now to FIG. 1A and FIG. 1B, an exemplary electromagnetic machine 100 includes a housing 102 having a first wall 104A, a second wall 104B, a cover panel 106, and a base 108. The electromagnetic machine 100 includes a connection box 110. The connection box 110 houses electrical components that electrically connect the internal components of the electromagnetic machine 100 to an electric power source, an electric load, or an electric storage device, depending on how the electromagnetic machine is to be used. The first wall 104A of the housing 102 includes one or more access windows 112 defined therein that allow access to the internal components of the electromagnetic machine 100. The access window 112 has a surface area that is a percentage of the surface area of the first wall 104A of the housing 102 without the access window 112 defined therein. A ratio of the surface area of the access window 112 to the surface area of the first wall of the housing 102 can be between about 5% and about 50%, between about 20% and about 40%, between about 15% and about 30%, about 25%, or about 8.33%.

The first wall 104A of the housing 102 includes one or more access window covers 114 removably coupled thereto. The access window covers 114 are configured to cover the access windows 112, which prevents access to the internal components of the electromagnetic machine 100 and protects those components. Generally, each access window 112 will have a corresponding access window cover 114. The access window covers 114 can be coupled to the first wall 104A of the housing 102 in any suitable fashion, such as with screws, bolts, clips, etc. During operation of the electromagnetic machine 100, each access window cover 114 is coupled to the first wall 104A of the housing 102 such that an individual or any other object cannot contact any internal components that may be rotating, moving, energized, or otherwise in use. When the electromagnetic machine is not in use, the access window covers 114 can be removed so that the individual can safely access the internal components through the access window 112.

The first wall 104A of the housing 102 has a first opening defined therein at which a first bearing 116A is coupled. Similarly, the second wall 104B of the housing 102 has a second opening defined therein at which a second bearing 116B is coupled. An axle 105 is generally disposed through the first wall 104A and the second wall 104B, and is coupled to the first bearing 116A and the second bearing 116B such that the axle 105 is rotatable relative to the first wall 104A and the second wall 104B. The housing 102 can also have a number of air flow apertures defined therein to allow air to flow through the housing 102 during operation. For example, first wall 104A and second wall 104B can have air flow apertures 118A and 118B, respectively, defined therein. Similarly, cover panel 106 can include air flow apertures 118C. The air flow can help to cool the internal components of the electromagnetic machine 100 and keep the temperature of the machine within an acceptable range, thus allowing the electromagnetic machine 100 to be used in a wider variety of conditions and scenarios. The first wall 104A, second wall 104B, cover panel 106, base 108, and internal components can be mechanically coupled by a variety of means, such as screws, nails, bolts, pins, clips, welds, or any other suitable coupling mechanism. In an implementation, the second wall 104B is not an independent component of the housing 102. Rather, the second wall 104B can be a portion of a separate component that is coupled to the electromagnetic machine 100, such as a portion of the housing of the prime mover. In a further implementation, the second wall 104B of the housing can be an outer housing of the rotor.

Figure 2A:
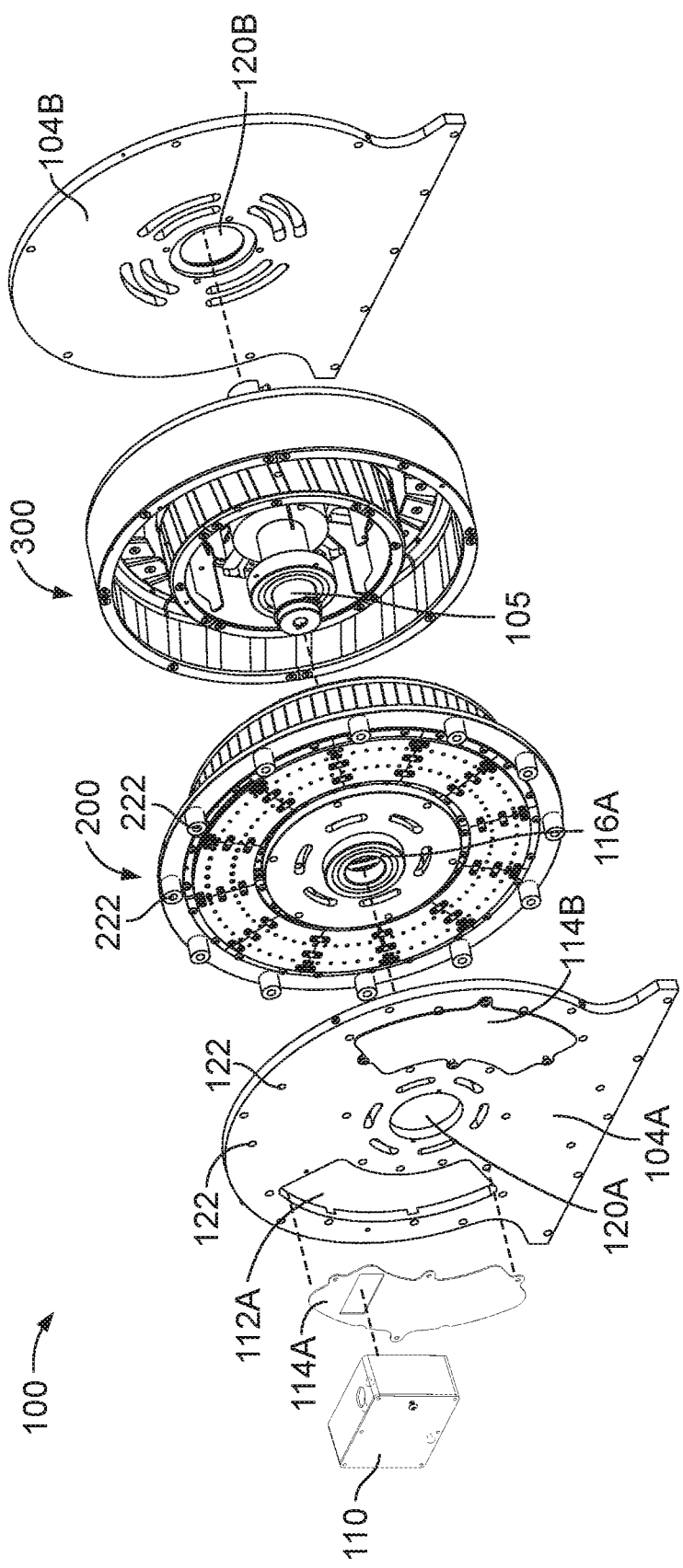
FIG. 2A is an exploded perspective view of the implementation of the electromagnetic machine of FIG. 1A, according to aspects of the present disclosure.
Figure 2B:
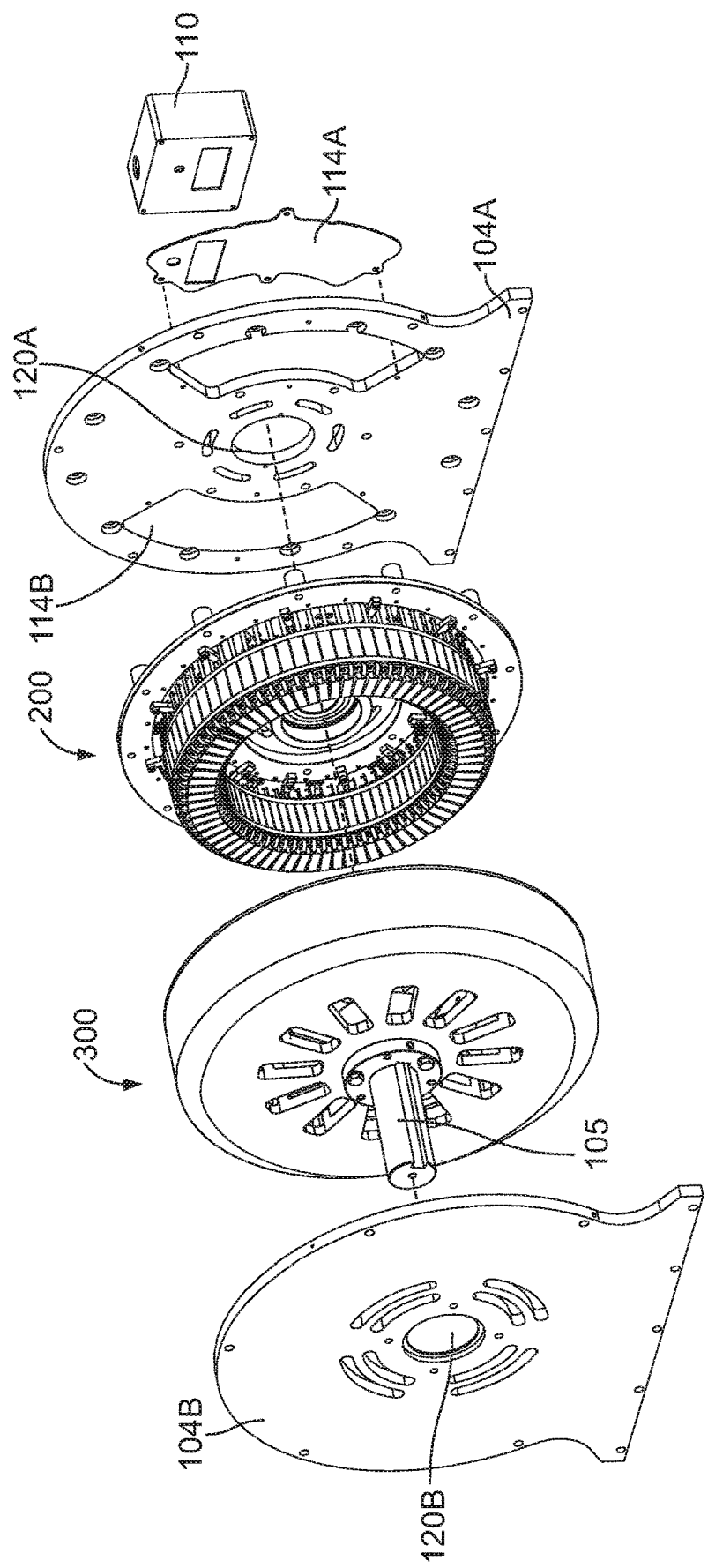
FIG. 2B is an additional exploded perspective view of the implementation of the electromagnetic machine of FIG. 1A, according to aspects of the present disclosure.

Exploded views of the electromagnetic machine of FIG. 1A and FIG. 1B are shown in FIG. 2A and FIG. 2B, respectively. The first wall 104A of the housing 102 is shown with access window cover 114A exploded from access window 112A, while access window cover 114B remains attached to the first wall 104A of the housing 102. The first bearing opening 120A is defined in the first wall 104A of the housing 102. The second bearing opening 120B is defined in the second wall 104B of the housing 102. The internal components of the electromagnetic machine 100 include a stator assembly 200 and a rotor assembly 300, which includes the axle 105. The stator assembly is disposed generally between the first wall 104A and the rotor assembly 300, while the rotor assembly is disposed generally between the stator assembly 200 and the second wall 104B.

In an implementation of the electromagnetic machine 100, the stator assembly 200 includes one or more coil modules, which include coils of wire that are wrapped around a permeable core of magnetic material, while the rotor assembly 300 includes one or more magnets configured to be disposed adjacent to the coils of wire when the electromagnetic machine 100 is in use. In another implementation, the stator assembly 200 includes the magnets while the rotor assembly 300 contains the coil modules. As will be described in more detail herein, the rotor assembly 300 generally defines a channel around which the magnets are disposed. During operation of the electromagnetic machine 100, the coil modules that are attached to the stator assembly 200 are disposed within the channel defined by the rotor assembly 300.

The first wall 104A of the housing 102 includes one or more housing locking apertures 122 defined therein. Similarly, the stator assembly 200 includes one or more stator assembly locking apertures 222 defined therein. Each of the housing locking apertures 122 and the stator assembly locking apertures 222 are sized such that a locking mechanism may be removably inserted therethrough to prevent the rotation of the stator assembly about the axle via the stator bearing. During operation of the electromagnetic machine 100, the stator assembly 200 can be locked into place to prevent any unnecessary or undesired movement. When the electromagnetic machine 100 needs to be serviced, the locking mechanism can be removed from the housing locking apertures 122 and the stator assembly locking apertures 222 to allow the stator assembly to be rotated until a desired portion of the stator assembly is accessible through the access windows. The locking mechanism can be, for example, a bolt, a pin, a spring-loaded pin, or a linearly actuated pin. In other implementations, locking mechanisms that do not utilize apertures defined in the housing and the stator could be used, such as clips or fasteners. While the figures show potential locations of the housing locking apertures 122 and the stator assembly locking apertures 222, these apertures can be defined anywhere on the electromagnetic machine 100 as long as a locking mechanism can be inserted through both apertures to thereby prevent rotation of the stator assembly relative to the housing.

Figure 3A:
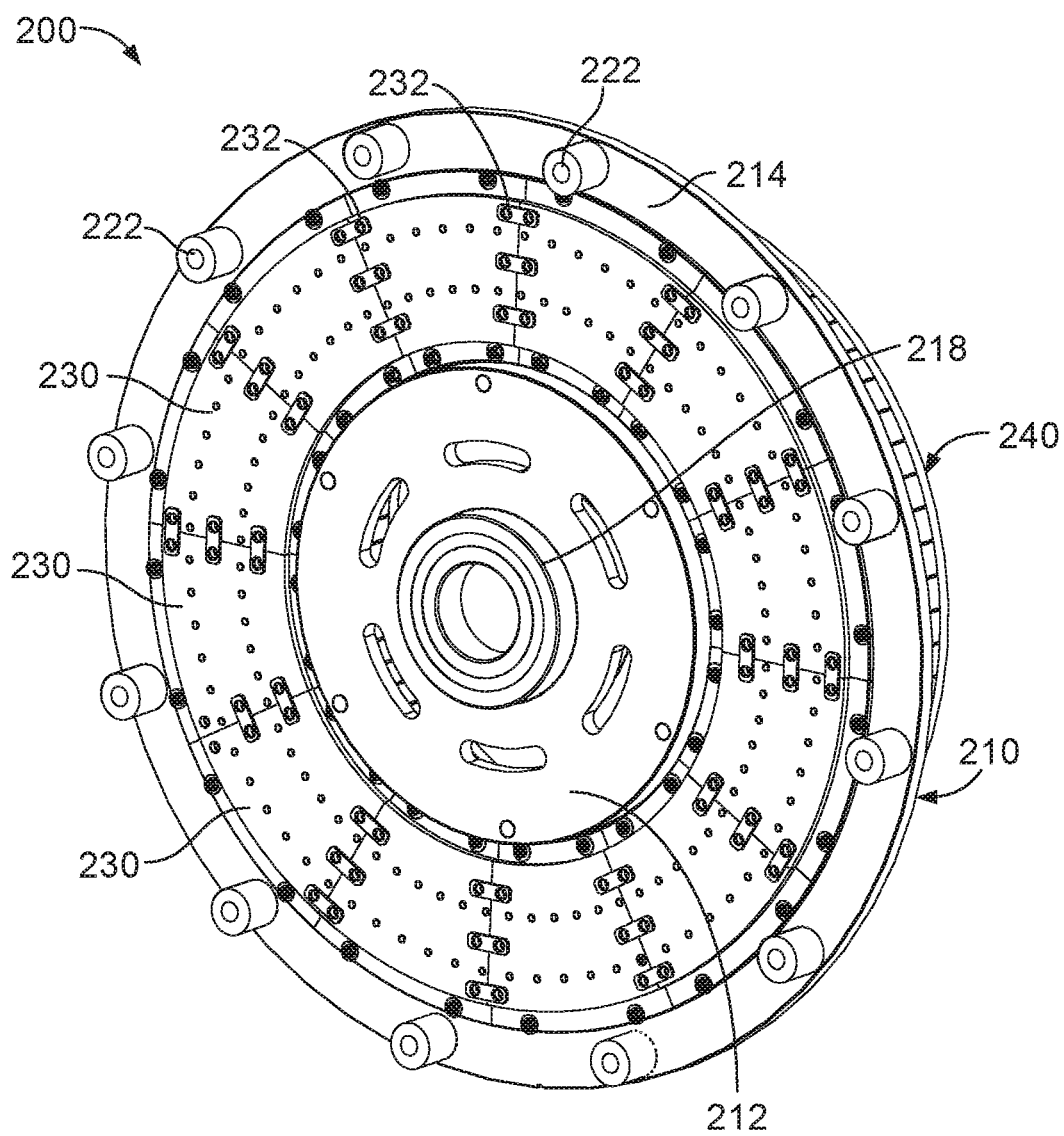
FIG. 3A is a perspective view of an implementation of a stator assembly, according to aspects of the present disclosure.
Figure 3B:
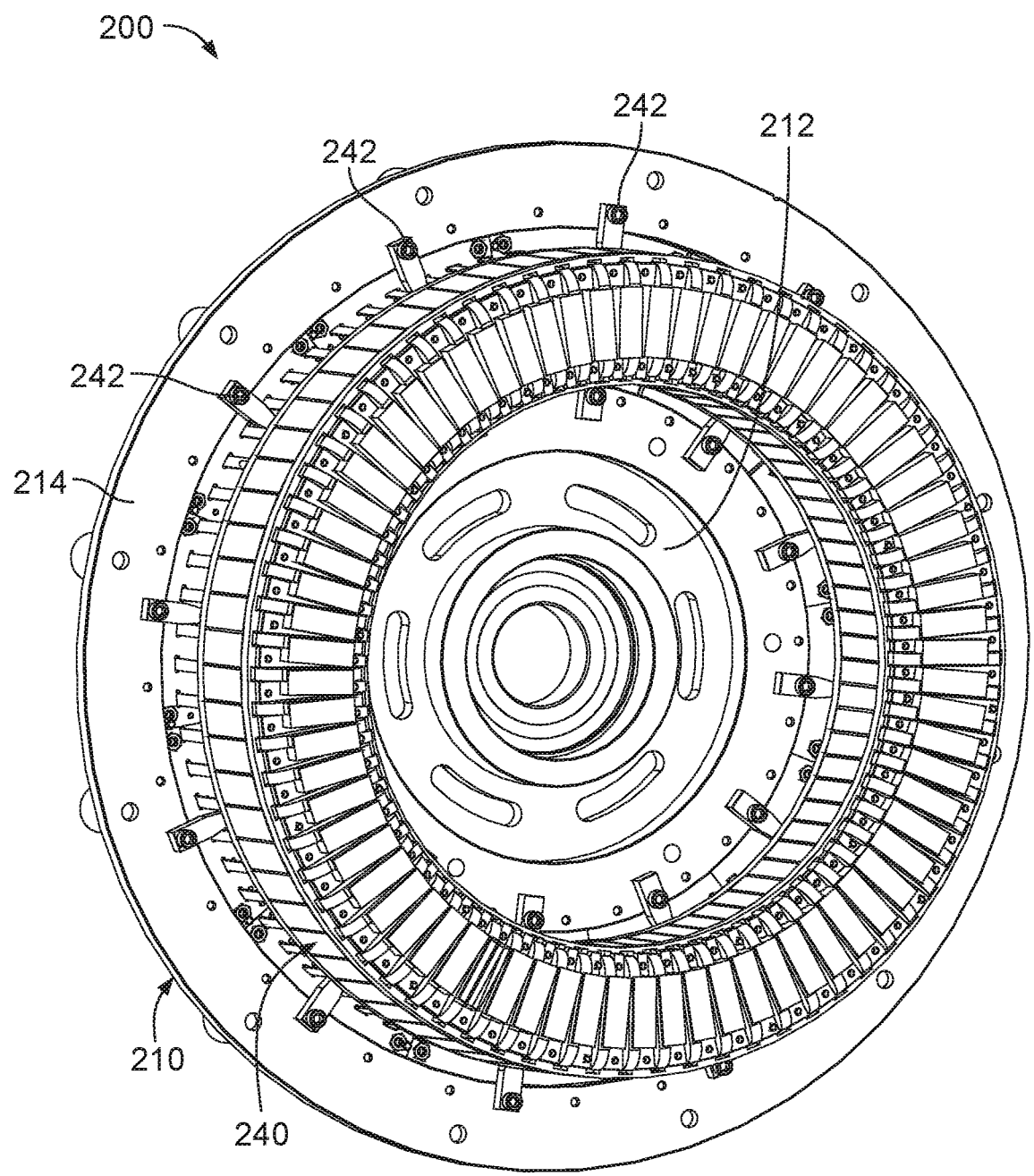
FIG. 3B is an additional perspective view of the implementation of the stator assembly of FIG. 3A, according to aspects of the present disclosure.
Figure 3C:
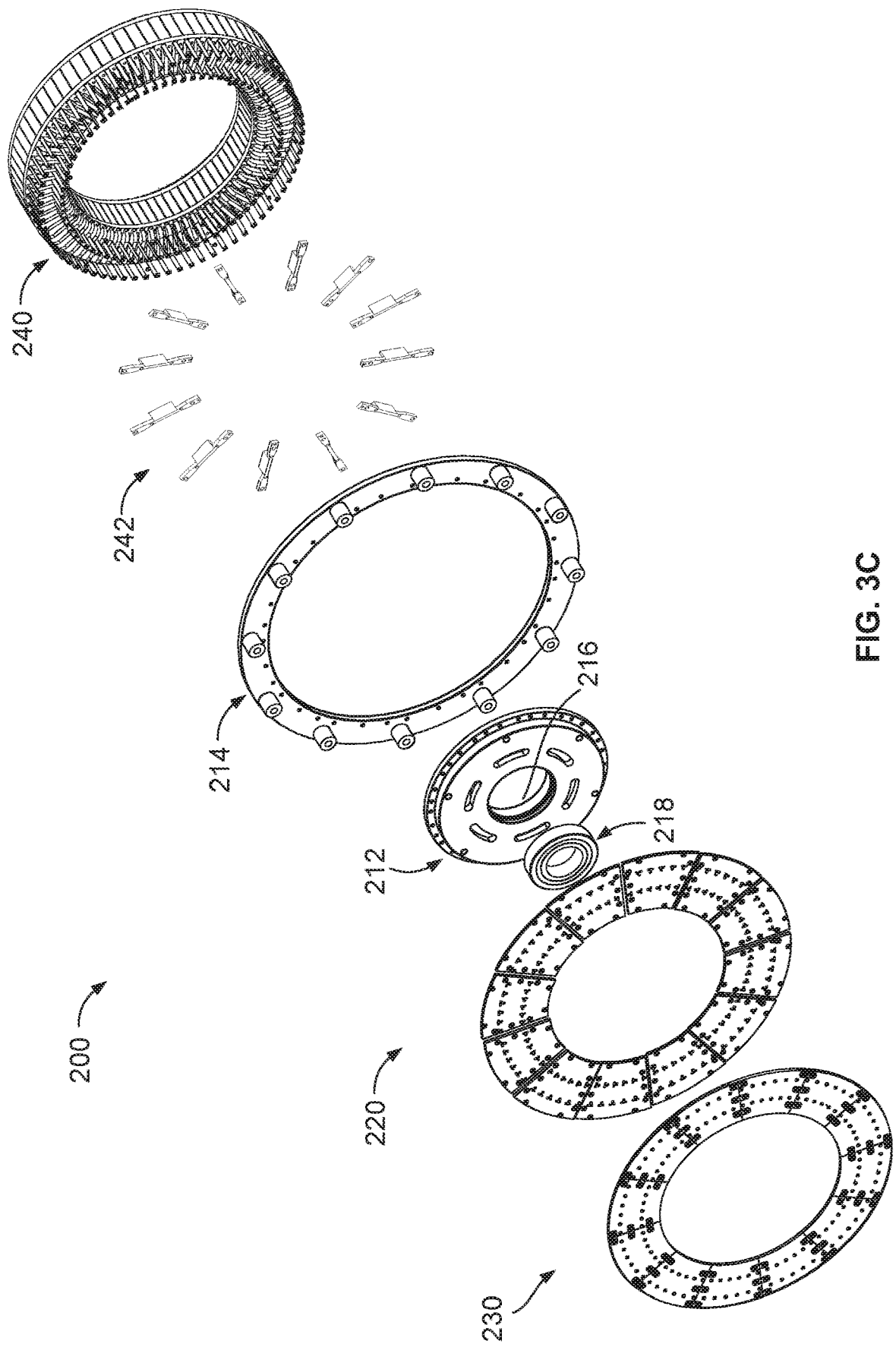
FIG. 3C is an exploded perspective view of the implementation of the stator assembly of FIG. 3A, according to aspects of the present disclosure.
Figure 3D:
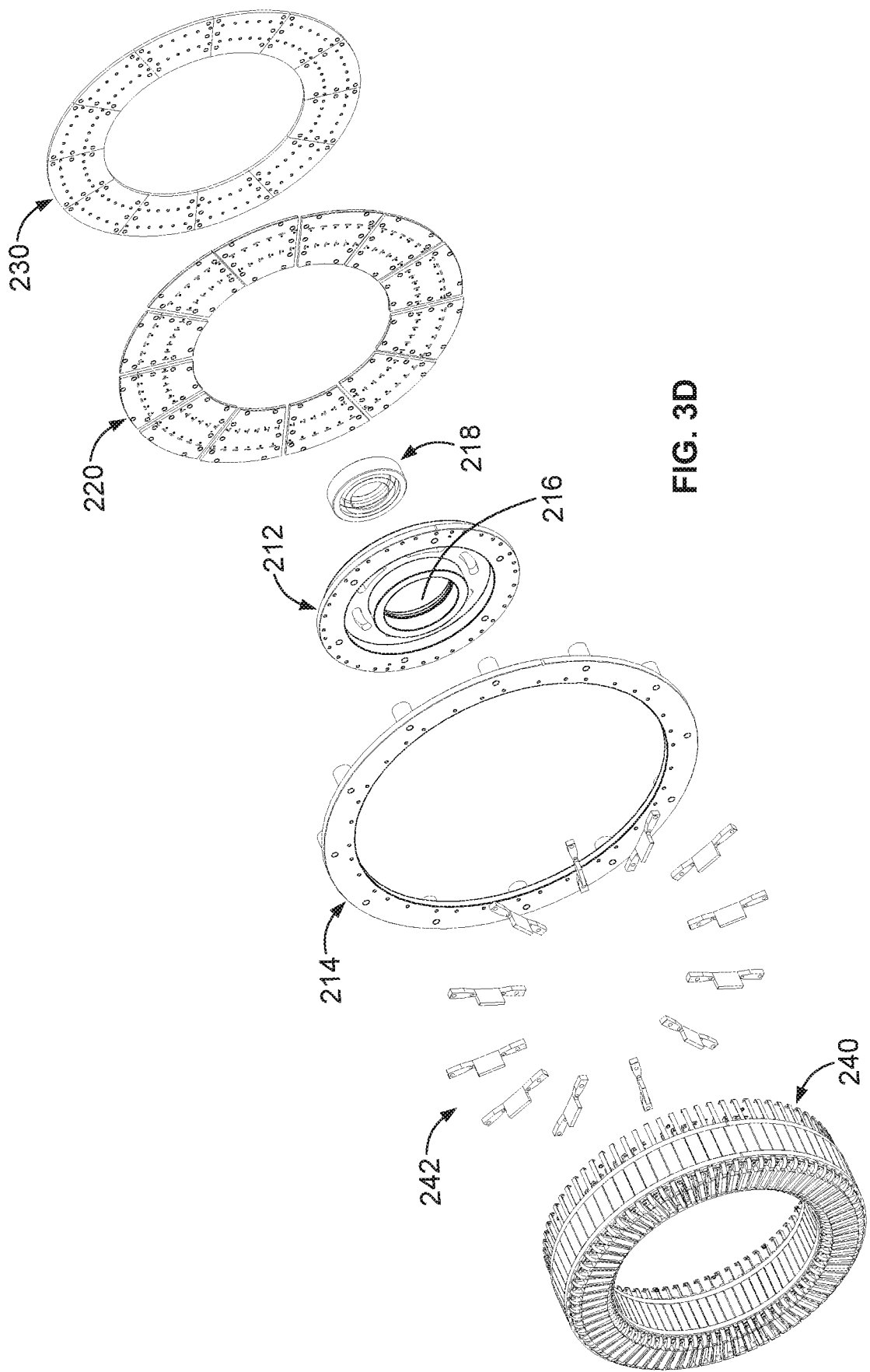
FIG. 3D is an additional exploded perspective view of the implementation of the stator assembly of FIG. 3A, according to aspects of the present disclosure.

FIGS. 3A and 3B illustrates perspective views of the stator assembly 200, while FIG. 3C and FIG. 3D illustrate exploded views of the stator assembly 200 of FIG. 3A and FIG. 3B, respectively. The stator assembly 200 generally includes a stator plate 210, a circuit board 230, and a coil housing 240 mounted to the stator plate 210. The coil housing 240 includes slots in which the coil modules may be disposed during operation of the electromagnetic machine 100. The stator plate 210 generally includes a stator plate hub 212 and a circumferentially extending stator plate ring 214. The stator plate hub 212 has a stator bearing opening 216 defined therein. A stator bearing 218 is coupled to the stator bearing opening 216. When the components of the electromagnetic machine 100 are assembled, the stator bearing 218 allows the stator assembly 200 to rotate relative to the axle 105. Similarly, the stator bearing 218 allows the axle 105 to rotate relative to the stator assembly 200. The stator assembly locking apertures 222 are defined in the stator plate ring 214. Stator bearing 218 may be removably coupled to the stator bearing opening 216, and thus may be movable along the axle 105 to allow for down-time repairs of the electromagnetic machine 100.

For example, if the first bearing 116A fails, the axle may become insufficiently supported by the first bearing 116A, which could allow the axle 105 or the rotor assembly 300 come into contact with the housing 102 or the stator assembly 200. Normally, the machine would need to be shut down until a replacement part was procured and coupled to the first bearing opening 120A to thus support the axle 105. However, the stator bearing 218 of the electromagnetic machine 100 is movable between a first position and a second position. In the first position, the stator bearing 218 is disposed at least partially within the stator bearing opening 216 to thus support the stator. In the second position, the stator bearing 218 is disposed at least partially within the first bearing opening 120A defined in the first wall 104A of the housing 102. In this second position, the stator bearing 218 supports the axle 105 and prevents the axle 105 from coming into contact with any other components of the electromagnetic machine 100. In an implementation, a depth of the stator bearing 218 is less than the shortest distance between the first bearing opening 120A and the stator bearing opening 216. In this implementation, the first bearing 116A must remain at least partially within the first bearing opening 120A to support the axle 105 until the stator bearing is disposed at least partially within the first bearing opening 120A. In another implementation, the depth of the stator bearing 218 is greater than the shortest distance between the first bearing opening 120A and the stator bearing opening 216, and thus is able to be at least partially disposed within both the first bearing opening 120A and the stator bearing opening 216.

The stator plate 210 further includes a circumferentially extending alignment plate 220 (FIGS. 3C and 3D) that is disposed at least partially between the stator plate hub 212 and the stator plate ring 214. Alignment plate 220 has a generally circular shape with an opening defined in the center thereof, and thus has an inner periphery and an outer periphery. The inner periphery of the alignment plate 220 overlaps with and is coupled to a periphery of the stator plate hub 212, while the outer periphery of the alignment plate 220 overlaps with and is coupled to an inner periphery of the stator plate ring 214. In an implementation, the alignment plate 220 is modular and is formed from a plurality of separate and distinct alignment plate sections that are disposed about the stator plate hub 212. In another implementation, the alignment plate 220 is a single unitary piece.

The circuit board 230 is coupled to and generally overlaps with the alignment plate 220. Similar to the alignment plate 220, the circuit board 230 can be modular and thus can be formed from a plurality of separate and distinct circuit board sections. Each of the circuit board section can correspond to one of the alignment plate sections. The circuit board sections can be electrically connected together by one or more circuit board jumpers 232, and are generally attached to the alignment plate sections via fasteners, such as screws, rods, pins, etc. In another implementation, the circuit board 230 is a single unitary piece. The electrical connections between the circuit board 230 can be designed in any manner required for the specific application of the electromagnetic machine 100, and may be replaced from time to time as application requirements change. As will be described in more detail herein, the alignment plate 220 is used to align the electrical leads from the coil modules with the circuit board sections, and to assist in maintaining contact between the electrical leads from the coil modules and the circuit board 230.

The stator plate hub 212 is connected to the stator plate ring 214 via one or more stator plate mounting brackets 242. Each stator plate mounting bracket 242 has a first end coupled to the stator plate hub 212 and a second end coupled to the stator plate ring 214. The stator plate mounting brackets 242 also couple to the coil housing 240, thus coupling the coil housing 240 to the stator plate 210. The stator plate mounting brackets 242 may be coupled to the other component using any suitable mechanism, such as screws, pins, bolts, etc.

Figure 4:
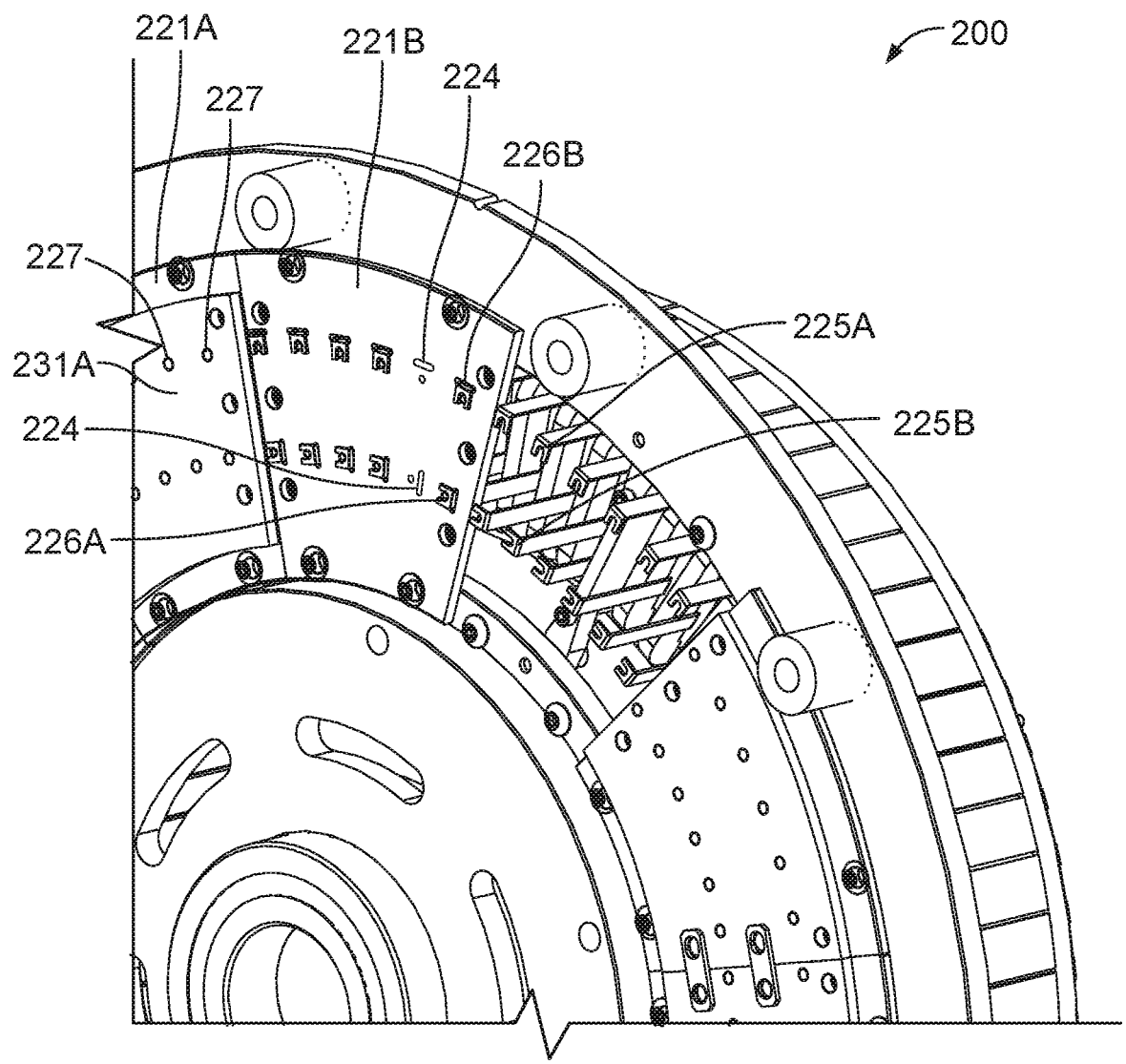
FIG. 4 is an enlarged perspective view of the implementation of the stator assembly of FIG. 3A, according to aspects of the present disclosure.

The arrangement between the coil modules, the circuit board, and the alignment plate is illustrated in FIG. 4. FIG. 4 illustrates three portions 201A, 201B, and 201C of the stator assembly 200. The first portion 201A includes circuit board section 231A and an underlying alignment plate section 221A underneath the circuit board section 231A. The second portion 231B shows the circuit board section removed, leaving only the underlying alignment plate section 221B. The third portion 201C shows both the circuit board section and the underlying alignment plate section removed. As shown, each of the plurality of coil modules includes two coil leads 225A and 225B extending out of the coil housing toward the alignment plate and the circuit board. As shown with alignment plate section 221A, each alignment plate section includes a set of alignment plate coil lead apertures 224 that are configured to receive the coil leads 225A and 225B of each of the coil modules. In an implementation, the coils leads 225A, 225B are configured to extend out of the alignment plate coil lead apertures 224 and be bent at approximately a ninety degree angle, thus leaving terminating ends 226A, 226B of the coil leads 225A, 225B flush with the surface of the alignment plate section 221A.

As shown with respect to the first portion 201A, the circuit board sections are disposed directly on top of the alignment plate sections, thus sandwiching the terminating ends 226A, 226B of the coil leads 225A, 225B between the alignment plate section and the circuit board section. In this configuration, the terminating ends 226A, 226B of the coil leads 225A, 225B contact the circuit board at respective circuit board contact areas, thus electrically connecting the coil modules to the circuit boards. The alignment plate sections help to align the terminating ends 226A, 226B of the coil leads 225A, 225B with the appropriate circuit board contact area. The pressure on the terminating ends 226A, 226B of the coil leads 225A, 225B also helps to maintain the electrical connection between the coil modules and the circuit board. In an implementation, each circuit board section has a plurality of circuit board coil lead apertures 227 defined therein that correspond to the plurality of the alignment plate coil lead apertures 224. In this implementation, an alignment component, such as a screw, bolt, pin, clamp, etc., can be inserted through the circuit board coil lead apertures 227 and the alignment plate coil lead apertures 224. This serves both to couple the circuit board section and the alignment plate section together, and to assist in completing and maintaining the electrical connection between the coil leads 225A, 225B and the circuit board section. The alignment component can be electrically conductive and can be configured to contact both the circuit board when disposed through the circuit board coil lead apertures, and the terminating ends 226A, 226B of the coil leads 225A, 225B, thus helping to ensure that the coil leads 225A, 225B are electrically connected to the circuit board.

Figure 5A:
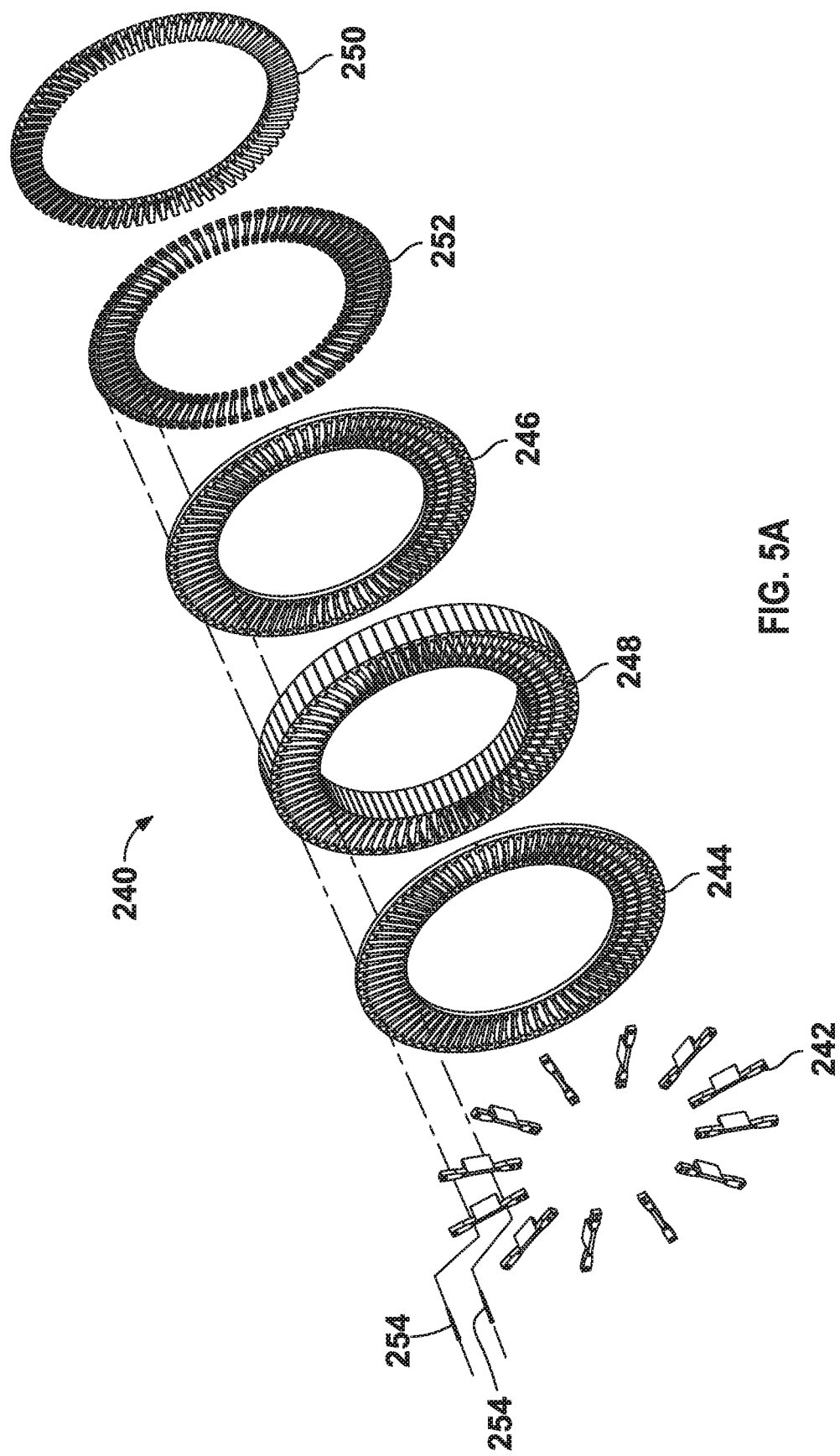
FIG. 5A is an exploded perspective view of an implementation of a coil housing, according to aspects of the present disclosure.
Figure 5B:
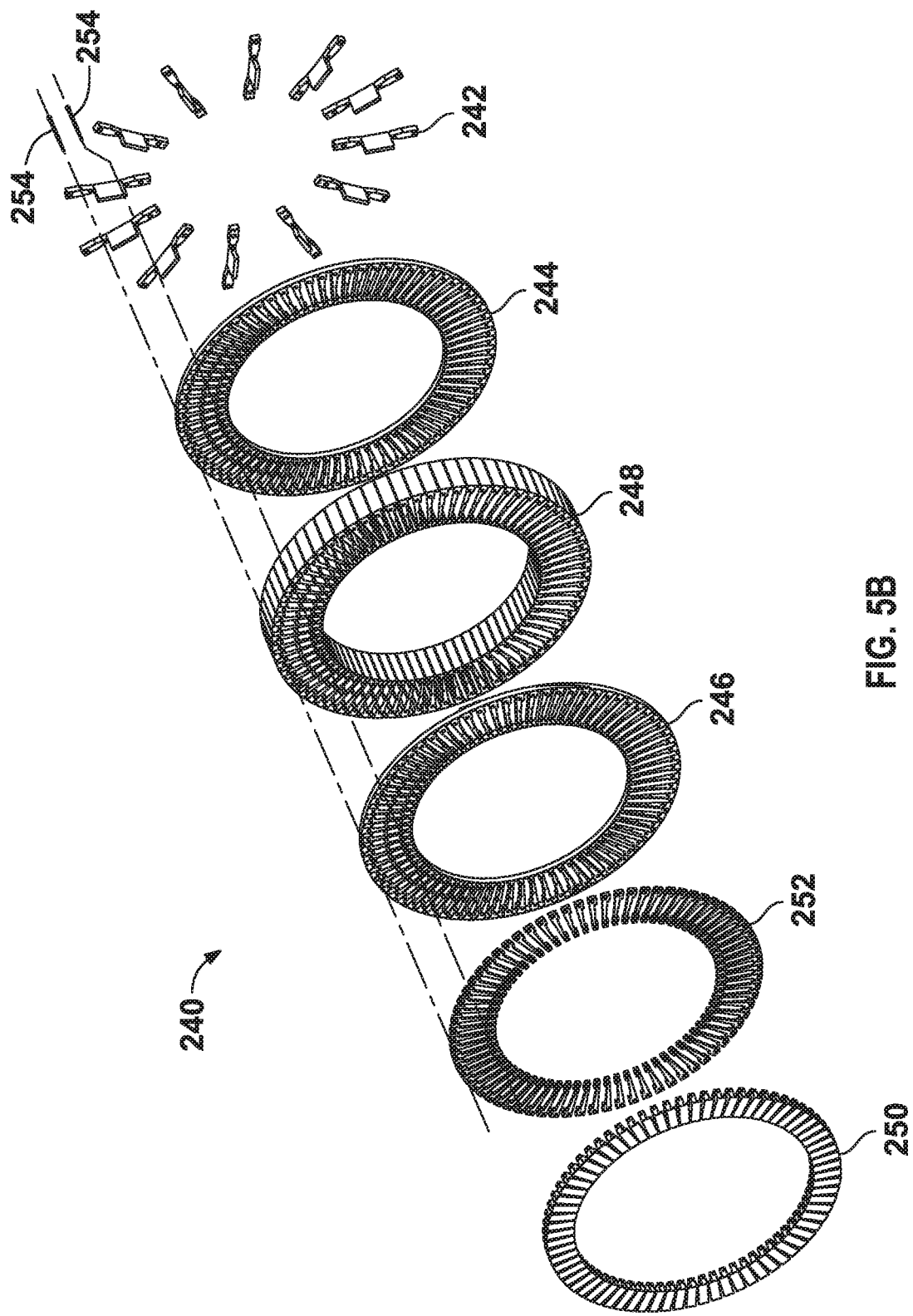
FIG. 5B is an additional exploded perspective view of the implementation of the coil housing of FIG. 5A, according to aspects of the present disclosure.

Referring now to FIG. 5A and FIG. 5B, the coil housing 240 includes a first coil housing ring 244 and a second coil housing ring 246. The coil housing rings 244, 246 define the slots into which the coils 243 and the corresponding permeable coil cores 251 (see FIGS. 6A and 6B) are inserted. The coil housing 240 further includes a plurality of independent core modules 248 that are disposed between the first coil housing ring 244 and the second coil housing ring 246. A plurality of backing components 250 are also disposed on a side of the coil housing 240 opposite the side of the coil housing 240 where the coils 243 are inserted. The coil housing includes one or more of the stator plate mounting brackets 242 coupled thereto, as well as one or more coil housing mounting brackets 252 disposed on an opposite side of the coil housing 240 from the stator plate mounting brackets 242.

A plurality of coil housing mounting components 254 are configured to couple each of the stator plate mounting brackets 242 to a corresponding one of the coil housing mounting brackets 252 or to the first coil housing ring 244, providing tension that holds all components of the coil housing 240 in position. The coil housing mounting components 254 generally include an inner set of coil housing mounting components and an outer set of coil housing mounting components. Each coil housing mounting component 254 of the outer set is configured to extend (i) from the outer periphery of one of the stator plate mounting brackets 242, (ii) through the outer periphery of the first coil housing ring 244, the outer periphery of one of the independent core modules 248, and the outer periphery of the second coil housing ring 246, and to (iii) the outer periphery of one of the coil housing mounting brackets 252. Similarly, each coil housing mounting component 254 of the inner set is configured to extend (i) from the inner periphery of one of the stator plate mounting brackets 242, (ii) through the inner periphery of the first coil housing ring 244, the inner periphery of one of the independent core modules 248, and the inner periphery of the second coil housing ring 246, and to (iii) the inner periphery of one of the coil housing mounting brackets 252. Generally, each of the coil housing mounting components 254 are bolts, pins, screws, etc. Thus, the various components of the coil housing 240 are coupled together, and the coil housing 240 is coupled to the stator plate 210 via the stator plate mounting brackets 242.

Figure 6B:
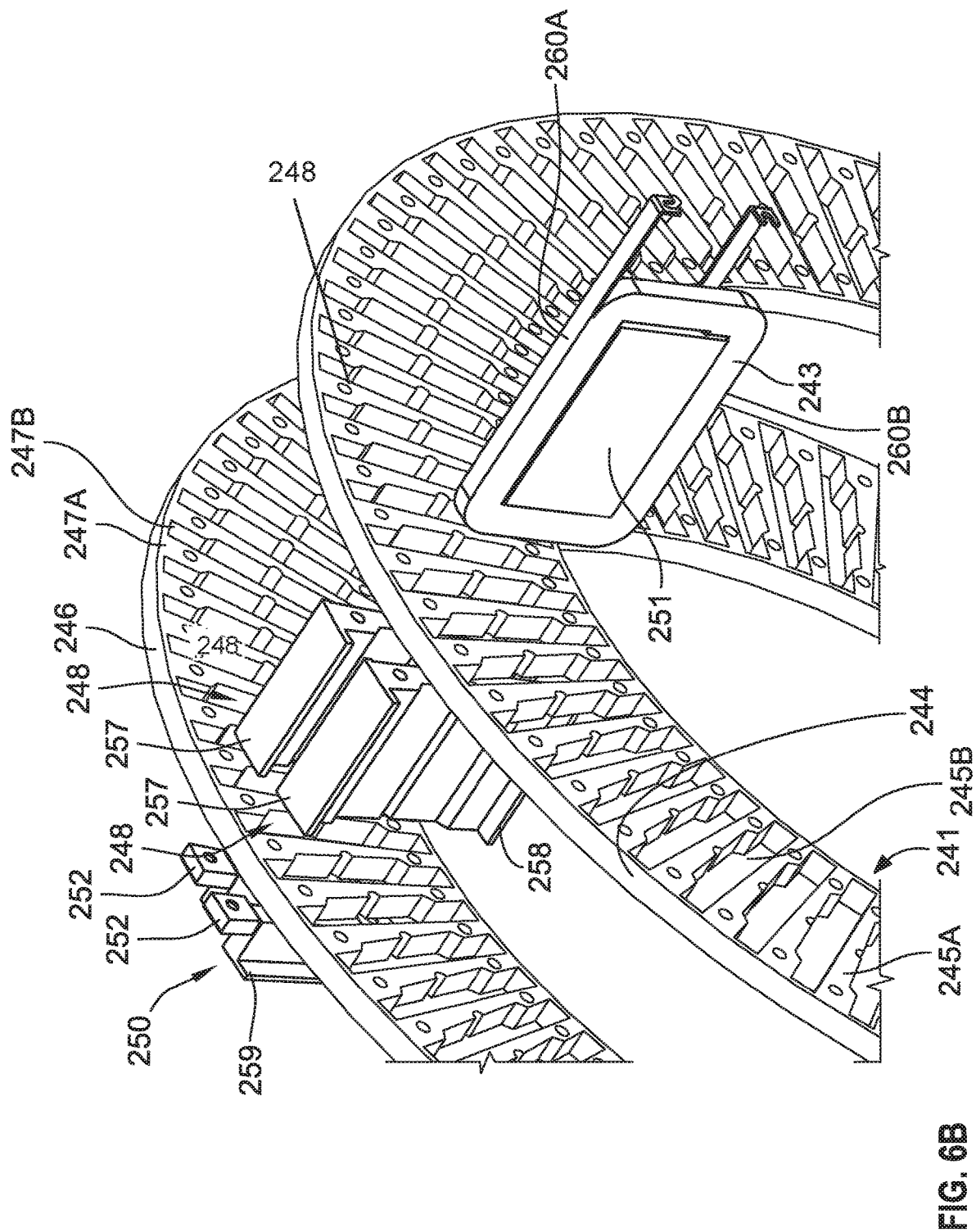
FIG. 6B is an additional enlarged perspective view of the implementation of the coil housing of FIG. 5A, according to aspects of the present disclosure.

Detailed views of the coil housing 240 are illustrated in FIG. 6A and FIG. 6B. Various portions of the components of the coil housing 240 have been removed from the figures to show internal details. As shown, each coil 243 includes a corresponding permeable coil core 251. In this manner, each coil 243 is wound around its own individual core 251. The coil cores 251 can be made of a ferromagnetic material, such as laminated electrical steel. In some implementations, each individual core 251 are configured to be disposed completely within its corresponding coil 243. In other implementations, each individual core 251 is disposed partially within its corresponding coil 243 such that at least a portion of each core 251 extends outside of the bounds of its corresponding coil 243. In some implementations, each coil 243 can have a generally rectangular shape that includes a first side surface 260A, a second side surface 260B, and a third side surface 260C. The cores 251 can have a similar generally rectangular shape. Other shapes for the coils 243 and the cores 251 are also contemplated.

The coil housing 240 includes the first coil housing ring 244 and the second coil housing ring 246. Each of these coil housing rings can be made of a ferromagnetic material such as laminated electrical steel. Both of the coil housing rings 244, 246 are generally circular shaped and have an inner periphery and an outer periphery. The first coil housing ring 244 includes a plurality of repeating columns 245A connecting the inner periphery and the outer periphery of the first coil housing ring 244. The first coil housing ring also defines a plurality of gaps 245B. Each gap 245B is defined between adjacent columns 245A and is sized such that the coils fit through the gaps 245B.

Similarly, the second coil housing ring 246 also includes a plurality of repeating columns 247A connecting the inner periphery and the outer periphery of the second coil housing ring 246. The second coil housing ring 246 defines a plurality of gaps 247B. Each gap 247B is defined between adjacent columns 247A and is sized such that the coils 243 fit through the gaps 247B. The gaps 245B defined in the first coil housing ring 244 and the gaps 247B defined in second coil housing ring 246 overlap, and thus the first coil housing ring 244 and the second coil housing ring 246, when assembled as part of the coil housing 240, define the plurality of slots 241 which are sized to receive a plurality of coils 243, each slot 241 receiving a single coil 243.

FIGS. 6A and 6B show two of the independent core modules 248 that are disposed between the first coil housing ring 244 and the second coil housing ring 246. The independent core modules 248 can be made of a ferromagnetic material similar to the other components of the coil housing 240, such as laminated electrical steel. The independent core modules 248 are disposed between the first coil housing ring 244 and the second coil housing ring 246 such that an end of each of the independent core modules 248 adjacent the first coil housing ring 244 abuts one of the columns 245A, while an opposing end of each of the independent core modules 248 adjacent the second coil housing ring 246 abuts a corresponding one of the columns 247A. The independent core modules 248 are disposed in areas between the first coil housing ring 244 and the second coil housing ring 246 that would otherwise be empty space between adjacent coils 243. Thus, when the coil 243 and corresponding core 251 of FIGS. 6A and 6B is received within the slots 241 of the coil housing 240, the coil 243 and corresponding core 251 will be disposed between the pair of independent core modules 248 that are illustrated in FIGS. 6A and 6B. When the electromagnetic machine 100 is fully assembled, each coil 243-core 251 combination will be disposed between a pair of adjacent independent core modules 248.

In some implementations, each of the independent core modules 248 includes an outer radial lip 257 and in inner radial lip 258. The outer radial lip 257 of each of the independent core modules 248 is configured to extend over the first side surface 260A of a corresponding one of the coils 243. Similarly, the inner radial lip 258 of each of the independent core modules 248 is configured to extend over the second side surface 260B of a corresponding one of the coils 243. The presence of the radial lips 257, 258 reduces or eliminates any gaps between the side surfaces 260A, 260B of the coils 243 and the radial magnets of the electromagnetic machine 100. This helps to channel magnetic flux from the radial magnets to the coils 243 more efficiently.

The plurality of backing components 250 and the plurality of coil housing mounting brackets 252 are disposed on a side of the coil housing 240 opposing the stator plate 210. The backing components 250 can be made of a ferromagnetic material similar to other components of the coil housing 240, such as laminated electrical steel. Each of the backing components 250 has a groove defined therein that is configured to mate with an edge of a corresponding coil housing mounting bracket 252 such that the backing components 250 and the coil housing mounting brackets 252 interlock with each other. Each backing component 250 includes an axial lip 259 that is configured to extend over the third side surface 260C of a corresponding one of the coils 243. The axial lips 259 of the backing components 250 reduce or eliminate any gaps between the third side surface 260C and the axial magnets of the electromagnetic machine 100. This helps to channel magnetic flux from the axial magnets to the coils 243 more efficiently.

The ferromagnetic components of the coil housing 240 can include the first coil housing ring 244, the second coil housing ring 246, the independent core modules 248, the backing components 250, and the coil cores 251. All of the components of the coil housing 240 can be high permeability materials with low hysteresis and related core losses, which may be utilized to maximize the strength of the magnetic field in the region of the coil housing 240.

The combination of the access windows defined in the housing of the electromagnetic machine, the stator being coupled to the axle via the independent stator bearing, the circuit board and alignment plate being formed in sections, and the coil modules being housed in individual slots within the coil housing allows the electromagnetic machine to be a modular machine where individual coil modules can be replaced, repaired, or upgraded without having to take apart or disassemble the entire machine. The circuit board sections can be easily swapped out to wire the coil modules in different arrangements, thus allowing the electromagnetic machine to be used in a wide variety of applications. By providing the access windows in the housing, an individual is able to access the internal components of the electromagnetic machine without removing the entirety of the housing.

This has the added benefit of maintaining alignment between the rotor and the stator. Moreover, the coil modules are simply inserted into individual slots defined in the coil housing for operation, and thus are easy to remove from the electromagnetic machine.

Once the access window cover has been removed, the individual can deactivate the locking mechanism to allow the stator assembly to rotate about the stator bearing relative to the housing. The individual can then rotate the stator assembly until the circuit board section or coil modules that needs to be addressed is accessible through the window. Because the circuit board can be formed in separate and distinct sections, only a single circuit board section needs to be removed to access any of the coil modules underneath. Thus, rather than having to electrically disconnect all of the coils of the electromagnetic machine to replace a single coil module, the individual only has to electrically disconnect the coil modules connected to the single circuit board segment. In an implementation, the electromagnetic machine includes seventy-two coil modules circumferentially arranged in the stator and twelve circuit board sections. Thus, each circuit board section is directly electrically connected to only six coils, which reduces the number of coils that need to be detached to remove a circuit board segment from seventy-two coils to six coils. In other implementations, the electromagnetic machine includes 12, 36, 144, or any other number of coil modules, and 3, 4, 6, 24, or any other number of circuit board sections.

Figure 7A:
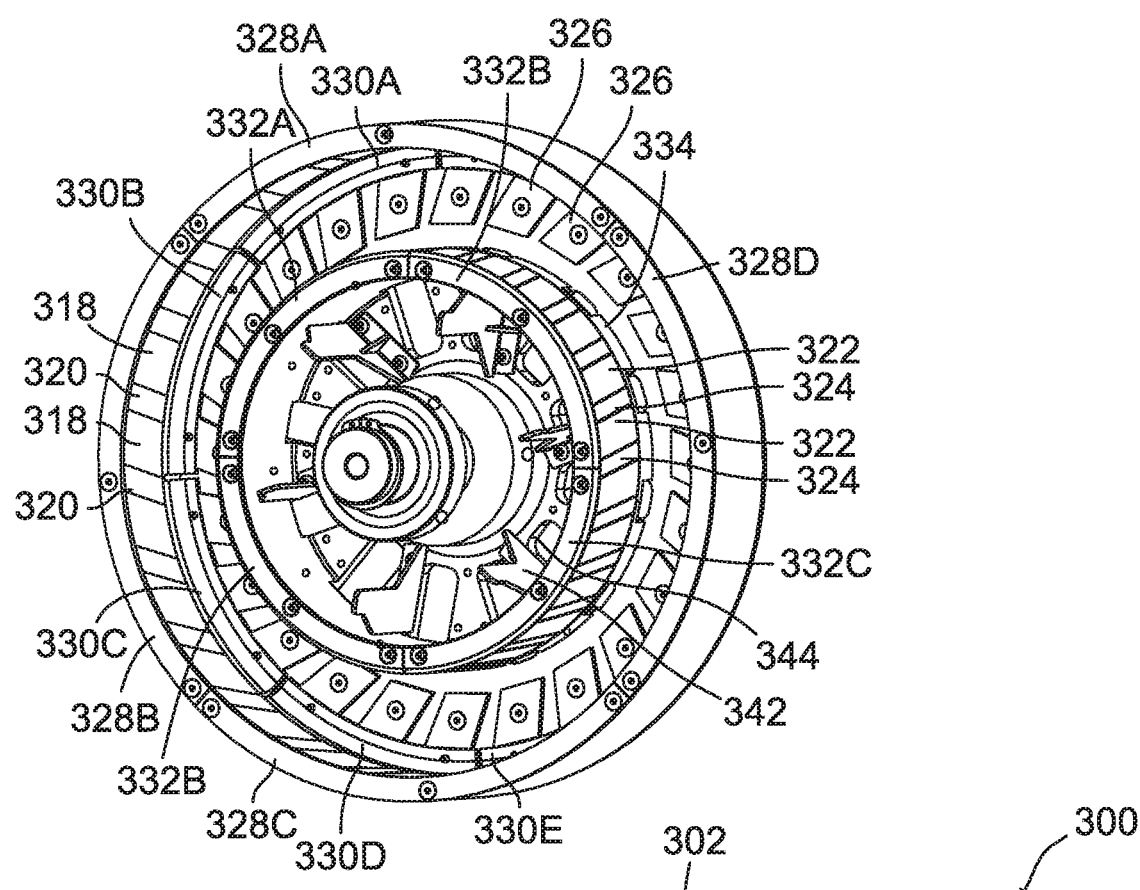
FIG. 7A is a perspective view of an implementation of a rotor assembly, according to aspects of the present disclosure.
Figure 7B:
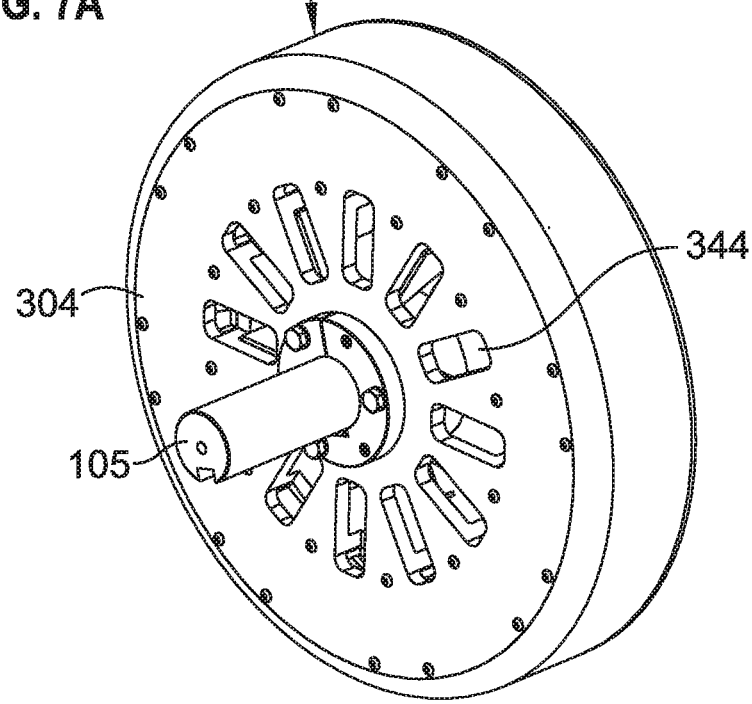
FIG. 7B is an additional perspective view of the implementation of the rotor assembly of FIG. 7A, according to aspects of the present disclosure.
Figure 7C:
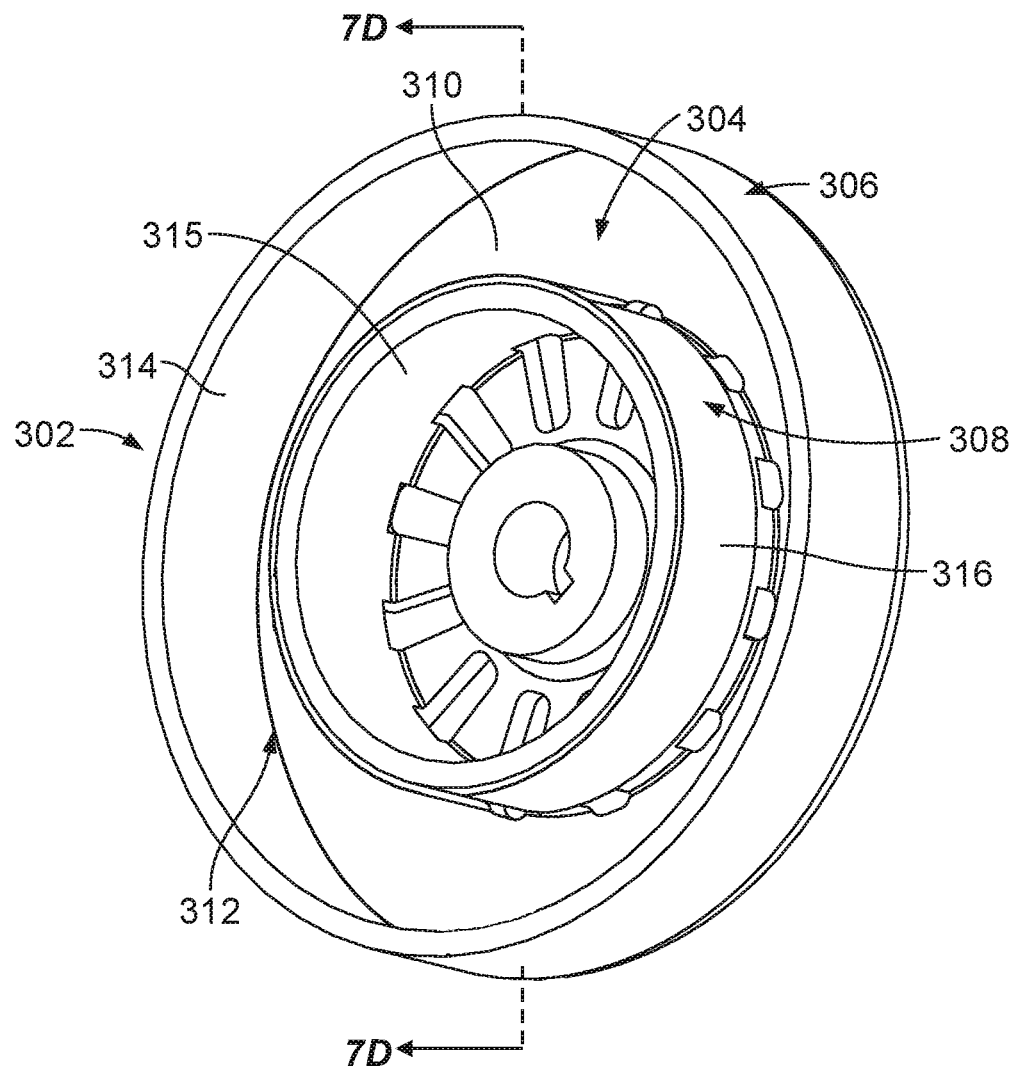
FIG. 7C is a perspective view of a rotor housing of the implementation of the rotor assembly of FIG. 7A, according to aspects of the present disclosure.
Figure 7D:
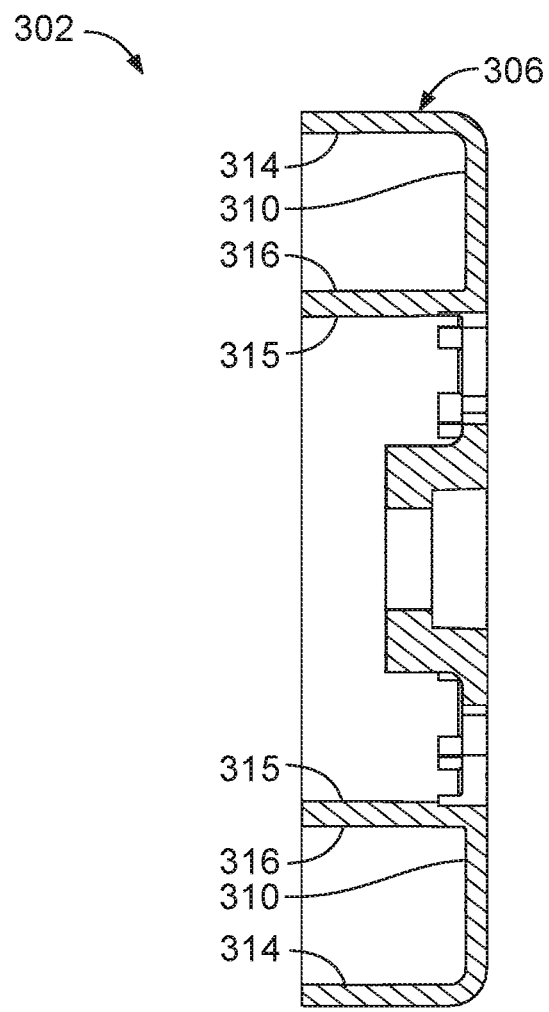
FIG. 7D is a cross-sectional view of the rotor housing of FIG. 7C, according to aspects of the present disclosure.

FIG. 7A and FIG. 7B illustrate perspective views of the rotor assembly 300, while FIG. 7C illustrates a perspective view of a rotor housing 302 of the rotor assembly 300. FIG. 7D illustrates a cross-sectional view along cross-sectional line 7D indicated in FIG. 7C. As shown, the rotor assembly 300 houses the magnets of the electromagnetic machine 100. The rotor assembly includes a rotor housing 302 that is coupled to the axle 105 such that rotation of the axle 105 causes the rotor housing 302 to rotate. Conversely, rotation of the rotor housing 302 causes the axle to rotate. In an implementation, the axle 105 has a rotation locking feature that is configured to non-rotationally mate with a rotation locking feature of the rotor housing 302 to prevent relative rotation between the axle 105 and the rotor housing 302. The rotation locking feature of the axle 105 can be a protrusion, ring, nub, or other structural feature, while the rotation locking feature of the rotor housing 302 can be a groove or aperture defined in the rotor housing 302, or vice versa. In another implementation, the axle 105 is fixedly coupled to the rotor housing 302 as a single integral piece. The rotor housing 302 includes a back portion 304, an outer ring portion 306, and an inner ring portion 308. The outer ring portion 306 and the inner ring portion 308 are arranged generally concentrically about the axle, and extend away from a surface 310 of the back portion 304 generally in a first direction. In an implementation, the outer ring portion 306 and the inner ring portion 308 are parallel. In other implementations, the outer ring portion 306 and the inner ring portion 308 can be disposed at angles with respect to each other, or with respect to the back portion 304. A circumferentially extending channel 312 is defined between the outer ring portion 306 and the inner ring portion 308. The channel 312 is generally defined by a first surface, a second surface, and a third surface. The first surface is formed from an inner surface 314 of the outer ring portion 306 of the rotor housing 302. The second surface is formed from an outer surface 316 of the inner ring portion 308 of the rotor housing 302. The third surface is formed from the portion of the surface 310 of the back portion 304 that is disposed between the outer ring portion 306 and the inner ring portion 308. Generally, the back portion 304, the outer ring portion 306, and the inner ring portion 308 are all formed as a single unitary piece.

Generally, the inner surface 314 of the outer ring portion 306 and the outer surface 316 of the inner ring portion 308 are parallel to each other and to a longitudinal axis of the axle 105. Thus, the first surface and the second surface defined by the channel 312 are generally parallel to each other. The surface 310 of the back portion 304 is generally orthogonal to both the inner surface 314 of the outer ring portion 306 and the outer surface 316 of the inner ring portion 308. Thus, the third surface defined by the channel 312 is generally orthogonal to both the first surface and the second surface such that the channel 312 has a U-shaped cross section. Other cross-sectional shapes of the channel 312 are also contemplated.

The rotor assembly 300 further includes a plurality of magnets disposed within the circumferentially extending channel 312. The plurality of magnets is disposed in circumferentially extending groups of magnets. As shown in FIG. 7A, the plurality of magnets includes outer radial magnets 318 coupled to the inner surface 314 of the outer ring portion 306 of the rotor housing 302. Each adjacent pair of outer radial magnets 318 can be separated by an outer radial spacer 320. The outer radial magnets 318 and the outer radial spacers 320 are disposed along the circumferentially extending channel 312 such that the outer radial magnets 318 and the outer radial spacers 320 generally encircle the axle 105.

The plurality of magnets further includes inner radial magnets 322 coupled to the outer surface 316 of the inner ring portion 308 of the rotor housing 302. Each adjacent pair of inner radial magnets 322 can be separated by an inner radial spacer 324. The inner radial magnets 322 and the inner radial spacers 324 are disposed along the circumferentially extending channel 312 such that the inner radial magnets 322 and the inner radial spacers 324 generally encircle the axle 105.

Finally, the plurality of magnets includes axial magnets 326 coupled to the surface 310 (FIG. 7C) of the back portion 304 of the rotor housing 302 between the inner ring portion 308 and the outer ring portion 306. Like outer radial magnets 318 and inner radial magnets 322, the axial magnets 326 in the axial group of magnets 326 are disposed along the circumferentially extending channel 312 such that the axial magnets 326 generally encircle the axle 105 or the radius of the inner ring portion 308 of the rotor housing 302.

Each of the magnets 318, 322, and 326 may be coupled to the respective surfaces of the rotor housing 302 in a variety of ways. For example, an adhesive layer can be disposed between the magnets and the surface of the rotor housing 302 to thereby adhesively couple the magnets to the surface of the rotor housing 302. The magnets can also be screwed into the surface of the rotor housing 302. In some implementations, the rotor housing 302 can include a retention component that assists in coupling any of the magnets to the rotor housing 302. The retention component could include one or more clamps or pins that are designed to retain any of the magnets to the corresponding surface. The retention component could also include one or more retaining rings. Generally, the retaining rings are disposed in the channel 312 and are formed to fit around at least a portion of the circumference of the channel 312. In this manner, the radius of curvature of the retaining ring is generally equal to the radius of the outer ring portion 306 of the rotor housing 302, or the radius of the inner ring portion 308 of the rotor housing 302.

In the implementation shown in FIG. 7B, the rotor assembly 300 includes a first retention ring that is formed from first retention ring components 328A-D. The first retention ring components 328A-D are disposed at an edge of the outer ring portion 306 that is spaced apart from the back portion 304 of the rotor housing 302. First retention ring components 328A-D can be coupled to the rotor housing 302 via screws, adhesive, or any suitable mechanism, and is configured to help hold one edge of each of the outer radial magnets 318 in place. Similarly, a second retention ring that is formed from second retention ring components 330A-E can be disposed at an edge of the outer ring portion 306 that abuts the back portion 304 of the rotor housing 302. The second retention ring components 330A-D help to hold the opposite edge of each of the outer radial magnets 318 in place. The rotor assembly 300 can further include a third retention ring formed from third retention ring components 332A-D and a fourth retention ring 334 that help to hold each of the inner radial magnets 322 in place. In other implementations, any or all of the retention rings can be formed as single unitary pieces, or can be formed as multiple components. In other implementations, any of the retention rings can instead be retentions pins, which can include or be a dowel.

Each of the outer radial magnets 318, inner radial magnets 322, and axial magnets 326 can be a dipole magnet with a north pole and a south pole. Each pole of each of the magnets has a corresponding pole face, which is the terminating surface of the magnet corresponding to a respective pole. Thus, opposing surfaces of each of the outer radial magnets 318, inner radial magnets 322, and axial magnets 326 are the two pole faces of each magnet. In the rotor assembly 300, one pole face of each of the magnets faces towards the respective surface defined by the channel to which the magnets are coupled. When the magnets are mounted to the rotor housing 302, this pole face of each magnet facing the surface defined by the channel abuts and/or contacts the channel. The other opposing pole face of each of the magnets faces away from the respective surface of the channel to which the magnets are coupled. Thus, for each of the outer radial magnets 318, one of the pole faces abuts the inner surface 314 of the outer ring portion 306 of the rotor housing 302, while the other pole face of each of the outer radial magnets 318 faces away from the inner surface 314 of the outer ring portion 306 of the rotor housing 302. For each inner radial magnet 322, one of the pole faces abuts the outer surface 316 of the inner ring portion 308 of rotor housing 302, while the other pole face of each of the inner radial magnets 322 faces away from the outer surface 316 of the inner ring portion 308 of rotor housing 302. For each axial magnet 326, one pole face abuts the surface 310 of the back portion 304 of the rotor housing 302 between the outer ring portion 306 and the inner ring portion 308, while the other pole face of each of the axial magnets 326 faces away from the surface 310 of the back portion 304 of the rotor housing 302 between the outer ring portion 306 and the inner ring portion 308.

The groups of magnets 318, 322, 326 disposed within the channel 312 of the rotor housing 302 can be categorized into sets of magnets. Each set of magnets contains one outer radial magnet 318, one inner radial magnet 322, and one axial magnet 326. The three magnets in each set of magnets can be located at identical circumferential positions within the channel 312 relative to the axle 105. Thus, a magnet set containing the outer radial magnet 318 located at the three o'clock position within the channel 312 relative to the orientation of the channel 312 in FIG. 7B would also contain the inner radial magnet 322 and the axial magnet 326 that are both also located at the three o'clock position. In an exemplary implementation of the electromagnetic machine 100, the rotor assembly 300 contains twenty-four sets of magnets circumferentially disposed in the channel 312 about the axle 105. The magnets in each set of magnets can also be staggered in relation to one another, and can also be oriented at a variety of angles with respect to both the surface the magnet is coupled to and the other surfaces of the rotor housing 302.

Each magnet in any given set of magnets has an identical pole face abutting the surface of the rotor housing 302, as compared to the other magnets in the set. Thus, each magnet in the set of magnets has an identical pole face directed towards the channel 312 itself. The pole face that is directed towards the channel 312 in each magnet set alternates for every circumferentially adjacent magnet set. For example, a first magnet set and a second magnet set may be disposed circumferentially adjacent to each other within the channel 312. Each magnet in this first magnet set has the same pole face abutting the surface defining the channel. As an example, each of the three magnets in this first magnet set may have the north pole face abutting respective surfaces defining the channel 312, and thus will have the south pole face facing towards the channel itself. Each magnet in the circumferentially adjacent second magnet face will then have the south pole face abutting the respective surfaces defining the channel 312, and thus will have the north pole face facing towards the channel itself.

This arrangement of alternating pole faces for each magnet set continues circumferentially around the channel 312. The alternating pole face arrangement of the magnet sets helps to direct the magnetic flux in an alternating and looping fashion through the channel, from the north pole faces to the south pole faces. With the exception of a small air gap region, when the machine is in operation, most of the channel 312 is occupied by the stator assembly 200, in particular the coil housing 240 which includes the coils 243 and coil cores 251. The high permeability of the materials in the coil housing 240 increases the magnetic field in the channel, and is designed to channel the flux most efficiently through the coils 243.

In any given set of magnets, one of the pole faces of the outer radial magnet will face toward the first side surface 260A of the coils 243. The pole face of the same polarity of the inner radial magnet in the set of magnets will face toward the second side surface 260B of the coils 243. The pole face of the same polarity of the axial magnet in the set of magnets will face toward the third side surface 260C of the coils 243. During operation of the electromagnetic machine 100, the rotor will rotate relative to the stator. Thus, the pole faces of the same polarity of the magnets 318, 322, 326 in a single set of magnets will face toward the respective side surfaces 260A, 260B, 260C of each of the coils 243 in a rotational sequence as the rotor rotates. An adjacent set of magnets will also have pole faces of the same polarity facing toward the respective side surfaces of the coils, except that the pole face will be of the opposite polarity. Because of the alternating polarity of the pole faces of each set of magnets that faces toward the respective side surfaces of the coils 243, the magnetic flux from the magnets is directed through the coils such that the magnetic flux is normal to a plane that is defined by the coils 243 and/or the cores 251.

The rotor housing 302 can include one or more fan blades 342 coupled thereto. In an implementation, the fan blades 342 can be coupled to the portion of the surface 310 of the back portion 304 that is disposed between the inner ring portion 306 and the axle 105. The fan blades 342 thus extend outwardly from the surface 310 generally in the first direction, which is the same as the outer ring portion 306 and the inner ring portion 308. In another implementation, the fan blades 342 are coupled to an inner surface 315 of the inner ring portion 308, and extend in a radial direction toward the axle 105. The rotor housing 302 further includes one or more air flow apertures 344 defined in the back portion 304. During rotation of the rotor assembly 300, the rotating fan blades 342 direct air through the air flow apertures 344, thus cooling the internal components of the electromagnetic machine 100.

Figure 8:
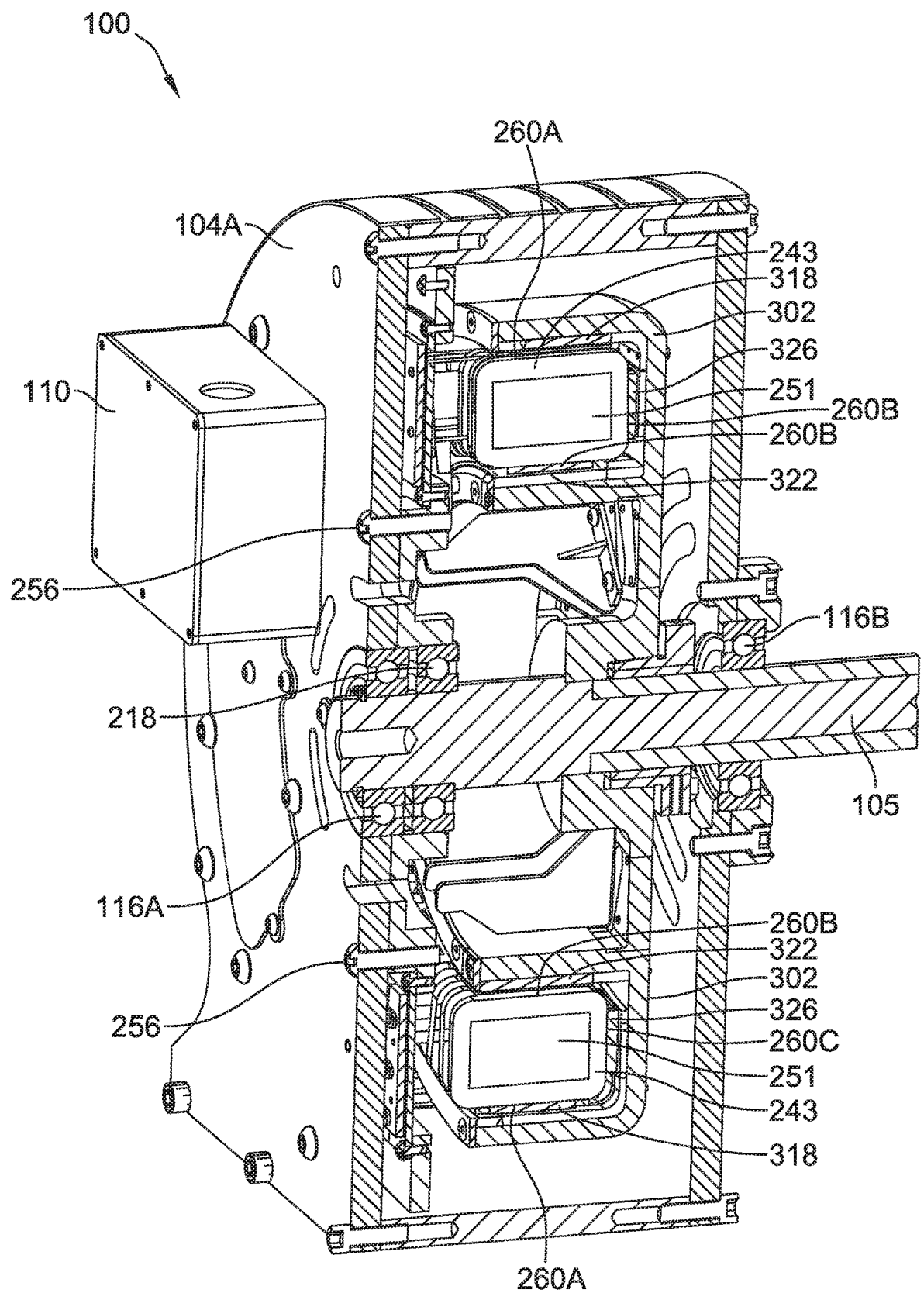
FIG. 8 is a cross-sectional view of the electromagnetic machine of FIG. 1A, according to aspects of the present disclosure.

A cross-section view of the assembled electromagnetic machine 100 is illustrated in FIG. 8. The first wall 104A of the housing is shown, along with the connection box 110. The axle 105 is coupled to each of the first bearing 116A, the second bearing 116B, and the stator bearing 218. The axle 105 is thus rotatable relative to the housing and the stator assembly. As the stator assembly and the rotor assembly come together in operation, the coils 243 and the corresponding cores 251 are disposed within the U-shaped channel formed by the rotor housing 302. Finally, FIG. 8 shows one implementation of a locking mechanism. As can be seen, the locking mechanism includes a locking member 256 inserted through both the first wall 104A of the housing, and the stator assembly. Thus, while the stator assembly is rotatable relative to the axle 105 due to the stator bearing 218, the locking member 256 prevents the stator assembly from rotating while the locking member 256 is activated or engaged.

As shown in FIG. 8, the outer radial magnets 318 generally always face toward the first side surface 260A of the coils 243, on both the coil 243 on top, and the coil 243 on the bottom. Similarly, inner radial magnets 322 always face toward the second side surface 260B of the coils 243, and the axial magnets 326 always face toward the third side surface 260C of the coils 243.

Both the design of the rotor housing 302 as a single unitary piece and the axle 105 being supported by bearings on either end enables a very small air gap to be maintained between the coil housing 240 and the surface of the magnets within the rotor housing 302 during operation. Generally, the distance between an outer periphery of the coil housing 240 and the magnets in the rotor housing 302 is about 1.2 millimeters. The size of this air gap is inversely proportional to the output power and efficiency of the electromagnetic machine, with smaller air gaps providing stronger magnetic fields in the coil housing 240 and coil cores 251. However, tight mechanical tolerances are required to maintain very small air gaps when the machine is in operation.

Due to the modular nature of the coils and the circuit board sections, the electromagnetic machine 100 can be configured in a variety of ways. In an implementation, the coils are configured to provide three-phase power. In this implementation, the coils are separated into three different sets of coils, each set of coils corresponding to one of the power phases. Within each phase, the coils can be further divided into two different subsets of coils. Thus, the set of coils for each power phase can comprise two different subsets of series-wired coils, each subset wired in parallel. Each power phase therefore has a backup group of coils. If one of the coils in one subset of a power phase fails, the other subset of coils in that power phase can still provide the power for that phase, as the subsets are wired in parallel. Any number of subsets are contemplated, such as but not limited to two subsets, three subsets, four subsets, or five or more subsets. In a further implementation, all of the coils for each power phase in a multi-phase system are wired together in series. In another implementation, the coils are wired to provide single phase power. The coils in this implementation can be all be wired in series, or can be divided into two or more subsets of coils wired in series, and the subsets being wired together in parallel. In yet a further implementation, the electromagnetic machine includes seventy-two coil modules wired together to provide three-phase power. The first set of coils for the first power phase includes twenty-four coil modules, the second set of coils for the second power phase includes twenty-four coil modules, and the third set of coils for the third power phase includes twenty-four coil modules. Each set of coils is divided into equal subsets wire in parallel, each subset containing twelve coil modules wired in series.

To provide service to the electromagnetic machine described herein, the electromagnetic machine must be disconnected from an external electrical power system. A connected prime mover must be stopped and should be locked out. Once the electromagnetic machine is safely isolated and is not operating, an access window cover can be removed from the housing of the electromagnetic machine to provide access to the stator assembly through the access window. A locking mechanism can be deactivated to allow the stator assembly to be rotated within the housing. In an implementation, the locking mechanism is deactivated by removing a locking member from an aperture defined in the housing and an aperture defined in the stator assembly. The stator assembly is then rotated until a desired portion of a circuit board is accessible through the access window. Any coil modules electrically connected to the circuit board section must be disconnected, and then the circuit board section can be removed. The alignment plate section underneath the circuit board section is also removed to provide access to the coil modules. A desired coil module can be removed from the stator assembly, whether for replacement or repair. The coil module is then inserted back into the stator assembly, and the alignment plate section and circuit board section are then replaced. The new coil module is electrically connected to the circuit board, and the access window cover can then be replaced on the housing. The locking mechanism can then be activated to prevent rotation of the stator assembly relative to the housing. In an implementation, the locking mechanism is activated by inserting a locking member into an aperture defined in the housing and an aperture defined in the stator assembly.

FIGS. 9A-17 show additional implementations of an electromagnetic machine 1100. Generally, any of the features of the electromagnetic machine 100 can be combined with the electromagnetic machine 1100, and any of the features of the electromagnetic machine 1100 can be combined with the electromagnetic machine 100.

Figure 9A:
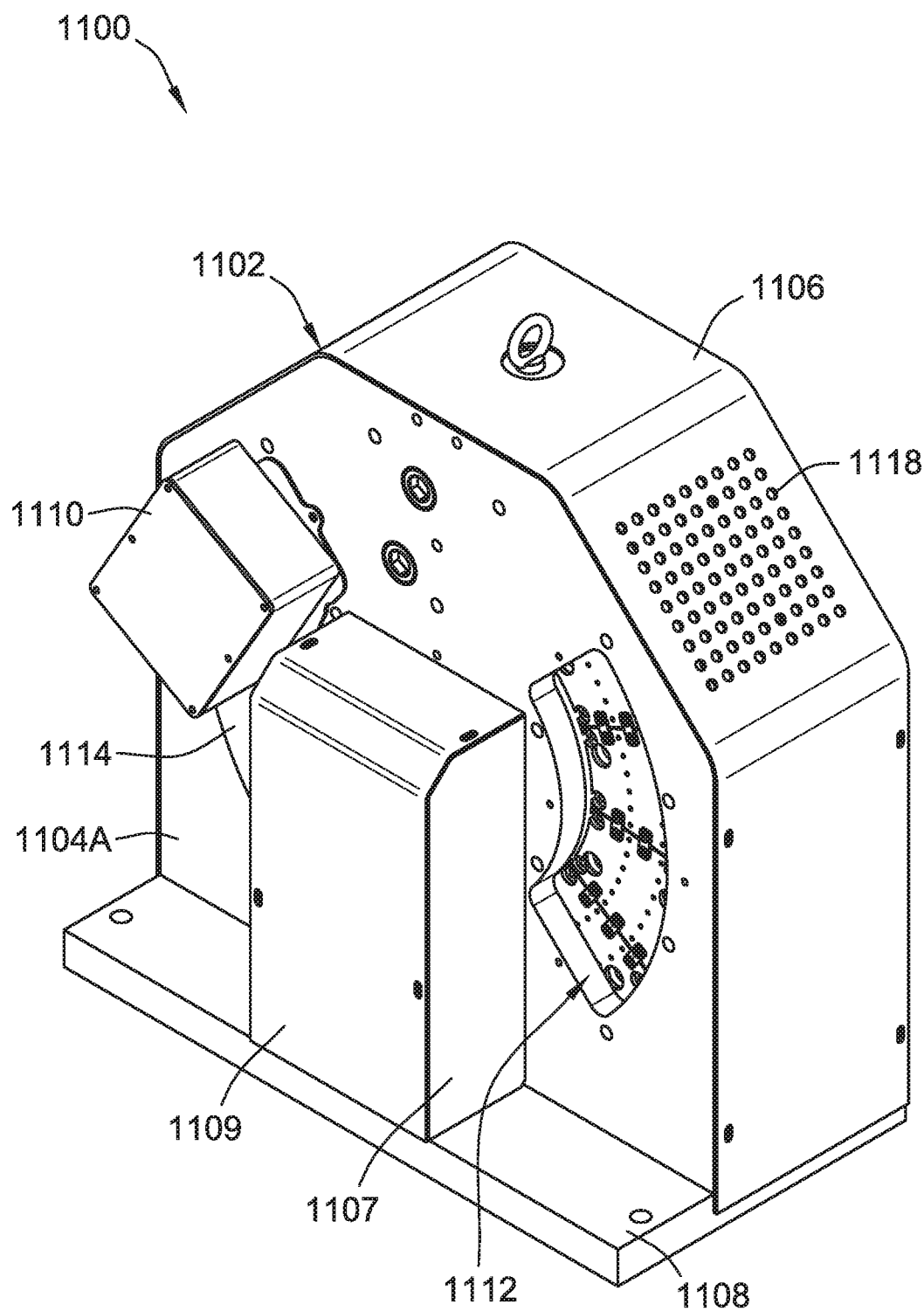
FIG. 9A is a perspective view of another implementation of an electromagnetic machine, according to aspects of the present disclosure.
Figure 9B:
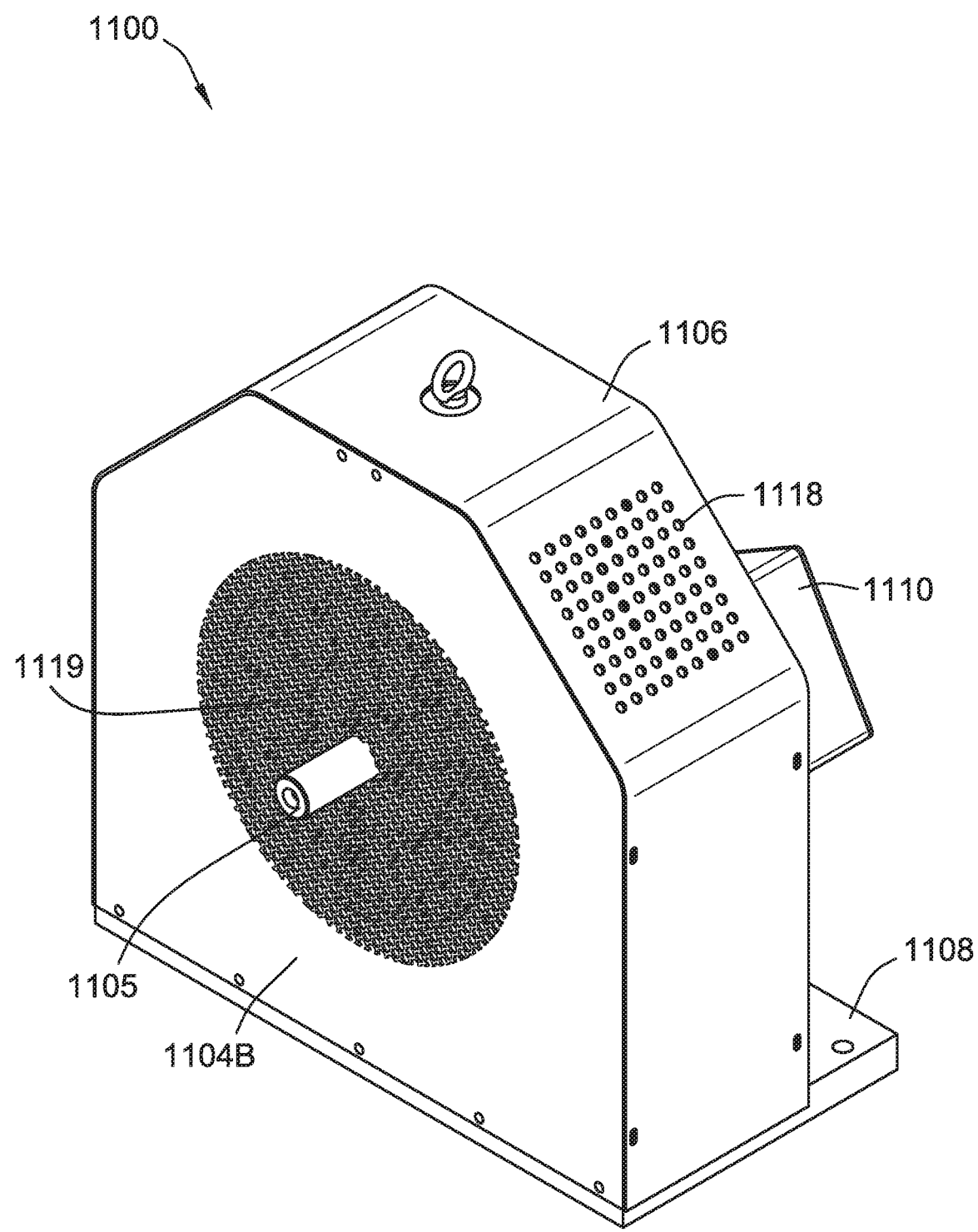
FIG. 9B is an additional perspective view of the implementation of the electromagnetic machine of FIG. 9A, according to aspects of the present disclosure.

Referring now to FIG. 9A and FIG. 9B, an exemplary electromagnetic machine 1100 includes a housing 1102 having a first wall 1104A, a second wall 1104B, a cover panel 1106, and a base 1108. The electromagnetic machine 1100 includes a connection box 1110. The connection box 1110 houses electrical components that electrically connect the internal components of the electromagnetic machine 1100 to an electric power source, an electric load, or an electric storage device, depending on how the electromagnetic machine is to be used. The first wall 1104A of the housing 1102 includes one or more access windows 1112 defined therein that allow access to the internal components of the electromagnetic machine 1100. The access window 1112 has a surface area that is a percentage of the surface area of the first wall 1104A of the housing 1102 without the access window 1112 defined therein. A ratio of the surface area of the access window 1112 to the surface area of the first wall of the housing 1102 can be between about 5% and about 50%, between about 20% and about 40%, between about 15% and about 30%, about 25%, or about 8.33%.

The first wall 1104A of the housing 1102 includes one or more access window covers 1114 removably coupled thereto. The access window covers 1114 are configured to cover the access windows 1112, which prevents access to the internal components of the electromagnetic machine 1100 and protects those components. Generally, each access window 1112 will have a corresponding access window cover 1114. The access window covers 1114 can be coupled to the first wall 1104A of the housing 1102 in any suitable fashion, such as with screws, bolts, clips, etc. During operation of the electromagnetic machine 1100, each access window cover 1114 is coupled to the first wall 1104A of the housing 1102 such that an individual or any other object cannot contact any internal components that may be rotating, moving, energized, or otherwise in use. When the electromagnetic machine is not in use, the access window covers 1114 can be removed so that the individual can safely access the internal components through the access window 1112.

As shown in FIG. 9B, an axle 1105 generally extends through the second wall 1104B and through a fan guard 1119 coupled to the second wall 1104B. The axle 1105 is coupled to the housing 1102 via one or more bearings or bearing assemblies, which are discussed in more detail herein. The electromagnetic machine 1100 includes a pair of gussets 1107 that are each coupled to both the first wall 1104A and the base 1108. The gussets 1107 provide mechanical stability to the electromagnetic machine 1100 during operation, when the electromagnetic machine 1100 experiences a large amount of mechanical stress, for example due to rotation of the axle 1105. A gusset cover 1109 is coupled to the first wall 1104, the base 1108, and each of the gussets 1107.

The housing 1102 can also have a number of air flow apertures defined therein to allow air to flow through the housing 1102 during operation. For example, the cover panel 1106 can include air flow apertures 1118. The air flow can help to cool the internal components of the electromagnetic machine 1100 and keep the temperature of the machine within an acceptable range, thus allowing the electromagnetic machine 1100 to be used in a wider variety of conditions and scenarios. The first wall 1104A, second wall 1104B, cover panel 1106, base 1108, and internal components can be mechanically coupled by a variety of means, such as screws, nails, bolts, pins, clips, welds, or any other suitable coupling mechanism. In an implementation, the second wall 1104B is not an independent component of the housing 1102. Rather, the second wall 1104B can be a portion of a separate component that is coupled to the electromagnetic machine 1100, such as a portion of the housing of the prime mover. In a further implementation, the second wall 1104B of the housing can be an outer housing of the rotor.

Figure 10B:
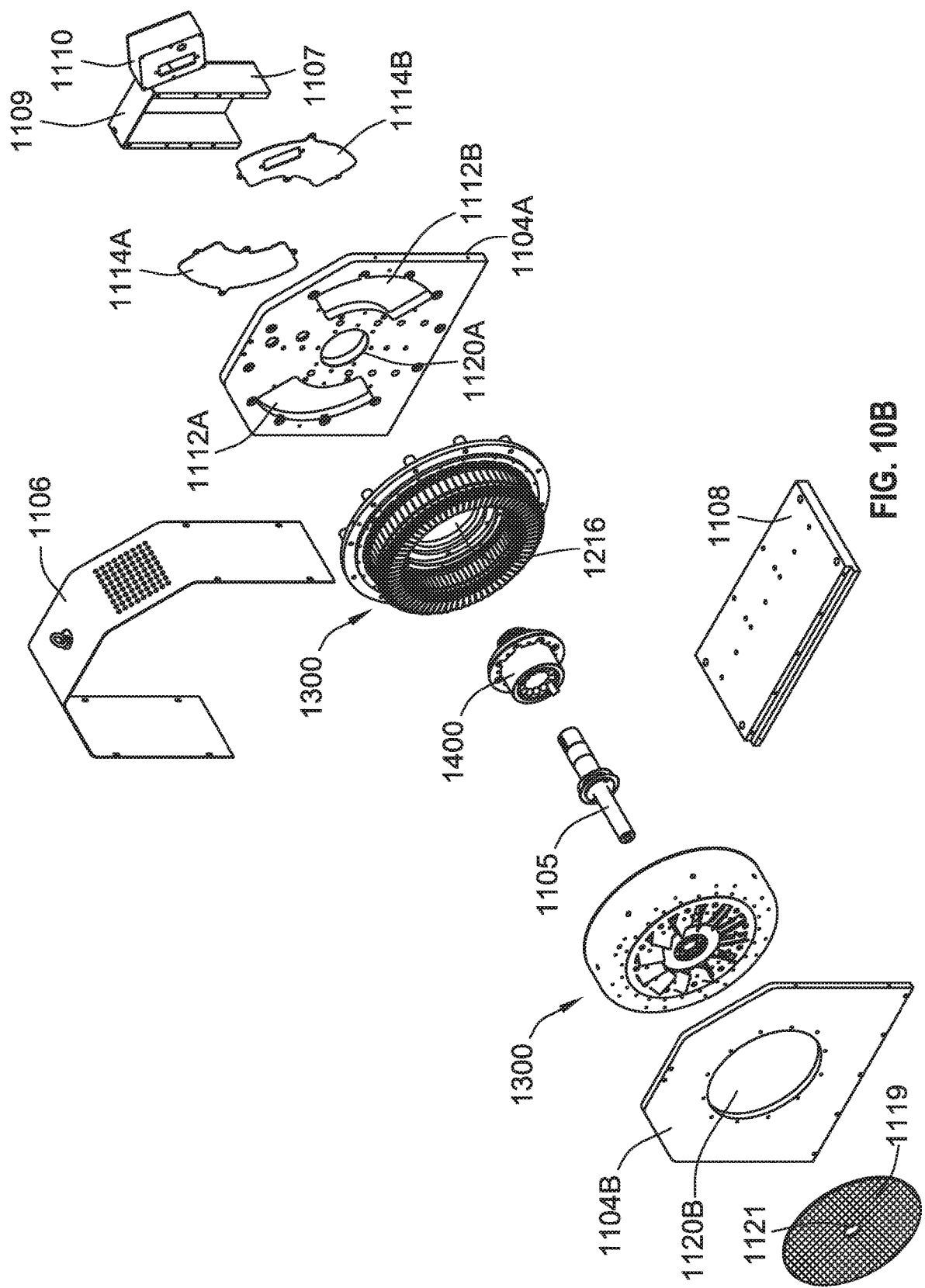
FIG. 10B is an additional exploded perspective view of the implementation of the electromagnetic machine of FIG. 9A, according to aspects of the present disclosure.

Exploded views of the electromagnetic machine of FIG. 9A and FIG. 9B are shown in FIG. 10A and FIG. 10B, respectively. The first wall 1104A of the housing 1102 is shown with access window covers 1114A and 1114B exploded from access windows 1112A and 1112B. The internal components of the electromagnetic machine 1100 include a stator assembly 1200 and a rotor assembly 1300.

The stator assembly 1200 is disposed generally between the first wall 1104A and the rotor assembly 1300, while the rotor assembly 1300 is disposed generally between the stator assembly 1200 and the second wall 1104B.

The first wall 1104A defines a first wall opening 1120A, while the second wall 1104B defines a second wall opening 1120B. The stator assembly 1200 defines a stator opening 1216. The electromagnetic machine 1100 includes a bearing assembly 1400 that is configured to pass through the first wall opening 1120A and the stator opening 1216, and non-rotationally couple to both the first wall 1104A and the stator assembly 1200. The axle 1105 extends through the bearing assembly 1400 and thus through the first wall 1104 and the stator assembly 1206. The bearing assembly 1400 supports the axle 1105 while allowing the axle 1105 to rotate relative to the bearing assembly 1400, the first wall 1104A, and the stator assembly 1200. The axle 1105 generally extends through the first wall opening 1120A and past the first wall 1104A. However, the gussets 1107 and the gusset cover 1109 generally enclose the end of the axle 1105 that extends past the first wall 1104A.

In an implementation of the electromagnetic machine 1100, the stator assembly 1200 includes one or more coil modules, which include coils of wire that are wrapped around a permeable core of magnetic material, while the rotor assembly 1300 includes one or more magnets configured to be disposed adjacent to the coils of wire when the electromagnetic machine 1100 is in use. In another implementation, the stator assembly 1200 includes the magnets while the rotor assembly 1300 contains the coil modules. As will be described in more detail herein, the rotor assembly 1300 generally defines a channel around which the magnets are disposed. During operation of the electromagnetic machine 1100, the coil modules that are attached to the stator assembly 1200 are disposed within the channel defined by the rotor assembly 1300.

The first wall 1104A of the housing 1102 includes one or more housing locking apertures 1122 defined therein. Similarly, the stator assembly 1200 includes one or more stator assembly locking apertures 1222 defined therein. Each of the housing locking apertures 1122 and the stator assembly locking apertures 1222 are sized such that a locking mechanism may be removably inserted therethrough to prevent the rotation of the stator assembly about the axle via the bearing assembly 1400. During operation of the electromagnetic machine 1100, the stator assembly 1200 can be locked into place to prevent any unnecessary or undesired movement. When the electromagnetic machine 1100 needs to be serviced, the locking mechanism can be removed from the housing locking apertures 1122 and the stator assembly locking apertures 1222 to allow the stator assembly 1200 to be rotated until a desired portion of the stator assembly 1200 is accessible through the access windows. The locking mechanism can be, for example, a bolt, a pin, a spring-loaded pin, or a linearly actuated pin. In other implementations, locking mechanisms that do not utilize apertures defined in the housing and the stator could be used, such as clips or fasteners. While the figures show potential locations of the housing locking apertures 1122 and the stator assembly locking apertures 1222, these apertures can be defined anywhere on the electromagnetic machine 1100 as long as a locking mechanism can be inserted through both apertures to thereby prevent rotation of the stator assembly relative to the housing.

Figure 11A:
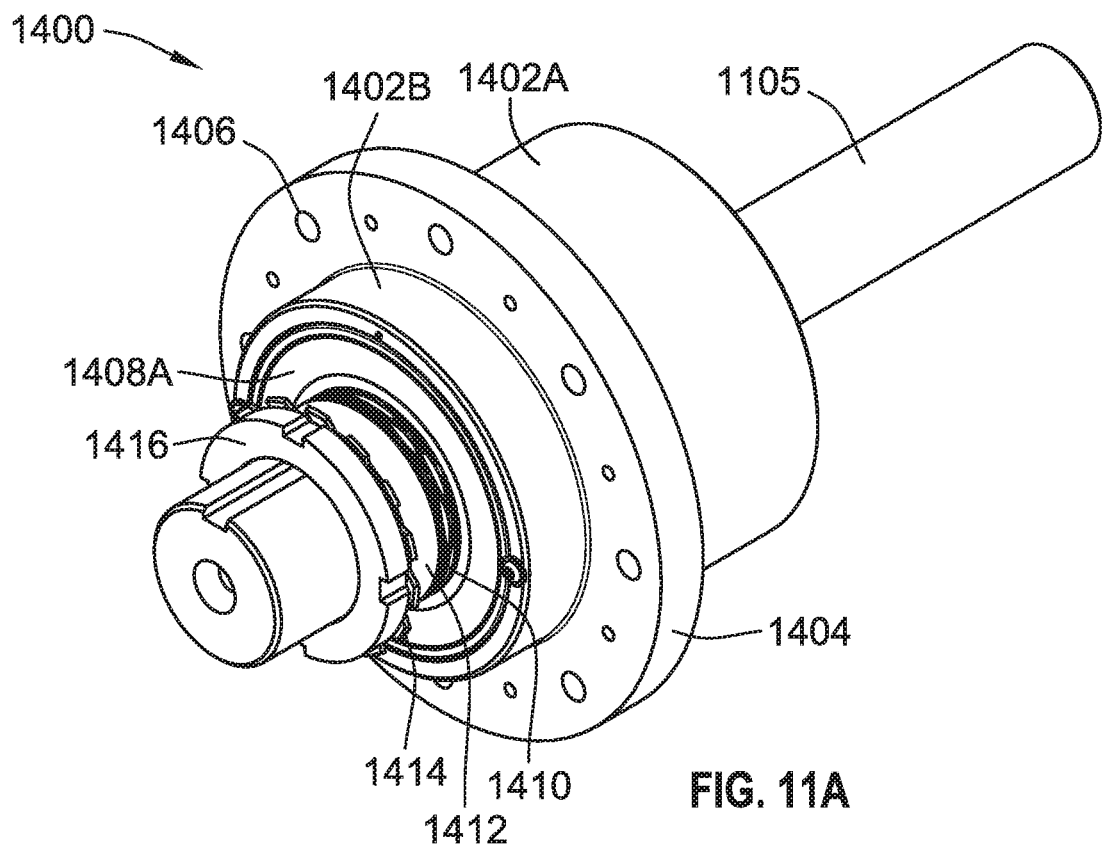
FIG. 11A is a perspective view of an axle and a bearing assembly, according to aspects of the present disclosure.
Figure 11B:
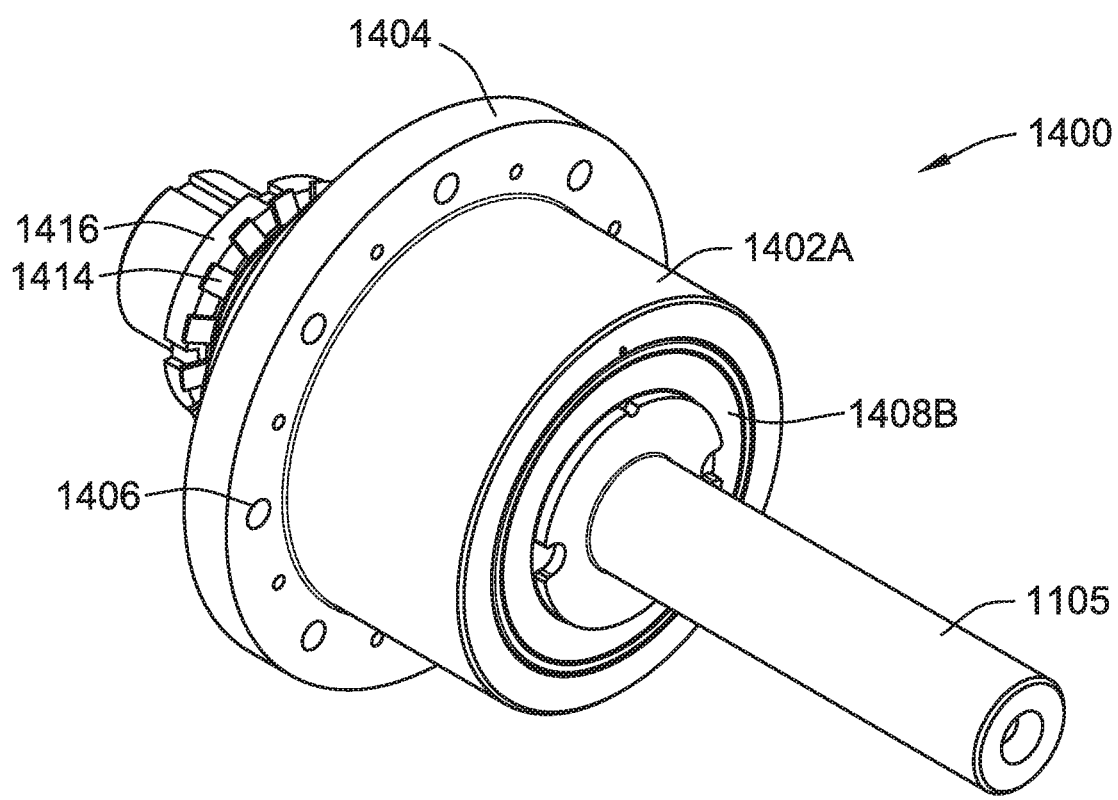
FIG. 11B is an additional perspective view of the axle and bearing assembly of FIG. 11A, according to aspects of the present disclosure.
Figure 11C:
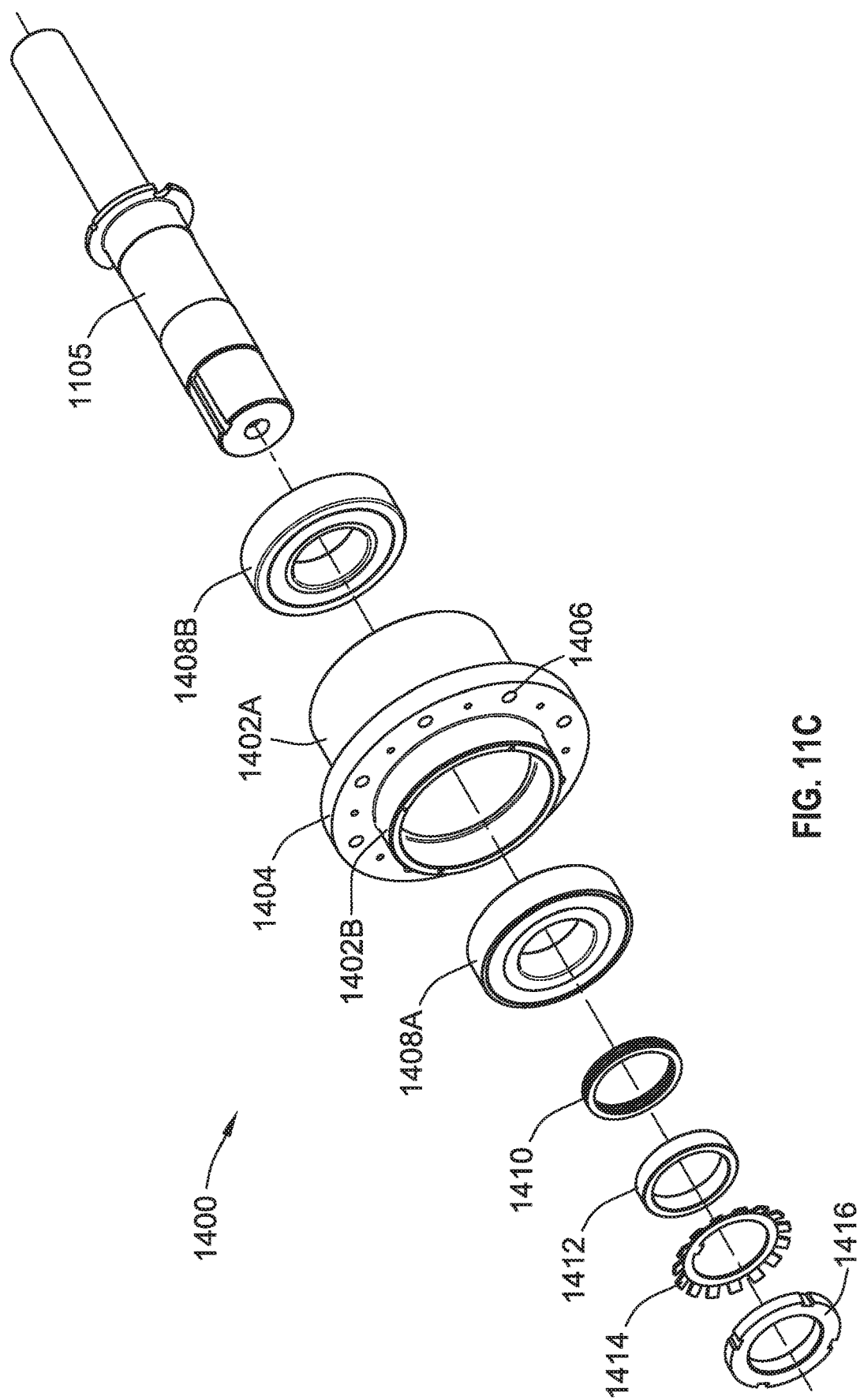
FIG. 11C is an exploded perspective view of the axle and bearing assembly of FIG. 11A, according to aspects of the present disclosure.
Figure 11D:
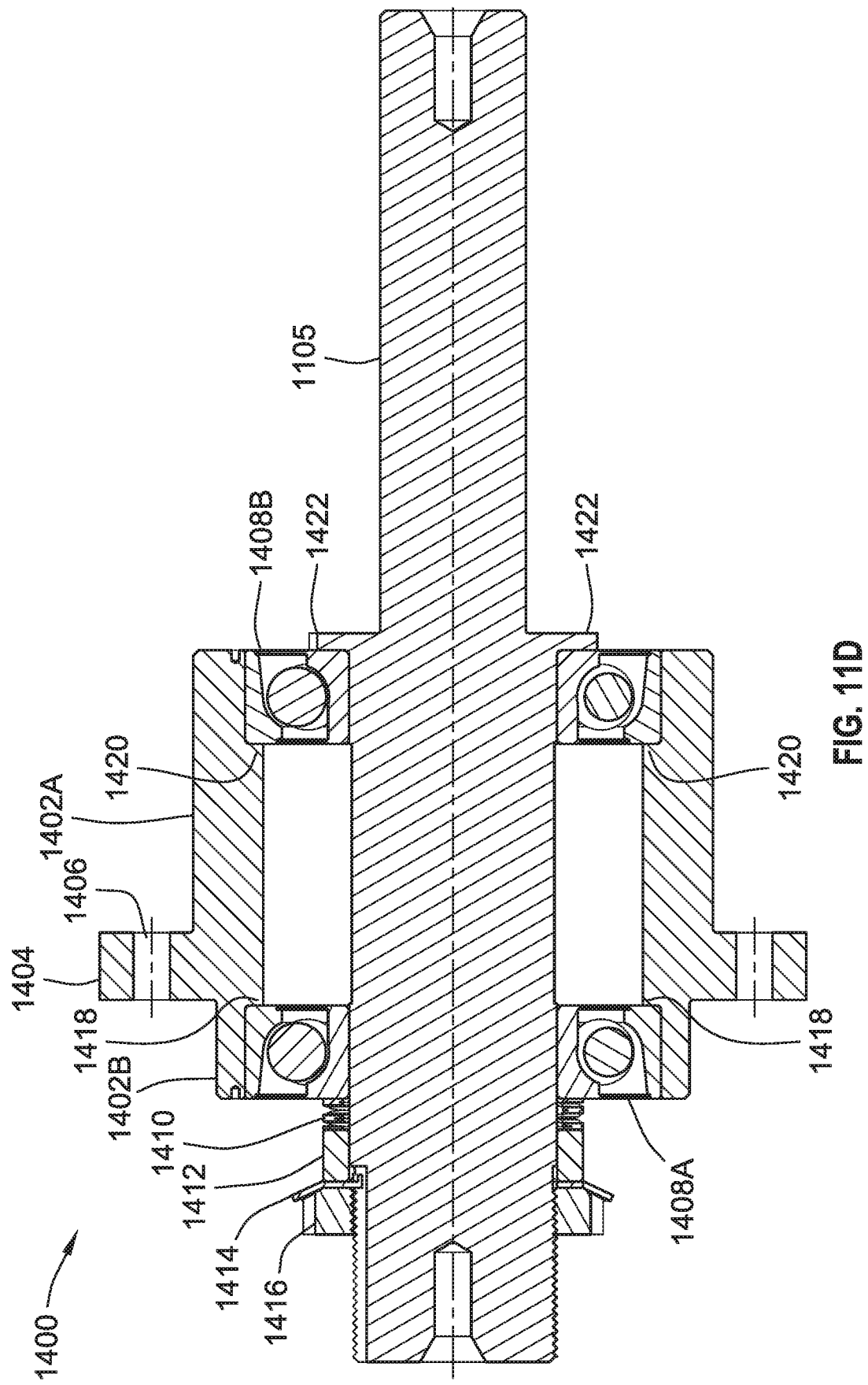
FIG. 11D is a cross-sectional view of the axle and bearing assembly of FIG. 11A, according to aspects of the present disclosure.

FIGS. 11A and 11B shows perspective view of the axle 1105 mounted to the bearing assembly 1400. FIG. 11C shows an exploded perspective view of the axle 1105 and the bearing assembly 1400. FIG. 11D shows a cross-sectional view of the axle 1105 and the bearing assembly 1400. The bearing assembly 1400 is configured to be disposed partially in the first opening 1120A of the first wall 1104A and the stator opening 1216 of the stator assembly 1200. The bearing assembly 1400 has a generally cylindrical body that includes body portion 1402A and body portion 1402B. The bearing assembly 1400 also includes a circumferentially extending flange 1404 separating body portion 1402A and 1402B.

When the electromagnetic machine 1100 is fully assembled, the bearing assembly 1400 is positioned such that the body portion 1402B is disposed in the opening 1120A of the first wall 1104A. The flange 1404 will be positioned within the interior of the electromagnetic machine 1100. The bearing assembly 1400 also extends through the stator assembly 1200 such that at least a portion of the body portion 1402A is disposed in the opening 1216 of the stator assembly 1200. Thus, the flange 1404 of the bearing assembly 1400 is sandwiched between the first wall 1104A and the stator assembly 1200. The flange 1404 includes a number of apertures 1406 extending axially through the flange 1404. The apertures 1406 are configured to receive fasteners that extend through the first wall 1104A to non-rotationally secure the first wall 1104A and the bearing assembly 1400. In some implementations, the fasteners also extend through the stator assembly 1200 to non-rotationally secure the stator assembly 1200 to the first wall 1104A and the bearing assembly 1400.

The bearing assembly 1400 and axle 1105 generally include a first bearing 1408A and a second bearing 1408B that couple the axle 1105 to the bearing assembly 1400. The first bearing 1408A is disposed within the bearing assembly 1400 and is generally coincident with body portion 1402B of the bearing assembly 1400. Thus, the first bearing 1408A is also generally coincident with the first opening 1120A of the first wall 1104A. The second bearing 1408B is disposed at an end of the bearing assembly 1400 opposite the first bearing 1408A, and is generally positioned such that it is disposed within the interior of the electromagnetic machine 1100. When the bearing assembly 1400 and the axle 1105 are fully assembled, the axle 1105 is coupled to the bearing assembly 1400 via the first bearing 1408A and the second bearing 1408B. The axle 1105 is thus rotatable relative to the bearing assembly 1400. Because the bearing assembly 1400 is non-rotationally secured to the first wall 1104A and the stator assembly 1200, the axle 1105 is also rotatable relative to the first wall 1104A and the stator assembly 1200.

The first bearing 1408A is generally coupled to the interior of body portion 1402B of the bearing assembly 1400 such that when the axle 1105 is removed from the bearing assembly 1400, the first bearing 1408A remains disposed within the interior of the bearing assembly 1400. However, the second bearing 1408B is generally coupled to the axle 1105 via a friction fit. In this manner, when the axle 1105 is removed from the bearing assembly 1400, the second bearing 1408B remains coupled to the axle 1105. In other implementations however, the first and second bearings 1408A, 1408B can be coupled to the bearing assembly 1400 and/or the axle 1105 in any suitable manner.

As best shown in FIG. 11C, the bearing assembly 1400 further includes a spring 1410, a number of collar components 1412, 1414, and 1416. The collar components 1412, 1414, 1416 all thread onto the axle 1105 so as to press the spring 1410 against the first bearing 1408A. This presses the first bearing 1408A against an internal shoulder 1418 within the bearing assembly 1400 to thereby hold the first bearing 1408A in place. The spring 1410 thus preloads the first bearing 1408A, and removes any radial play in the first bearing 1408A. Once the axle 1105 is inserted into the bearing assembly 1400, the second bearing 1408B is pressed against another internal shoulder 1420 of the bearing assembly 1400, as well as a shoulder 1422 of the axle 1105. This assists in preloading the second bearing 1408B to remove any radial play.

Figure 12A:
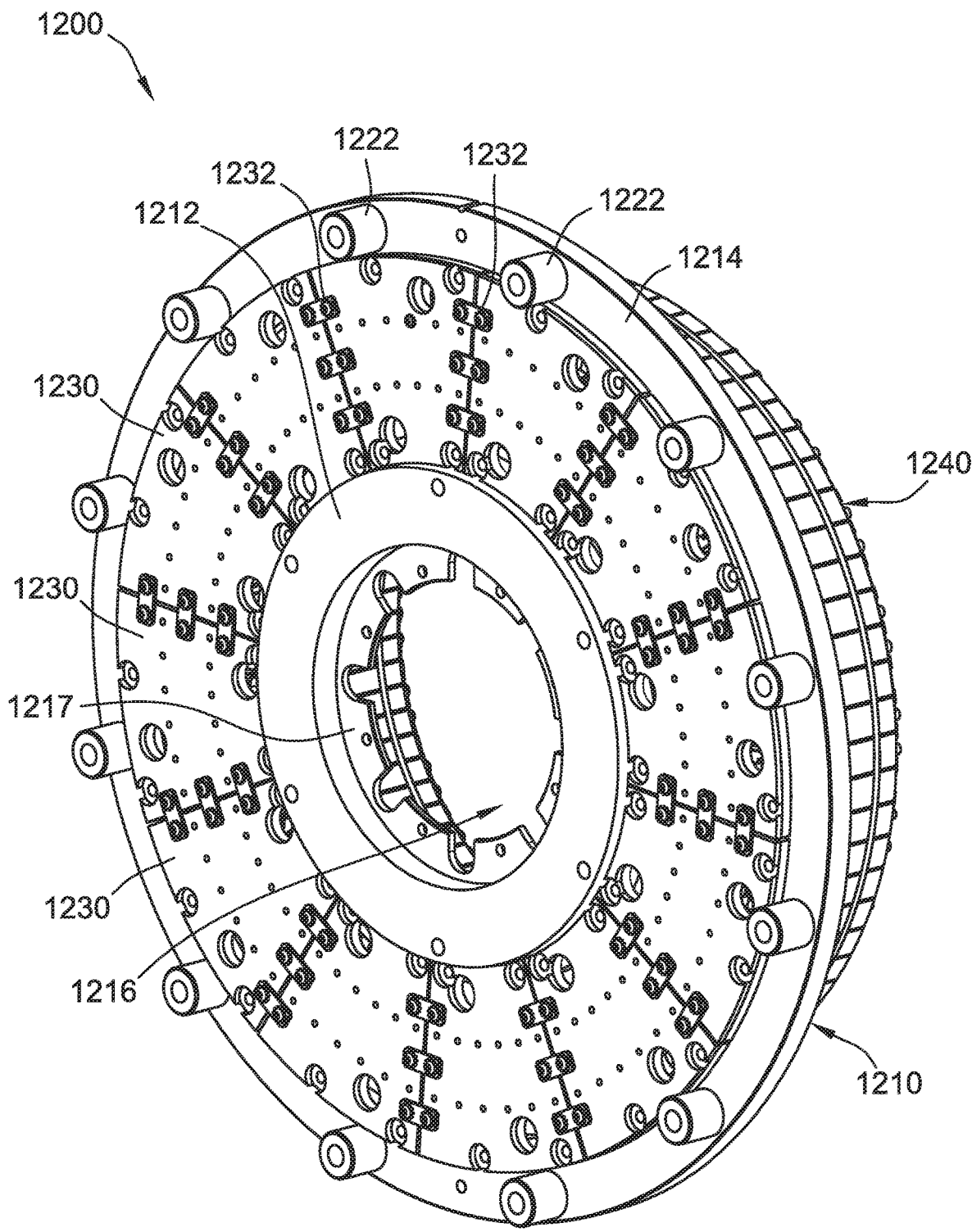
FIG. 12A is a perspective view of another implementation of a stator assembly, according to aspects of the present disclosure.
Figure 12B:
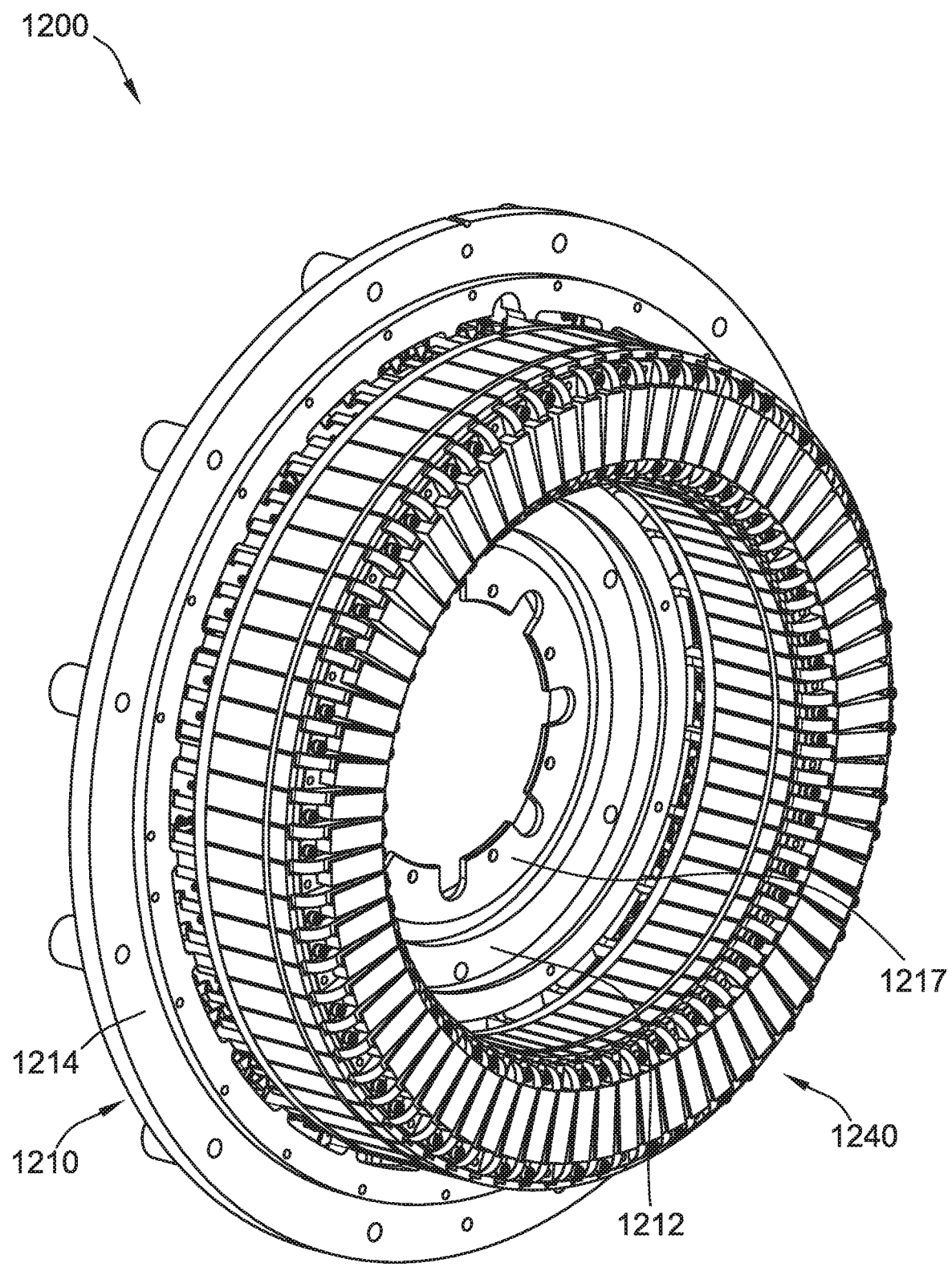
FIG. 12B is an additional perspective view of the implementation of the stator assembly of FIG. 12A, according to aspects of the present disclosure.
Figure 12C:
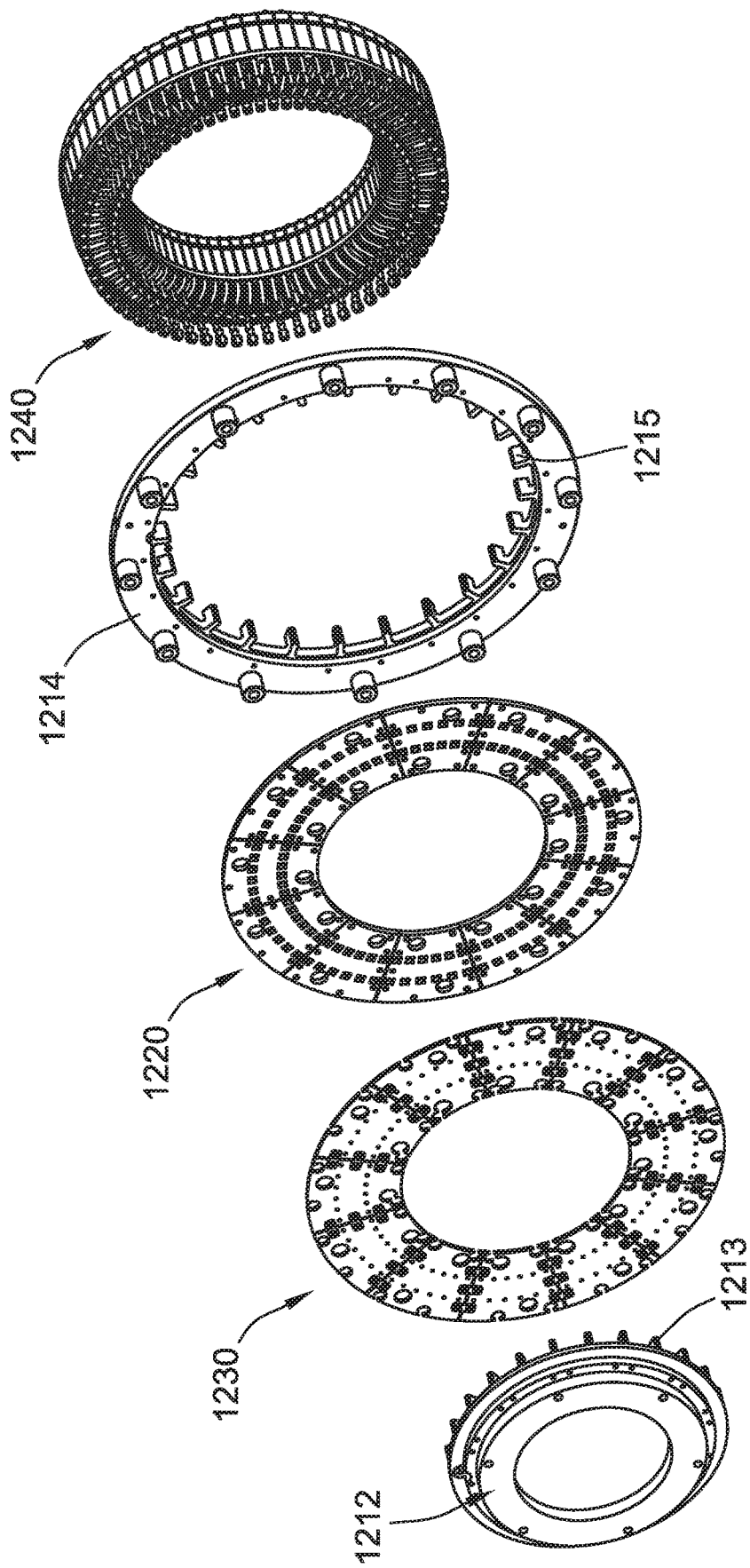
FIG. 12C is an exploded perspective view of the implementation of the stator assembly of FIG. 12A, according to aspects of the present disclosure.
Figure 12D:
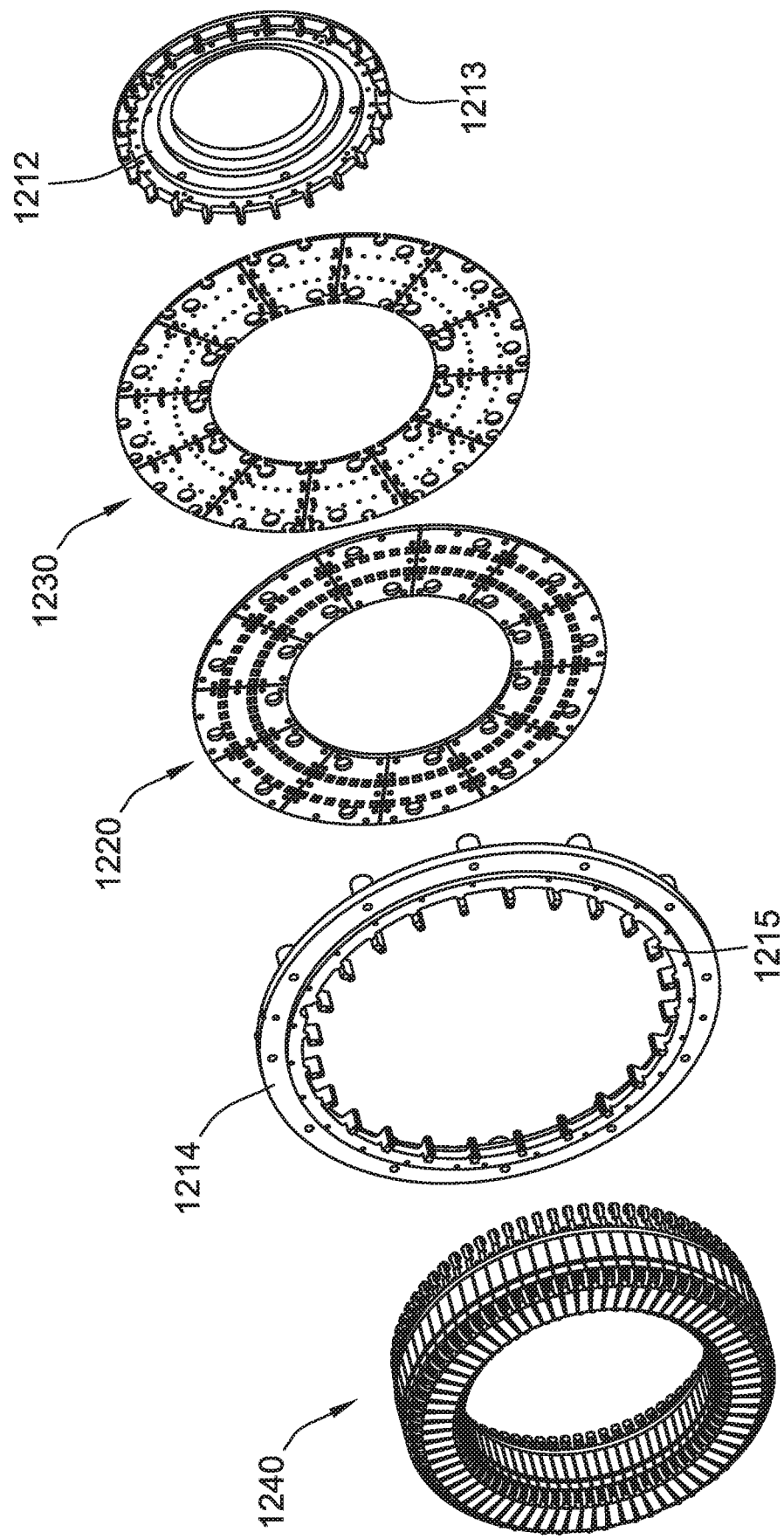
FIG. 12D is an additional exploded perspective view of the implementation of the stator assembly of FIG. 12A, according to aspects of the present disclosure.

FIG. 12A and FIG. 12B illustrate perspective views of the stator assembly 1200, while FIG. 12C and FIG. 12D illustrate exploded views of the stator assembly 1200 of FIG. 12A and FIG. 12B, respectively. The stator assembly 1200 generally includes a stator plate 1210, a circuit board 1230, and a coil housing 1240 mounted to the stator plate 1210. The coil housing 1240 includes slots in which the coil modules may be disposed during operation of the electromagnetic machine 1100. The stator plate 1210 generally includes an inner stator mount 1212, a circumferentially extending outer stator mount 1214, and a hub retainer 1217. The inner stator mount 1212 defines the stator opening 1216. The hub retainer 1217 is coupled to the inner stator mount 1212 and is generally positioned within the stator opening 1216 of the inner stator mount 1212. The hub retainer 1217 itself generally defines an opening through which the axle 1105 and the bearing assembly 1400 will be disposed when the electromagnetic machine 1100 is assembled. The bearing assembly 1400 is generally coupled to the inner periphery of the hub retainer 1217 via the fasteners that extend through the apertures 1406 in the flange 1404 of the bearing assembly. When the locking mechanism is removed from the housing locking apertures 1122 and the stator assembly locking apertures 1222, the hub retainer 1217 retains the stator assembly 1200 in its axial alignment with the axle 1105 and the bearing assembly 1400. The stator assembly 1200 is thus still able to be rotated about the axle 1105 via the bearings 1408A, 1408B of the bearing assembly 1400. The hub retainer 1217 also assists in maintaining the inner edge of the inner stator mount 1212 in alignment with the flange 1404 of the bearing assembly 1400.

The stator assembly locking apertures 1222 are defined in or coupled to the outer stator mount 1214. In some implementations, the inner stator mount 1212 receives the fasteners that extend through the first wall 1104A and the flange 1404 of the bearing assembly 1400. In other implementations, other components of the stator assembly 1200 receive the fasteners.

The stator plate 1210 further includes a circumferentially extending alignment plate 1220 (FIGS. 12C and 12D) that is disposed at least partially between the inner stator mount 1212 and the outer stator mount 1214. The alignment plate 1220 has a generally circular shape with an opening defined in the center thereof, and thus has an inner periphery and an outer periphery. The inner periphery of the alignment plate 1220 overlaps with and is coupled to a periphery of the inner stator mount 1212, while the outer periphery of the alignment plate 1220 overlaps with and is coupled to an inner periphery of the outer stator mount 1214. In an implementation, the alignment plate 1220 is modular and is formed from a plurality of separate and distinct alignment plate sections that are disposed about the inner stator mount 1212. In another implementation, the alignment plate 1220 is a single unitary piece.

The circuit board 1230 is coupled to and generally overlaps with the alignment plate 1220. Similar to the alignment plate 1220, the circuit board 1230 can be modular and thus can be formed from a plurality of separate and distinct circuit board sections. Each of the circuit board sections can correspond to one of the alignment plate sections. The circuit board sections can be electrically connected together by one or more circuit board jumpers 1232, and are generally attached to the alignment plate sections via fasteners, such as screws, rods, pins, etc. In another implementation, the circuit board 1230 is a single unitary piece. The electrical connections between the circuit board 230 can be designed in any manner required for the specific application of the electromagnetic machine 100, and may be replaced from time to time as application requirements change. As will be described in more detail herein, the alignment plate 1220 is used to align the electrical leads from the coil modules with the circuit board sections, and to assist in maintaining contact between the electrical leads from the coil modules and the circuit board 1230.

The inner stator mount 1212 includes a plurality of flanges 1213 extending from the outer periphery of the inner stator mount 1212 towards the coil housing 1240. Similarly, the outer stator mount 1214 includes a plurality of flanges 1215 extending from the inner periphery of the outer stator mount 1214 towards the coil housing 1240. The flanges 1213 are configured to be coupled to an inner periphery of the coil housing 1240, while the flanges 1215 are configured to be coupled to an outer periphery of the coil housing 1240, as will be described in further detail herein.

Figure 13A:
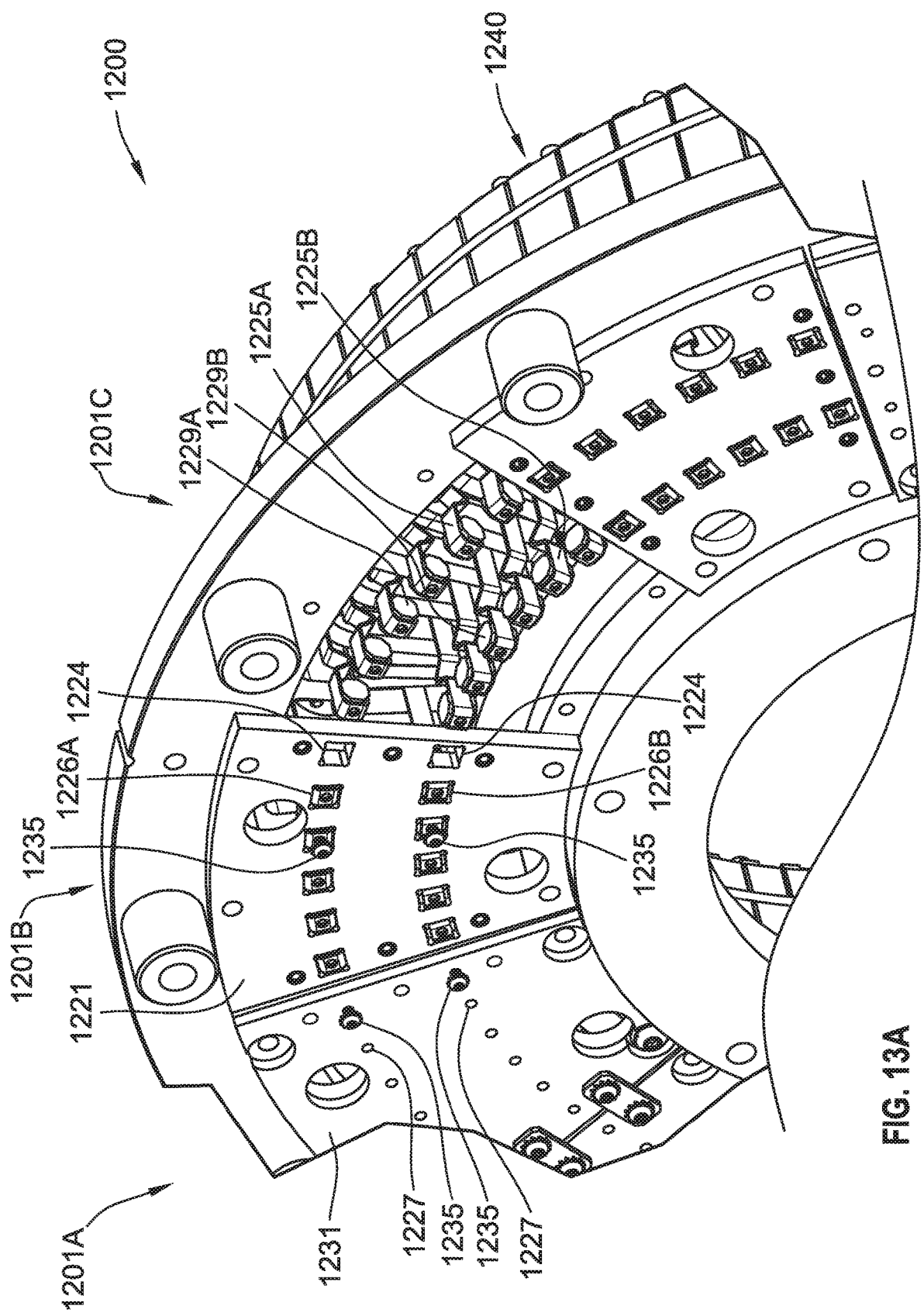
FIG. 13A is an enlarged perspective view of the implementation of the stator assembly of FIG. 12A, according to aspects of the present disclosure.

The arrangement between the coil modules, the circuit board, and the alignment plate is illustrated in FIG. 13A. FIG. 13A illustrates three portions 1201A, 1201B, and 1201C of the stator assembly 1200. The first portion 1201A includes circuit board section 1231 and an underlying alignment plate section underneath the circuit board section 1231. The second portion 1201B shows the circuit board section removed, leaving only the underlying alignment plate section 1221. The third portion 1201C shows both the circuit board section and the underlying alignment plate section removed.

As shown, each of the plurality of coil modules includes two coil leads 1225A and 1225B extending out of the coil housing toward the alignment plate and the circuit board. Each coil lead 1225A, 1225B is generally wrapped around a respective coil nut 1229A, 1229B. The coil nuts 1229A, 1229B can be made of a conductive material or a non-conductive material. The coil nuts 1229A, 1229B are sized so as to fit through alignment plate coil lead apertures 1224 that are defined by each alignment plate section. The alignment plate coil lead apertures 1224 generally have a rectangular cross-section. This allows the coil nuts 1229A, 1229B to fit into and through the alignment plate coil lead apertures 1224 but restricts the coil nuts 1229A, 1229B from rotating within the alignment plate coil lead apertures 1224.

Because the coil leads 1225A, 1225B are wrapped around the coil nuts 1229A, 1229B, terminating ends 1226A, 1226B of the coil leads 1225A, 1226B will extend through the alignment plate coil lead apertures 1224, as shown in section 1201B. As shown with respect to the first portion 1201A, the circuit board sections are disposed directly on top of the alignment plate sections, thus sandwiching the terminating ends 1226A, 1226B of the coil leads 1225A, 1225B between the coil nuts 1229A, 1229B and the circuit board section. In this configuration, the terminating ends 1226A, 1226B of the coil leads 1225A, 1225B contact the circuit board at respective circuit board contact areas, thus electrically connecting the coil modules to the circuit boards. The alignment plate sections help to align the terminating ends 1226A, 1226B of the coil leads 1225A, 1225B with the appropriate circuit board contact area. The pressure on the terminating ends 1226A, 1226B of the coil leads 1225A, 1225B also helps to maintain the electrical connection between the coil modules and the circuit board.

In an implementation, each circuit board section has a plurality of circuit board coil lead apertures 1227 defined therein that correspond to the plurality of the alignment plate coil lead apertures 1224. In this implementation, an alignment component 1235, such as a screw, bolt, pin, clamp, etc., can be inserted through the circuit board coil lead apertures 1227 and the alignment plate coil lead apertures 1224. The alignment components 1235 then pass through apertures defined in the terminating ends 1226A, 1226B of the coil leads 1225A, 1225B, and insert into cavities defined in the coil nuts 1229A, 1229B. The alignment components 1235 thus secure the coil leads 1225A, 1225B in place. In some implementations, the alignment components 1235 are screws that have a head and a threaded body. The heads of the screws are generally larger than the circuit board coil lead apertures 1227, while the threaded bodies of the screws are smaller than the circuit board coil lead apertures 1227.

In some implementations, the cavities defined in the coil nuts 1229A, 1229B are threaded such that the screws can be fastened to the coil nuts 1229A, 1229B. As the screws are tightened, the terminating ends 1226A, 1226B are sandwiched between the circuit board sections and the coil nuts 1229A, 1229B. This serves both to couple the circuit board section and the alignment plate section together, and to assist in completing and maintaining the electrical connection between the coil leads 225A, 225B and the circuit board section. In some implementations, the alignment components 1235 can be electrically conductive and can be configured to contact both the circuit board when disposed through the circuit board coil lead apertures, and the terminating ends 1226A, 1226B of the coil leads 1225A, 1225B, thus helping to ensure that the coil leads 1225A, 1225B are electrically connected to the circuit board.

Figure 13B:
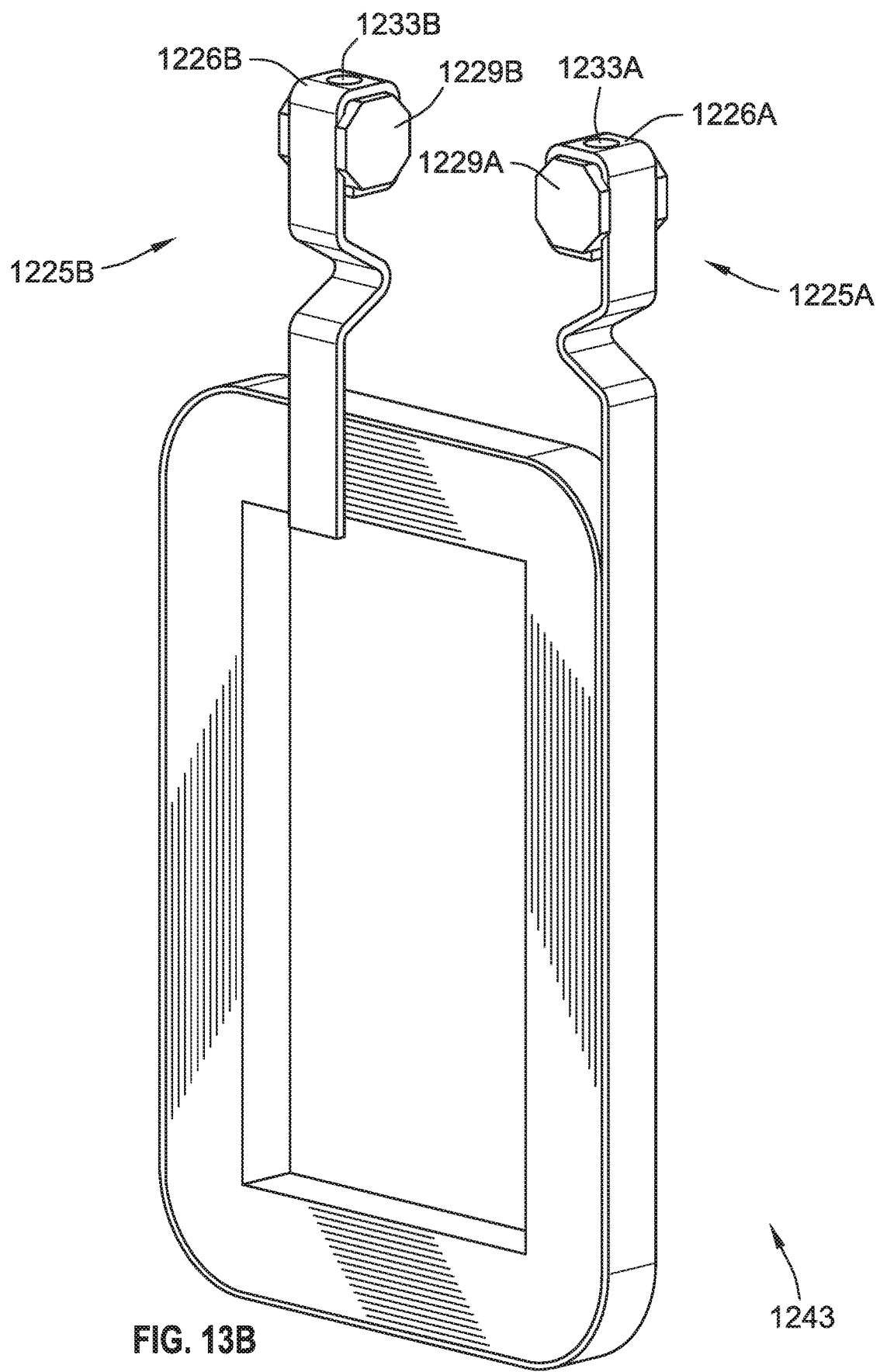
FIG. 13B is a perspective view of a coil of the stator assembly of FIG. 12A, according to aspects of the present disclosure.

FIG. 13B shows a zoomed-in view of the coil nuts 1229A, 1229B of a single coil 1243. As shown, the two coil leads 1225A, 122B extend away from the coil 1243 and wrap around respective coil nuts 1229A, 1229B. The terminating ends 1226A, 1226B of the coil leads 1225A, 1225B face the same direction, and have respective apertures 1233A, 1233B defined therein. The apertures 1233A, 1233B are aligned with apertures in the coil nuts 1229A, 1229B that allow the alignment components 1235 (FIG. 13A) to be inserted into the cavities of the coil nuts 1229A, 1229B.

As can be seen in FIG. 13B, the coil nuts 1229A, 1229B have a generally hexagonal cross-sectional shape. This allows the coil nuts 1229A, 1229B to be inserted through the alignment plate coil lead apertures 1224. However, because the alignment plate coil lead apertures 1224 have a generally rectangular cross-section, the coil nuts 1229A, 1229B cannot rotate within the alignment plate coil lead apertures 1224. The coil nuts 1229A, 1229B are also larger than the circuit board coil lead apertures 1227, thus preventing the coil nuts 1229A, 1229B from extending too far out of the alignment plate coil lead apertures 1224 in response to the alignment components 1235 being secured to the coil nuts 1229A, 1229B. The coil nuts 1229A, 1229B and the alignment plate coil lead apertures 1224 can also have other relative shapes so as to prevent the coil nuts 1229A, 1229B from rotating within the alignment plate coil lead apertures 1224.

In some implementations, the coil nuts 1229A, 1229B generally have at least one face with a groove 1239A, 1239B formed therein. The width of the grooves 1239A, 1239B is approximately equal to the width of the coil leads 1225A, 1226B, such that the coil leads 1225A, 1225B can fit within the grooves 1239A, 1239B. This allows the coil leads 1225A, 1225B to sit flush with the rest of that face of the coil nuts 1229A, 1229B. In this configuration, the alignment plate coil lead apertures 1224 simply need to be large enough to allow the coil nuts 1229A, 1229B to pass through, and do not need to provide any extra space for the thickness of the coil leads 1225A, 1225B. As can be seen in FIG. 13B, the coil leads 1225A, 1225B are generally folded or bent so as to provide a small amount of slack in the length of the coil leads 1225A, 1225B. When the coils 1243 are inserted into the stator assembly 1200 and secured to the circuit board 1230, the slack in the coil leads 1225A, 1225B allows the coil leads 1225A, 1225B to stretch slightly, so as to prevent the coil leads 1225A, 1225B from breaking or being damaged during the assembling or disassembling of the electromagnetic machine 1100, and also so as to prevent the coils 1243 from being pulled out of alignment within the coil housing 1240.

Figure 14A:
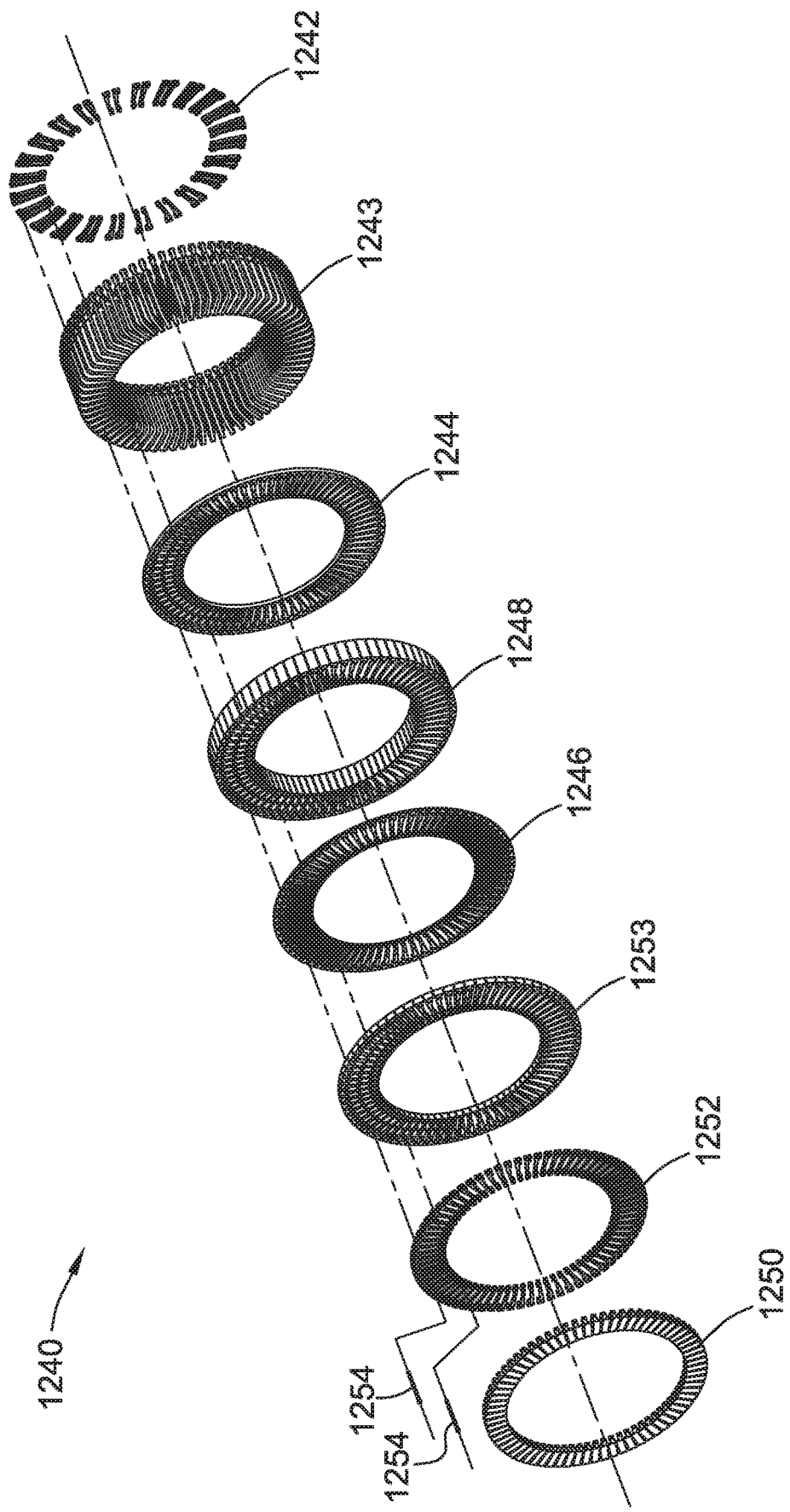
FIG. 14A is an exploded perspective view of another implementation of a coil housing, according to aspects of the present disclosure.
Figure 14B:
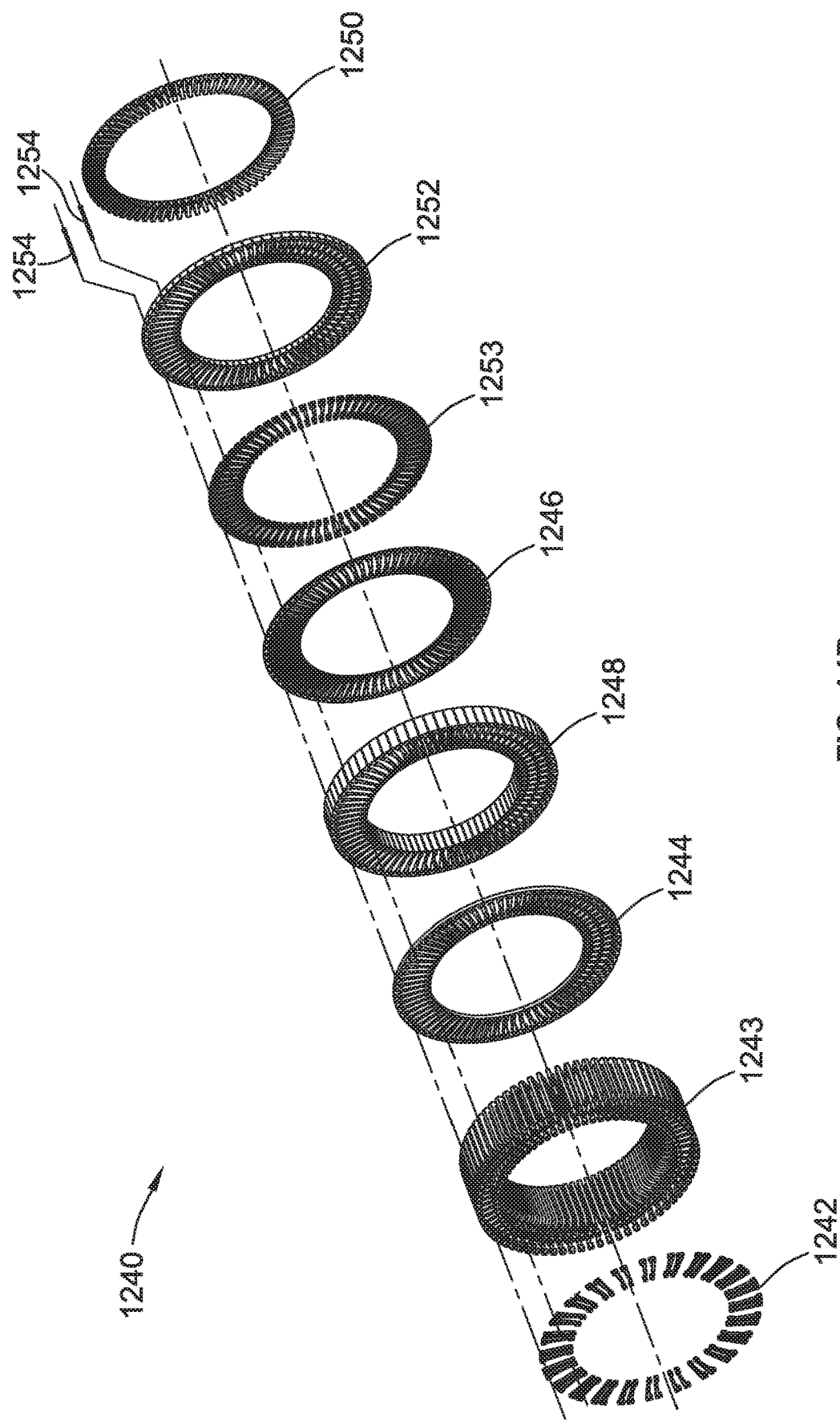
FIG. 14B is an additional exploded perspective view of the implementation of the coil housing of FIG. 14A, according to aspects of the present disclosure.

Referring now to FIG. 14A and FIG. 14B, the coil housing 1240 includes a variety of different components arranged in a circumferential manner. The coil housing 1240 includes a first coil housing ring 1244 and a second coil housing ring 1246. The coil housing rings 1244, 1246 define the slots into which the coils 1243 and the corresponding permeable coil cores 1251 (see FIGS. 15A and 15B) are inserted. The coil housing 1240 further includes a plurality of independent core modules 1248 that are disposed between the first coil housing ring 1244 and the second coil housing ring 1246. A plurality of first backing components 1253 and a plurality of second backing components 1250 are disposed on a side of the coil housing 1240 opposite the side of the coil housing 1240 where the coils 1243 are inserted.

The coil housing 1240 also includes a plurality of stator plate mounting brackets 1242 positioned on the end of the coil housing 1240 where the coils 1243 are inserted, and a plurality of coil housing mounting brackets 1252 positioned on the opposite end of the coil housing 1240. The coil housing mounting brackets 1252 are positioned between the first and second backing components 1253, 1250. Each of the second backing components 1250 has a groove in which a portion of the coil housing mounting brackets 1252 are configured to seat into, thereby locking the second backing components 1250 into place.

Finally, the coil housing 1240 includes a plurality of coil housing mounting components 1254 that are configured to couple together the components of the coil housing 1240. The coil housing mounting components 1254 generally include an inner set of coil housing mounting components 1254 and an outer set of coil housing mounting components 1254. Each coil housing mounting component 1254 generally extends (i) from the stator plate mounting brackets 1242, (ii) through the first coil housing ring 1244, the independent core modules 1248, the second coil housing ring 1246, and the first backing components 1253 and to (iii) the coil housing mounting brackets 1252. The coil housing mounting components 1254 can be bolts, pins, screw, etc., and are configured to lock into place once placed through all of the necessary components. The coil housing mounting components 1254 thus provide the tension maintaining all of the components of the coil housing 1240 in place. Generally, the inner set of coil housing mounting components 1254 extends through an inner periphery of the components of the coil housing 1240, while the outer set of coil housing mounting components 1254 extends through an outer periphery of the components of the coil housing 1240.

A portion of the coil housing mounting components 1254 are also configured to couple the coil housing 1240 to the inner stator mount 1212 and the outer stator mount 1214. As shown in FIGS. 14A and 14B, the stator plate mounting brackets 1242 are arranged circumferentially about the coil housing 1240. However, in certain positions around this circumferential arrangement, some of the stator plate mounting brackets 1242 are missing, leaving gaps between adjacent stator plate mounting brackets 1242. These gaps are aligned with the flanges 1213 of the inner stator mount 1212 and the flanges 1215 of the outer stator mount 1214. The inner coil housing mounting components 1254 that extend through the coil housing 1240 at the circumferential locations corresponding to missing stator plate mounting brackets 1242 instead couple to the flanges 1213 of the inner stator mount 1212. The outer coil housing mounting components 1254 that extend through the coil housing 1240 at the circumferential locations corresponding to the missing stator plate mounting brackets 1242 instead couple to the flanges 1215 of the outer stator mount 1214. Because these coil housing mounting components 1254 still extend through the rest of the components of the coil housing 1240, the coil housing 1240 is thereby coupled to both the inner stator mount 1212 and the outer stator mount 1214. In some implementations, the coil housing 1240 does not contain any stator plate mounting brackets 1242, and any of the coil housing mounting components 1253 attach only to the flanges 1213 of the inner stator mount 1212 and flanges 1215 of the outer stator mount 1214.

Figure 15B:
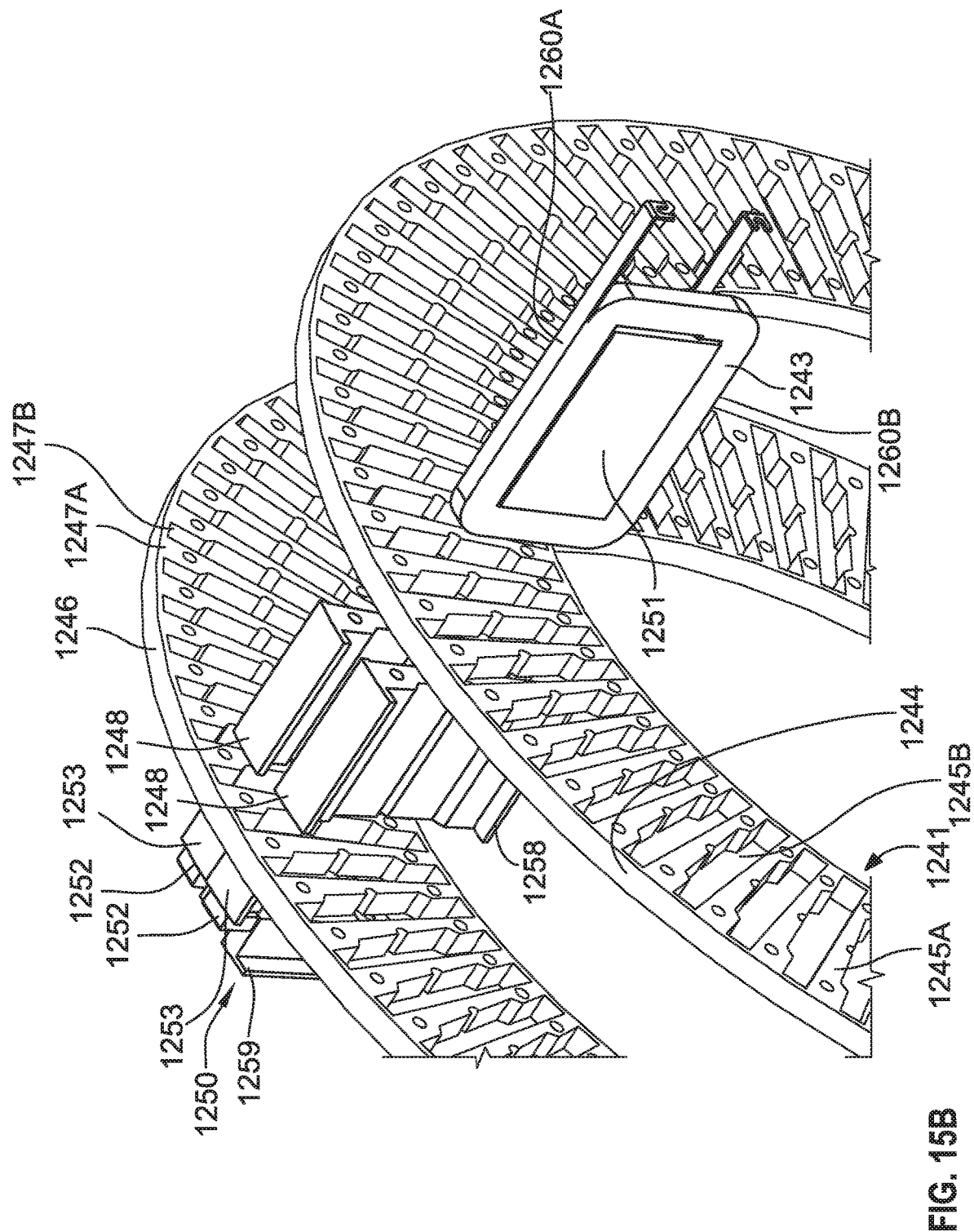
FIG. 15B is an additional enlarged perspective view of the implementation of the coil housing of FIG. 14A, according to aspects of the present disclosure.

Detailed views of the coil housing 1240 are illustrated in FIG. 15A and FIG. 15B. Various portions of the components of the coil housing 1240 have been removed from the figures to show internal details. As shown, each coil 1243 includes a corresponding permeable coil core 1251. In this manner, each coil 1243 is wound around its own individual core 1251. The coil cores 1251 can be made of a ferromagnetic material, such as laminated electrical steel. In some implementations, each individual core 1251 is configured to be disposed completely within its corresponding coil 1243. In other implementations, each individual core 1251 is disposed partially within its corresponding coil 1243 such that at least a portion of each core 1251 extends outside of the bounds of its corresponding coil 1243. In some implementations, each coil 1243 can have a generally rectangular shape that includes a first side surface 1260A, a second side surface 1260B, and a third side surface 1260C. The cores 1251 can have a similar generally rectangular shape. Other shapes for the coils 1243 and the cores 1251 are also contemplated.

The coil housing 1240 includes the first coil housing ring 1244 and the second coil housing ring 1246. Each of these coil housing rings can be made of a ferromagnetic material such as laminated electrical steel. Both of the coil housing rings 1244, 1246 are generally circular shaped and have an inner periphery and an outer periphery. The first coil housing ring 1244 includes a plurality of repeating columns 1245A connecting the inner periphery and the outer periphery of the first coil housing ring 1244. The first coil housing ring also defines a plurality of gaps 1245B. Each gap 1245B is defined between adjacent columns 1245A and is sized such that the coils fit through the gaps 1245B.

Similarly, the second coil housing ring 1246 also includes a plurality of repeating columns 1247A connecting the inner periphery and the outer periphery of the second coil housing ring 1246. The second coil housing ring 1246 defines a plurality of gaps 1247B. Each gap 1247B is defined between adjacent columns 1247A and is sized such that the coils 1243 fit through the gaps 1247B. The gaps 1245B defined in the first coil housing ring 1244 and the gaps 1247B defined in second coil housing ring 1246 overlap, and thus the first coil housing ring 1244 and the second coil housing ring 1246, when assembled as part of the coil housing 1240, define the plurality of slots 1241 which are sized to receive a plurality of coils 1243, each slot 1241 receiving a single coil 1243.

FIGS. 15A and 15B show two of the independent core modules 1248 that are disposed between the first coil housing ring 1244 and the second coil housing ring 1246. The independent core modules 1248 can be made of a ferromagnetic material similar to the other components of the coil housing 1240, such as laminated electrical steel. The independent core modules 1248 are disposed between the first coil housing ring 1244 and the second coil housing ring 1246 such that an end of each of the independent core modules 1248 adjacent the first coil housing ring 1244 abuts one of the columns 1245A, while an opposing end of each of the independent core modules 1248 adjacent the second coil housing ring 1246 abuts a corresponding one of the columns 1247A. The independent core modules 1248 are disposed in areas between the first coil housing ring 1244 and the second coil housing ring 1246 that would otherwise be empty space between adjacent coils 1243. Thus, when the coil 1243 and corresponding core 1251 of FIGS. 15A and 15B is received within the slots 1241 of the coil housing 1240, the coil 1243 and corresponding core 1251 will be disposed between the pair of independent core modules 1248 that are illustrated in FIGS. 15A and 15B. When the electromagnetic machine 1100 is fully assembled, each coil 1243-core 1251 combination will be disposed between a pair of adjacent independent core modules 1248.

In some implementations, each of the independent core modules 1248 includes an outer radial lip 1257 and in inner radial lip 1258. The outer radial lip 1257 of each of the independent core modules 1248 is configured to extend over the first side surface 1260A of a corresponding one of the coils 1243. Similarly, the inner radial lip 1258 of each of the independent core modules 1248 is configured to extend over the second side surface 1260B of a corresponding one of the coils 1243. The presence of the radial lips 1257, 1258 reduces or eliminates any gaps between the side surfaces 1260A, 1260B of the coils 1243 and the radial magnets of the electromagnetic machine 1100. This helps to channel magnetic flux from the radial magnets to the coils 1243 more efficiently.

The plurality of first backing components 1253, the plurality of second backing components 1250, and the plurality of coil housing mounting brackets 1252 are disposed on a side of the coil housing 1240 opposing the stator plate 1210. The first and second backing components 1253 and 1250 can be made of a ferromagnetic material similar to other components of the coil housing 1240, such as laminated electrical steel. Each of the first and second backing components 1253 and 1250 has a groove defined therein that is configured to mate with an edge of a corresponding coil housing mounting bracket 252 such that the backing components 250 and the coil housing mounting brackets 252 interlock with each other. Each of the second backing components 1250 includes an axial lip 1259 that is configured to extend over the third side surface 1260C of a corresponding one of the coils 1243. The axial lips 1259 of the backing components 1250 reduce or eliminate any gaps between the third side surface 1260C and the axial magnets of the electromagnetic machine 1100. This helps to channel magnetic flux from the axial magnets to the coils 1243 more efficiently.

The ferromagnetic components of the coil housing 1240 can include the first coil housing ring 1244, the second coil housing ring 1246, the independent core modules 1248, the first backing components 1253, the second backing components 1250, and the coil cores 1251. All of the components of the coil housing 1240 can be high permeability materials with low hysteresis and related core losses, which may be utilized to maximize the strength of the magnetic field in the region of the coil housing 1240.

The combination of the access windows defined in the housing of the electromagnetic machine, the stator being coupled to the axle via the bearing assembly, the circuit board and alignment plate being formed in sections, and the coil modules being housed in individual slots within the coil housing allows the electromagnetic machine 1100 to be a modular machine where individual coil modules can be replaced, repaired, or upgraded without having to take apart or dissemble the entire machine. The circuit board sections can be easily swapped out to wire the coil modules in different arrangements, thus allowing the electromagnetic machine to be used in a wide variety of applications. By providing the access windows in the housing, an individual is able to access the internal components of the electromagnetic machine without removing the entirety of the housing. This has the added benefit of maintaining alignment between the rotor and the stator. Moreover, the coil modules are simply inserted into individual slots defined in the coil housing for operation, and thus are easy to remove from the electromagnetic machine.

Once the access window cover has been removed, the individual can deactivate the locking mechanism to allow the stator assembly to rotate about the bearing assembly relative to the housing. The individual can then rotate the stator assembly until the circuit board section or coil modules that needs to be addressed is accessible through the window. Because the circuit board can be formed in separate and distinct sections, only a single circuit board section needs to be removed to access any of the coil modules underneath. Thus, rather than having to electrically disconnect all of the coils of the electromagnetic machine to replace a single coil module, the individual only has to electrically disconnect the coil modules connected to the single circuit board segment. In an implementation, the electromagnetic machine includes seventy-two coil modules circumferentially arranged in the stator and twelve circuit board sections. Thus, each circuit board section is directly electrically connected to only six coils, which reduces the number of coils that need to be detached to remove a circuit board segment from seventy-two coils to six coils. In other implementations, the electromagnetic machine includes 12, 36, 144, or any other number of coil modules, and 3, 4, 6, 24, or any other number of circuit board sections.

Figures 16A, 16B:
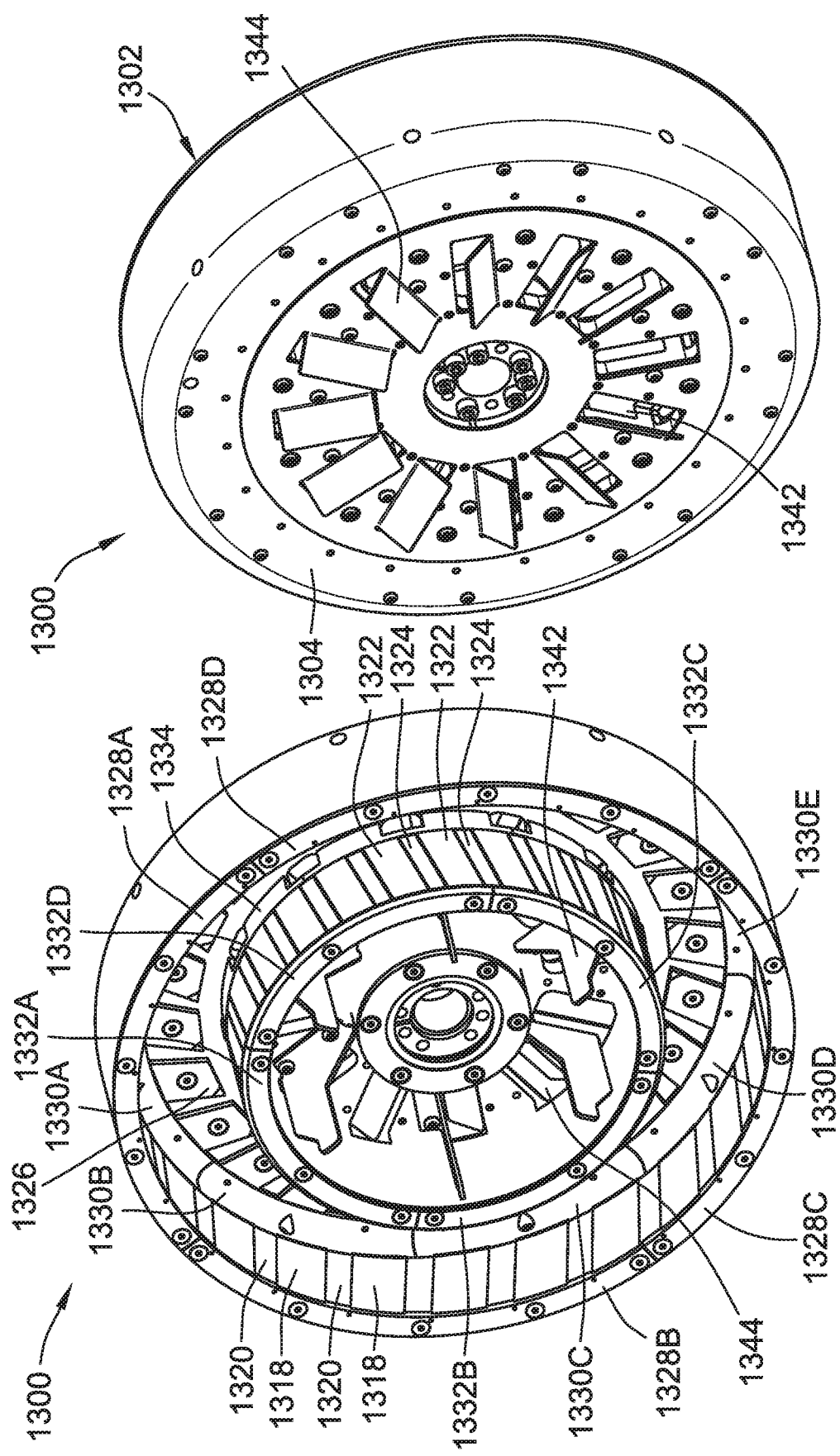
FIG. 16A is a perspective view of another implementation of a rotor assembly, according to aspects of the present disclosure.
FIG. 16B is an additional perspective view of the implementation of the rotor assembly of FIG. 16A, according to aspects of the present disclosure.
Figure 16D:
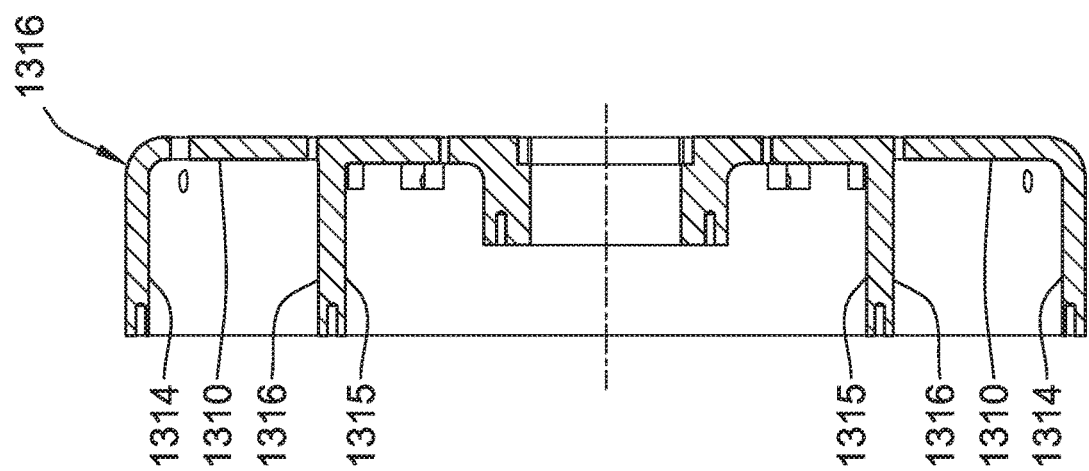
FIG. 16D is a cross-sectional view of the rotor housing of FIG. 16C, according to aspects of the present disclosure.
Figure 16C:
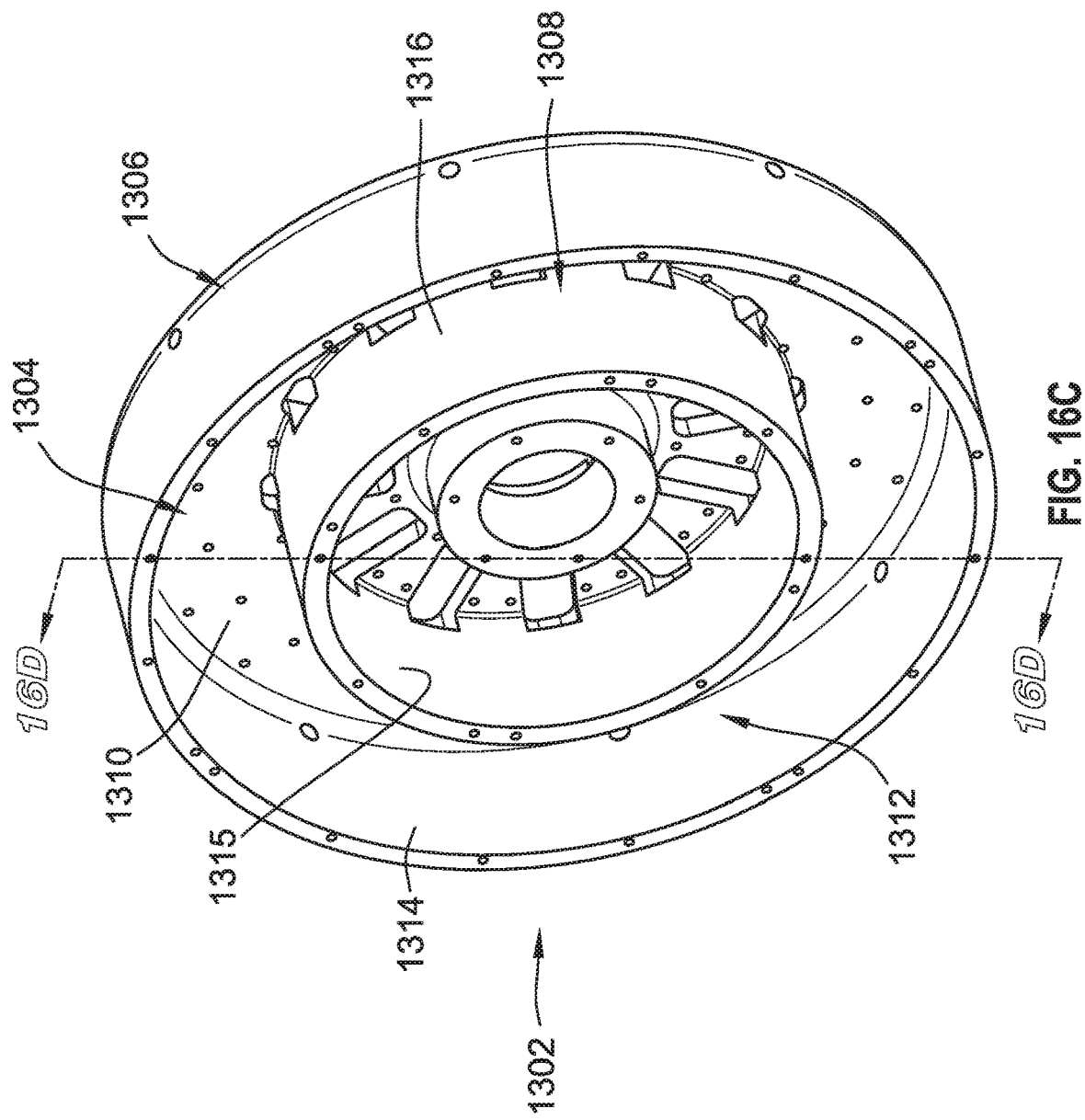
FIG. 16C is a perspective view of a rotor housing of the implementation of the rotor assembly of FIG. 16A, according to aspects of the present disclosure.

FIG. 16A and FIG. 16B illustrate perspective views of the rotor assembly 1300, while FIG. 16C illustrates a perspective view of a rotor housing 1302 of the rotor assembly 1300. FIG. 16D illustrates a cross-sectional view along cross-sectional line 16D indicated in FIG. 16C. As shown, the rotor assembly 1300 houses the magnets of the electromagnetic machine 1100. The rotor assembly includes a rotor housing 1302 that is coupled to the axle such that rotation of the axle causes the rotor housing 1302 to rotate. Conversely, rotation of the rotor housing 1302 causes the axle to rotate. In an implementation, the axle has a rotation locking feature that is configured to non-rotationally mate with a rotation locking feature of the rotor housing 1302 to prevent relative rotation between the axle and the rotor housing 1302. The rotation locking feature of the axle can be a protrusion, ring, nub, or other structural feature, while the rotation locking feature of the rotor housing 1302 can be a groove or aperture defined in the rotor housing 1302, or vice versa. In another implementation, the axle is fixedly coupled to the rotor housing 302 as a single integral piece.

The rotor housing 1302 includes a back portion 1304, an outer ring portion 1306, and an inner ring portion 1308. The outer ring portion 1306 and the inner ring portion 1308 are arranged generally concentrically about the axle, and extend away from a surface 1310 of the back portion 1304 generally in a first direction. In an implementation, the outer ring portion 1306 and the inner ring portion 1308 are parallel. In other implementations, the outer ring portion 1306 and the inner ring portion 1308 can be disposed at angles with respect to each other, or with respect to the back portion 1304. A circumferentially extending channel 1312 is defined between the outer ring portion 1306 and the inner ring portion 1308. The channel 1312 is generally defined by a first surface, a second surface, and a third surface. The first surface is formed from an inner surface 1314 of the outer ring portion 1306 of the rotor housing 1302. The second surface is formed from an outer surface 1316 of the inner ring portion 1308 of the rotor housing 1302. The third surface is formed from the portion of the surface 1310 of the back portion 1304 that is disposed between the outer ring portion 1306 and the inner ring portion 1308. Generally, the back portion 1304, the outer ring portion 1306, and the inner ring portion 1308 are all formed as a single unitary piece.

Generally, the inner surface 1314 of the outer ring portion 1306 and the outer surface 1316 of the inner ring portion 1308 are parallel to each other and to a longitudinal axis of the axle. Thus, the first surface and the second surface defined by the channel 1312 are generally parallel to each other. The surface 1310 of the back portion 1304 is generally orthogonal to both the inner surface 1314 of the outer ring portion 1306 and the outer surface 1316 of the inner ring portion 1308. Thus, the third surface defined by the channel 1312 is generally orthogonal to both the first surface and the second surface such that the channel 1312 has a U-shaped cross section. Other cross-sectional shapes of the channel 1312 are also contemplated.

The rotor assembly 1300 further includes a plurality of magnets disposed within the circumferentially extending channel 1312. The plurality of magnets is disposed in circumferentially extending groups of magnets. As shown in FIG. 16A, the plurality of magnets includes outer radial magnets 1318 coupled to the inner surface 1314 of the outer ring portion 1306 of the rotor housing 1302. Each adjacent pair of outer radial magnets 1318 can be separated by an outer radial spacer 1320. The outer radial magnets 1318 and the outer radial spacers 1320 are disposed along the circumferentially extending channel 1312 such that the outer radial magnets 1318 and the outer radial spacers 1320 generally encircle the axle.

The plurality of magnets further includes inner radial magnets 1322 coupled to the outer surface 1316 of the inner ring portion 1308 of the rotor housing 1302. Each adjacent pair of inner radial magnets 1322 can be separated by an inner radial spacer 1324. The inner radial magnets 1322 and the inner radial spacers 1324 are disposed along the circumferentially extending channel 1312 such that the inner radial magnets 1322 and the inner radial spacers 1324 generally encircle the axle.

Finally, the plurality of magnets includes axial magnets 1326 coupled to the surface 1310 (FIG. 16C) of the back portion 1304 of the rotor housing 1302 between the inner ring portion 1308 and the outer ring portion 1306. Like outer radial magnets 1318 and inner radial magnets 1322, the axial magnets 1326 in the axial group of magnets 1326 are disposed along the circumferentially extending channel 1312 such that the axial magnets 1326 generally encircle the axle or the radius of the inner ring portion 1308 of the rotor housing 1302.

Each of the magnets 1318, 1322, and 1326 may be coupled to the respective surfaces of the rotor housing 1302 in a variety of ways. For example, an adhesive layer can be disposed between the magnets and the surface of the rotor housing 1302 to thereby adhesively couple the magnets to the surface of the rotor housing 1302. The magnets can also be screwed into the surface of the rotor housing 1302. In some implementations, the rotor housing 1302 can include a retention component that assists in coupling any of the magnets to the rotor housing 1302. The retention component could include one or more clamps or pins that are designed to retain any of the magnets to the corresponding surface. The retention component could also include one or more retaining rings. Generally, the retaining rings are disposed in the channel 1312 and are formed to fit around at least a portion of the circumference of the channel 1312. In this manner, the radius of curvature of the retaining ring is generally equal to the radius of the outer ring portion 1306 of the rotor housing 1302, or the radius of the inner ring portion 1308 of the rotor housing 1302.

In the implementation shown in FIG. 16B, the rotor assembly 1300 includes a first retention ring that is formed from first retention ring components 1328A-D. The first retention ring components 1328A-D are disposed at an edge of the outer ring portion 1306 that is spaced apart from the back portion 1304 of the rotor housing 1302. First retention ring components 1328A-D can be coupled to the rotor housing 1302 via screws, adhesive, or any suitable mechanism, and is configured to help hold one edge of each of the outer radial magnets 1318 in place. Similarly, a second retention ring that is formed from second retention ring components 1330A-E can be disposed at an edge of the outer ring portion 1306 that abuts the back portion 1304 of the rotor housing 1302. The second retention ring components 1330A-D help to hold the opposite edge of each of the outer radial magnets 1318 in place. The rotor assembly 1300 can further include a third retention ring formed from third retention ring components 1332A-D and a fourth retention ring 1334 that help to hold each of the inner radial magnets 1322 in place. In other implementations, any or all of the retention rings can be formed as single unitary pieces, or can be formed as multiple components. In other implementations, any of the retention rings can instead be retentions pins, which can include or be a dowel.

Each of the outer radial magnets 1318, inner radial magnets 1322, and axial magnets 1326 can be a dipole magnet with a north pole and a south pole. Each pole of each of the magnets has a corresponding pole face, which is the terminating surface of the magnet corresponding to a respective pole. Thus, opposing surfaces of each of the outer radial magnets 1318, inner radial magnets 1322, and axial magnets 1326 are the two pole faces of each magnet. In the rotor assembly 1300, one pole face of each of the magnets faces towards the respective surface defined by the channel to which the magnets are coupled. When the magnets are mounted to the rotor housing 1302, this pole face of each magnet facing the surface defined by the channel abuts and/or contacts the channel. The other opposing pole face of each of the magnets faces away from the respective surface of the channel to which the magnets are coupled. Thus, for each of the outer radial magnets 1318, one of the pole faces abuts the inner surface 1314 of the outer ring portion 1306 of the rotor housing 1302, while the other pole face of each of the outer radial magnets 1318 faces away from the inner surface 1314 of the outer ring portion 1306 of the rotor housing 1302. For each inner radial magnet 1322, one of the pole faces abuts the outer surface 1316 of the inner ring portion 1308 of rotor housing 1302, while the other pole face of each of the inner radial magnets 1322 faces away from the outer surface 1316 of the inner ring portion 1308 of rotor housing 1302. For each axial magnet 1326, one pole face abuts the surface 1310 of the back portion 1304 of the rotor housing 1302 between the outer ring portion 1306 and the inner ring portion 1308, while the other pole face of each of the axial magnets 1326 faces away from the surface 1310 of the back portion 1304 of the rotor housing 1302 between the outer ring portion 1306 and the inner ring portion 1308.

The groups of magnets 1318, 1322, 1326 disposed within the channel 1312 of the rotor housing 1302 can be categorized into sets of magnets. Each set of magnets contains one outer radial magnet 1318, one inner radial magnet 1322, and one axial magnet 1326. The three magnets in each set of magnets can be located at identical circumferential positions within the channel 1312 relative to the axle. Thus, a magnet set containing the outer radial magnet 1318 located at the three o'clock position within the channel 1312 relative to the orientation of the channel 1312 in FIG. 16C would also contain the inner radial magnet 1322 and the axial magnet 1326 that are both also located at the three o'clock position. In an exemplary implementation of the electromagnetic machine 1100, the rotor assembly 1300 contains twenty-four sets of magnets circumferentially disposed in the channel 1312 about the axle. The magnets in each set of magnets can also be staggered in relation to one another, and can also be oriented at a variety of angles with respect to both the surface the magnet is coupled to and the other surfaces of the rotor housing 1302.

Each magnet in any given set of magnets has an identical pole face abutting the surface of the rotor housing 1302, as compared to the other magnets in the set. Thus, each magnet in the set of magnets has an identical pole face directed towards the channel 1312 itself. The pole face that is directed towards the channel 1312 in each magnet set alternates for every circumferentially adjacent magnet set. For example, a first magnet set and a second magnet set may be disposed circumferentially adjacent to each other within the channel 1312. Each magnet in this first magnet set has the same pole face abutting the surface defining the channel. As an example, each of the three magnets in this first magnet set may have the north pole face abutting respective surfaces defining the channel 1312, and thus will have the south pole face facing towards the channel itself. Each magnet in the circumferentially adjacent second magnet face will then have the south pole face abutting the respective surfaces defining the channel 1312, and thus will have the north pole face facing towards the channel itself.

This arrangement of alternating pole faces for each magnet set continues circumferentially around the channel 1312. The alternating pole face arrangement of the magnet sets helps to direct the magnetic flux in an alternating and looping fashion through the channel, from the north pole faces to the south pole faces. With the exception of a small air gap region, when the machine is in operation, most of the channel 1312 is occupied by the stator assembly 1200, in particular the coil housing 1240 which includes the coils 1243 and coil cores 1251. The high permeability of the materials in the coil housing 1240 increases the magnetic field in the channel, and is designed to channel the flux most efficiently through the coils 1243.

In any given set of magnets, one of the pole faces of the outer radial magnet will face toward the first side surface 1260A of the coils 1243. The pole face of the same polarity of the inner radial magnet in the set of magnets will face toward the second side surface 1260B of the coils 1243. The pole face of the same polarity of the axial magnet in the set of magnets will face toward the third side surface 1260C of the coils 1243. During operation of the electromagnetic machine 1100, the rotor will rotate relative to the stator. Thus, the pole faces of the same polarity of the magnets 1318, 1322, 1326 in a single set of magnets will face toward the respective side surfaces 1260A, 1260B, 1260C of each of the coils 1243 in a rotational sequence as the rotor rotates. An adjacent set of magnets will also have pole faces of the same polarity facing toward the respective side surfaces of the coils, except that the pole face will be of the opposite polarity. Because of the alternating polarity of the pole faces of each set of magnets that faces toward the respective side surfaces of the coils 1243, the magnetic flux from the magnets is directed through the coils such that the magnetic flux is normal to a plane that is defined by the coils 1243 and/or the cores 1251.

The rotor housing 1302 can include one or more fan blades 1342 coupled thereto. In an implementation, the fan blades 1342 can be coupled to the portion of the surface 1310 of the back portion 1304 that is disposed between the inner ring portion 1306 and the axle 1105. The fan blades 1342 thus extend outwardly from the surface 1310 generally in the first direction, which is the same as the outer ring portion 1306 and the inner ring portion 1308. In another implementation, the fan blades 1342 are coupled to an inner surface 1315 of the inner ring portion 1308, and extend in a radial direction toward the axle. The rotor housing 1302 further includes one or more air flow apertures 1344 defined in the back portion 1304. During rotation of the rotor assembly 1300, the rotating fan blades 1342 direct air through the air flow apertures 1344, thus cooling the internal components of the electromagnetic machine 1100.

Figure 17:
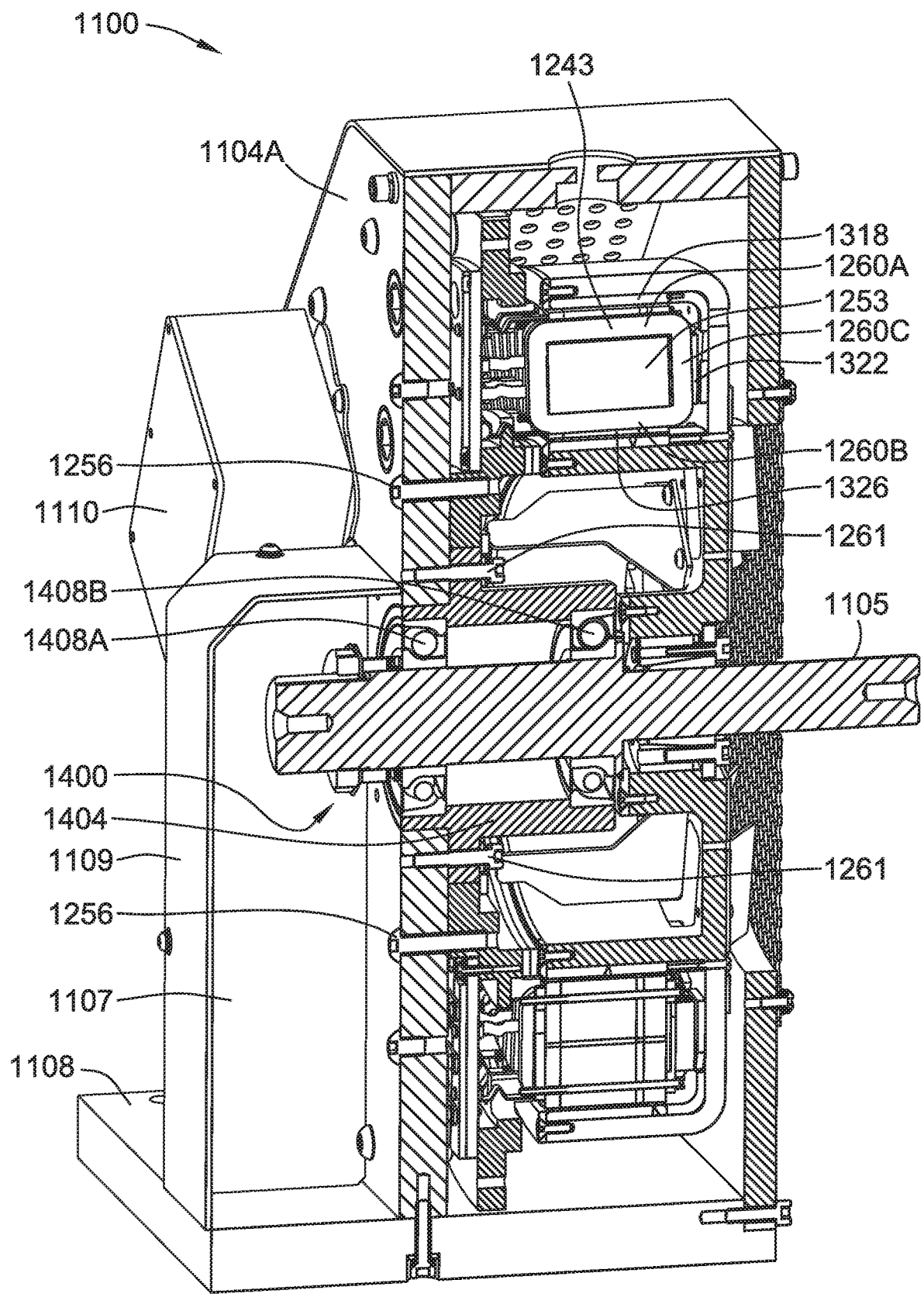
FIG. 17 is a cross-sectional view of the electromagnetic machine of FIG. 9A, according to aspects of the present disclosure.

A cross-section view of the assembled electromagnetic machine 100 is illustrated in FIG. 17. The first wall 1104A of the housing is shown, along with the connection box 1110. The axle 1105 is coupled to bearing assembly 1400. The axle 1105 is thus rotatable relative to the housing and the stator assembly. As the stator assembly and the rotor assembly come together in operation, the coils 1243 and the corresponding cores 1251 are disposed within the U-shaped channel formed by the rotor housing. Finally, FIG. 17 shows one implementation of a locking mechanism. As can be seen, the locking mechanism includes a locking member 1256 inserted through both the first wall 1104A of the housing, and the stator assembly. Thus, while the stator assembly may generally be rotatable relative to the bearing assembly 1400, the locking member 1256 prevents the stator assembly from rotating while the locking member 1256 is activated or engaged.

FIG. 17 also shows the first bearing 1408A and the second bearing 1408B of the bearing assembly 1400. As shown, the first bearing 1408A supports the axle 1105 and is positioned within the first wall 1104A. The second bearing 1408B supports the axle 1105 and is positioned within the interior of the electromagnetic machine 1100. As shown the flange 1404 of the bearing assembly 1400 is positioned between the first wall 1104A and the stator assembly. Fasteners 1261 extend through the first wall 1104A and the flange 1404 of the bearing assembly 1400 to thereby non-rotationally lock the bearing assembly 1400 to the first wall 1104A. Because the axle 1105 is rotationally coupled to the bearing assembly 1400 via the first bearing 1408A and the second bearing 1408B, the axle 1105 is able to rotate relative to the first wall 1104A and the stator assembly. The rotor assembly, which is non-rotationally coupled to the axle 1105, is thus also able to rotate relative to the first wall 1104A and the stator assembly.

As shown in FIG. 17, the outer radial magnets 1318 generally always face toward the first side surface 1260A of the coils 1243, on both the coil 1243 on top, and the coil 1243 on the bottom. Similarly, inner radial magnets 1322 always face toward the second side surface 1260B of the coils 1243, and the axial magnets 1326 always face toward the third side surface 1260C of the coils 1243.

Both the design of the rotor housing 1302 as a single unitary piece and the axle 1105 being supported by the bearing assembly 1400 enables a very small air gap to be maintained between the coil housing 1240 and the surface of the magnets within the rotor housing 1302 during operation. Generally, the distance between an outer periphery of the coil housing 1240 and the magnets in the rotor housing 1302 is about 1.2 millimeters. The size of this air gap is inversely proportional to the output power and efficiency of the electromagnetic machine, with smaller air gaps providing stronger magnetic fields in the coil housing 1240 and coil cores 1251. However, tight mechanical tolerances are required to maintain very small air gaps when the machine is in operation.

Due to the modular nature of the coils and the circuit board sections, the electromagnetic machine can be configured in a variety of ways. In an implementation, the coils are configured to provide three-phase power. In this implementation, the coils are separated into three different sets of coils, each set of coils corresponding to one of the power phases. Within each phase, the coils can be further divided into two different subsets of coils. Thus, the set of coils for each power phase can comprise two different subsets of series-wired coils, each subset wired in parallel. Each power phase therefore has a backup group of coils. If one of the coils in one subset of a power phase fails, the other subset of coils in that power phase can still provide the power for that phase, as the subsets are wired in parallel. Any number of subsets are contemplated, such as but not limited to two subsets, three subsets, four subsets, or five or more subsets. In a further implementation, all of the coils for each power phase in a multi-phase system are wired together in series. In another implementation, the coils are wired to provide single phase power. The coils in this implementation can be all be wired in series, or can be divided into two or more subsets of coils wired in series, and the subsets being wired together in parallel. In yet a further implementation, the electromagnetic machine includes seventy-two coil modules wired together to provide three-phase power. The first set of coils for the first power phase includes twenty-four coil modules, the second set of coils for the second power phase includes twenty-four coil modules, and the third set of coils for the third power phase includes twenty-four coil modules. Each set of coils is divided into equal subsets wire in parallel, each subset containing twelve coil modules wired in series.

To provide service to the electromagnetic machine described herein, the electromagnetic machine must be disconnected from an external electrical power system. A connected prime mover must be stopped and should be locked out. Once the electromagnetic machine is safely isolated and is not operating, an access window cover can be removed from the housing of the electromagnetic machine to provide access to the stator assembly through the access window. A locking mechanism can be deactivated to allow the stator assembly to be rotated within the housing. In an implementation, the locking mechanism is deactivated by removing a locking member from an aperture defined in the housing and an aperture defined in the stator assembly. The stator assembly is then rotated until a desired portion of a circuit board is accessible through the access window. Any coil modules electrically connected to the circuit board section must be disconnected, and then the circuit board section can be removed. The alignment plate section underneath the circuit board section is also removed to provide access to the coil modules. A desired coil module can be removed from the stator assembly, whether for replacement or repair. The coil module is then inserted back into the stator assembly, and the alignment plate section and circuit board section are then replaced. The new coil module is electrically connected to the circuit board, and the access window cover can then be replaced on the housing. The locking mechanism can then be activated to prevent rotation of the stator assembly relative to the housing. In an implementation, the locking mechanism is activated by inserting a locking member into an aperture defined in the housing and an aperture defined in the stator assembly.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. An electromagnetic machine comprising:
 a housing;
 a stator assembly disposed generally within the housing, the stator assembly including:
  a stator plate defining an opening,
  a circuit board,
  an alignment plate, and
  a plurality of coil modules coupled to the stator plate such that the alignment plate is disposed between the circuit board and the plurality of coil modules, each of the plurality of coil modules including at least one coil lead extending away from the coil module toward the alignment plate, the at least one coil lead of each of the plurality of coil modules being wrapped around a coil nut;
 a bearing assembly disposed in an opening defined in the housing and the opening defined in the stator plate;
 an axle coupled to the bearing assembly in a rotatable fashion such that the axle is rotatable relative to the housing and the stator assembly;
 a rotor assembly fixed to the axle and disposed generally within the housing and including a rotor housing that defines a circumferentially extending channel that is sized to receive a portion of the stator assembly therein; and
 a locking mechanism configured to selectively prevent and permit rotation of the stator assembly about the axle within the housing.

2. The electromagnetic machine of claim 1, wherein the housing has a housing locking aperture defined therein, and wherein the stator assembly has a stator assembly locking aperture defined therein.

3. The electromagnetic machine of claim 2, where the locking mechanism is configured to be inserted through the housing locking aperture and the stator assembly locking aperture to prevent the rotation of the stator assembly about the axle via the bearing assembly.

4. The electromagnetic machine of claim 2, wherein the stator assembly locking aperture is defined in the stator plate.

5. The electromagnetic machine of claim 1, wherein the stator housing includes a coil housing having a plurality of slots formed therein, each of the plurality of slots sized to receive one of the plurality of coil modules therein, each of the plurality of coil modules including a coil wrapped around a core.

6. The electromagnetic machine of claim 1, wherein the at least one coil lead and the coil nut of each of the plurality of coil modules are configured to extend through a respective one of a plurality of alignment plate coil lead apertures defined in the alignment plate such that the at least one coil lead of each of the plurality of coil modules contacts the circuit board at a respective one of a plurality of circuit board contact areas, the alignment plate assisting in maintaining the contact between the at least one coil lead of each of the plurality of coil modules and the circuit board at the respective circuit board contact area.

7. The electromagnetic machine of claim 6, wherein the circuit board includes a plurality of circuit board coil lead apertures, each of the plurality of circuit board coil lead apertures corresponding to a respective one of the plurality of alignment plate coil lead apertures.

8. The electromagnetic machine of claim 7, further comprising a plurality of alignment components, each of the plurality of alignment components being configured to extend through one of the plurality of circuit board coil lead apertures and the corresponding one of the plurality of alignment plate coil lead apertures, each of the plurality of alignment components further being configured to couple to the coil nut of a respective one of the plurality of coil modules.

9. The electromagnetic machine of claim 8, wherein the coupling of the plurality of alignment components and the coil nut of each of the plurality of coil modules assists in maintaining contact between the coil leads and the circuit board.

10. The electromagnetic machine of claim 6, wherein the coil nut of each of the plurality of coil modules has a generally hexagonal shape that restricts the coil nut from rotating within the respective one of the plurality of alignment plate coil lead apertures.

11. The electromagnetic machine of claim 1, wherein the rotor assembly defines a circumferentially extending channel, and wherein the rotor assembly includes a plurality of magnet sets disposed within the circumferentially extending channel such that the plurality of magnet sets surround the axle in a circumferential fashion, each of the plurality of magnet sets including a first magnet coupled to a first surface defined by the channel, an opposing second magnet coupled to an opposing second surface defined by the channel, and a third magnet coupled to a third surface defined by the channel, the circumferentially extending channel being sized to at least partially receive a coil housing of the stator assembly therein such that each of a plurality of coil modules mounted in the coil housing is at least partially disposed within the circumferentially extending channel.

12. The electromagnetic machine of claim 1, wherein:
the housing includes a first wall having a first opening defined therein and an opposing second wall,
the stator assembly is disposed generally between the first wall and the opposing second wall of the housing, the stator assembly defining a second opening therein, and
the bearing assembly extends at least partially though the first opening in the first wall and the second opening in the stator assembly, the bearing assembly being non-rotationally coupled to the first wall and the stator assembly, the bearing assembly including a first bearing and a second bearing, the first bearing positioned generally coincident with the first opening in the first wall, the second bearing positioned generally between the second opening in the stator assembly and the second wall.

13. The electromagnetic machine of claim 1, wherein the circuit board is disposed between a first wall of the housing and the plurality of coil modules, the circuit board including a plurality of separate and distinct circuit board sections that are electrically coupled together, each of the plurality of circuit board sections being electrically connected to a respective portion of the plurality of coil modules.

14. The electromagnetic machine of claim 13, wherein the first wall has an access window defined therein, and wherein the circuit board is accessible through the access window.

15. The electromagnetic machine of claim 14, wherein the locking mechanism is configured to be deactivated to permit rotation of the stator assembly about the axle via the bearing assembly such that a desired one of the plurality of circuit board sections is accessible through the access window.

16. The electromagnetic machine of claim 15, wherein the access window permits access to at least 8.33% of the plurality of coil modules.

17. The electromagnetic machine of claim 1, wherein the rotor housing includes (i) one or more fan blades coupled to the rotor housing and (ii) one or more air flow apertures defined therein, and wherein rotation of the rotor assembly is configured to cause the one or more fan blades to direct air through the one or more air flow apertures.

18. The electromagnetic machine of claim 1, wherein the coil nut of each of the plurality of coil modules aids in maintaining an electrical connection between the at least one coil lead of each of the plurality of coil modules and the circuit board.

19. The electromagnetic machine of claim 18, wherein the coil nut of each of the plurality of coil modules is disposed within a respective one of a plurality of alignment plate coil lead apertures defined in the alignment plate, such that at least a portion of the at least one coil lead of each of the plurality coil modules is positioned between (i) the circuit board and (ii) the coil nut around which the at least one coil lead is wrapped.

20. The electromagnetic machine of claim 19, wherein the coil nut of each of the plurality of coil modules is physically coupled to the circuit board to aid in maintaining the electrical connection between the circuit board and the at least one coil lead of each of the plurality of coil modules.

21. An electromagnetic machine comprising:
a housing;
a stator assembly disposed generally within the housing, the stator assembly including:
a stator plate defining an opening,
a plurality of coil modules coupled to the stator plate, and a circuit board disposed between a first wall of the housing and the plurality of coil modules, the circuit board including a plurality of separate and distinct circuit board sections that are electrically coupled together, each of the plurality of circuit board sections being electrically connected to one or more coil modules of the plurality of coil modules;

a bearing assembly disposed in an opening defined in the housing and the opening defined in the stator plate;

an axle coupled to the bearing assembly in a rotatable fashion such that the axle is rotatable relative to the housing and the stator assembly;

a rotor assembly fixed to the axle and disposed generally within the housing and including a rotor housing that defines a circumferentially extending channel that is sized to receive a portion of the stator assembly therein;

a locking mechanism configured to selectively prevent and permit rotation of the stator assembly about the axle within the housing; and an access window defined in the first wall of the housing, the circuit board being accessible through the access window.

22. The electromagnetic machine of claim 21, wherein in response to the locking mechanism being deactivated, the stator assembly is configured to rotate relative to the housing such that a desired one of the plurality of circuit board sections is removable through the access window.

23. The electromagnetic machine of claim 22, wherein removal of the desired one of the plurality of circuit board sections through the access window permits access to at least 8.33% of the plurality of coil modules.

* * * * *